(12) United States Patent
Son et al.

(10) Patent No.: US 12,353,118 B2
(45) Date of Patent: Jul. 8, 2025

(54) LENS DRIVING DEVICE, CAMERA MODULE AND OPTICAL DEVICE

(71) Applicant: LG INNOTEK CO., LTD., Seoul (KR)

(72) Inventors: Byung Wook Son, Seoul (KR); Kyoung Ho Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 242 days.

(21) Appl. No.: 18/007,511

(22) PCT Filed: Jun. 1, 2021

(86) PCT No.: PCT/KR2021/006815
§ 371 (c)(1),
(2) Date: Dec. 1, 2022

(87) PCT Pub. No.: WO2022/014859
PCT Pub. Date: Jan. 20, 2022

(65) Prior Publication Data
US 2023/0288777 A1   Sep. 14, 2023

(30) Foreign Application Priority Data

Jul. 13, 2020 (KR) .................... 10-2020-0086280
Aug. 4, 2020 (KR) .................... 10-2020-0097379

(51) Int. Cl.
*G03B 5/04* (2021.01)
*F03G 7/06* (2006.01)
(Continued)

(52) U.S. Cl.
CPC ............ *G03B 5/04* (2013.01); *F03G 7/0614* (2021.08); *H02K 41/0354* (2013.01);
(Continued)

(58) Field of Classification Search
CPC .............. G03B 5/04; G03B 2205/0015; G03B 2205/0069; G03B 3/10; G03B 30/00;
(Continued)

(56) References Cited

U.S. PATENT DOCUMENTS 8,611,734 B2 * 12/2013 Lim .................... G03B 5/02
359/557
2014/0009675 A1   1/2014 Chiu
2021/0063679 A1 *  3/2021 Park .................... G02B 7/08

FOREIGN PATENT DOCUMENTS

KR   10-2012-0045333   5/2012
KR        10-1148581   5/2012
(Continued)

OTHER PUBLICATIONS

European Search Report dated Jun. 28, 2024 issued in Application No. 21842130.3.
(Continued)

*Primary Examiner* — James M Hannett
*Assistant Examiner* — Angel L Garces-Rivera
(74) *Attorney, Agent, or Firm* — KED & ASSOCIATES, LLP

(57) ABSTRACT

The present embodiment relates to a lens driving device comprising: a fixed portion; a moving portion; a bobbin; a magnet disposed on any one of the bobbin and fixed portion; a coil disposed on the other one of the bobbin and fixed portion; a support member having one end coupled to the bobbin and the other end coupled to the moving portion; and a shape memory alloy member coupled to the fixed portion and moving portion, wherein the shape memory alloy member moves the moving portion in an optical axis direction, and the coil and magnet move the bobbin about the moving portion in a direction perpendicular to the optical axis direction.

20 Claims, 33 Drawing Sheets

(51) Int. Cl.
*H02K 41/035* (2006.01)
*H04N 23/54* (2023.01)
*H04N 23/55* (2023.01)
*H04N 23/68* (2023.01)

(52) U.S. Cl.
CPC ............. *H04N 23/54* (2023.01); *H04N 23/55* (2023.01); *H04N 23/687* (2023.01); *G03B 2205/0015* (2013.01); *G03B 2205/0069* (2013.01)

(58) Field of Classification Search
CPC .... G03B 5/00; F03G 7/0614; H02K 41/0354; H04N 23/54; H04N 23/55; H04N 23/687; H04N 23/6812; G02B 13/001; G02B 7/09; G02B 27/646
See application file for complete search history.

(56) References Cited

FOREIGN PATENT DOCUMENTS

| | | |
|---|---|---|
| KR | 10-1875545 | 7/2018 |
| KR | 10-2019-0053411 | 5/2019 |
| WO | WO 2019/119454 | 6/2019 |

OTHER PUBLICATIONS

International Search Report dated Sep. 6, 2021 issued in Application No. PCT/KR2021/006815.

* cited by examiner

LENS DRIVING DEVICE, CAMERA MODULE AND OPTICAL DEVICE

CROSS-REFERENCE TO RELATED PATENT APPLICATIONS

This application is a U.S. National Stage Application under 35 U.S.C. § 371 of PCT Application No. PCT/KR2021/006815, filed Jun. 1, 2021, which claims priority to Korean Patent Application Nos. 10-2020-0086280, filed Jul. 13, 2020, and 10-2020-0097379, filed Aug. 4, 2020, whose entire disclosures are hereby incorporated by reference.

TECHNICAL FIELD

The present embodiment relates to a lens driving device, a camera module, and an optical device.

BACKGROUND ART

As the spread of various portable terminals is widely generalized and wireless Internet services are commercialized, the demands of consumers related to portable terminals are also diversifying, so that various types of additional devices are being installed in the portable terminals.

Among them, there is a camera module that photographs a picture or a video of a subject as a representative one. Optical image stabilization (OIS) is applied to the camera module to prevent an image shaking phenomenon caused by photographer's handshake. In addition, an auto focus (AF) function for automatically adjusting a focus according to a distance of a subject is applied to the camera module.

However, as the aperture of the lens increases with the recent high pixel trend in the image sensor, the weight of the lens is increased, so that there is a problem in that the stress applied to the elastic member supporting the OIS driving is increased when vibration or impact occurs in the camera module. Furthermore, the increase in stress applied to the elastic member causes deformation and disconnection of the elastic member, so that there is a problem in that the OIS cannot be driven and oscillation failure occurs.

However, as the aperture of the lens increases, when vibration and impact are generated in the camera module, the stress applied to the support member supporting the AF driving increases, causing deformation and disconnection of the support member, so that there is a problem in that AF cannot be driven and oscillation failure occurs.

DETAILED DESCRIPTION OF THE INVENTION

Technical Subject

A first embodiment of the present invention is intended to provide a lens driving device comprising an OIS support member capable of supporting the OIS driving of a large aperture lens.

In addition, a first embodiment of the present invention is intended to provide a lens driving device comprising an auto focus (AF) driving structure using a shape memory alloy (SMA).

A second embodiment of the present invention is intended to provide a lens driving device comprising an AF support member capable of supporting AF driving of a large aperture lens.

In addition, the second embodiment of the present invention is intended to provide a lens driving device comprising an OIS driving structure using a shape memory alloy (SMA).

Technical Solution

A lens driving device according to a first embodiment of the present invention comprises: a fixed portion; a moving portion being disposed to move with respect to the fixed portion; a bobbin being disposed inside the moving portion; a magnet being disposed on any one of the bobbin and the fixed portion; a coil being disposed on the other one of the bobbin and the fixed portion; a support member having one end being coupled to the bobbin and the other end being coupled to the moving portion; and a shape memory alloy member being coupled to the fixed portion and the moving portion, wherein the shape memory alloy member moves the moving portion in an optical axis direction, and wherein the coil and the magnet may move the bobbin in a direction perpendicular to the optical axis direction with respect to the moving portion.

Both ends of the shape memory alloy member may be connected to the fixed portion, and a central region may be connected to the moving portion.

The support member may have regions having different widths.

The support member may have a constant width in a lengthwise direction.

The width of the peripheral region of the support member may be thicker than the central region.

The support member may have a head portion and a body portion, and the width of the head portion may be greater than the width of the body portion.

The shape memory alloy member may comprise a first unit shape memory alloy member and a second unit shape memory alloy member.

The magnet may comprise a first unit magnet and a second unit magnet.

The moving portion comprises a first corner region being connected to the first unit shape memory alloy member and a second corner region adjacent to the first corner region, wherein the first unit magnet may be disposed closer to the second corner region than to the first corner region.

The moving portion comprises a third corner region in a diagonal direction from the first corner region, wherein the second unit shape memory alloy member is connected to the third corner region of the moving portion, and wherein the second unit magnet may be disposed closer to the second corner region than to the third corner region.

The support member may be disposed long in length in the optical axis direction.

The bobbin may move together with the moving portion when the moving portion moves in the optical axis direction.

The support member comprises a body portion, and a first concave portion and a second concave portion being formed to have a narrower width than the body portion, wherein the first concave portion of the support member is coupled to the bobbin, and wherein the second concave portion of the support member may be coupled to the moving portion.

The width of the first and second concave portions may be a width in a direction perpendicular to the lengthwise direction of the support member.

The body portion of the support member may be disposed between the first and second concave portions, and the body portion may comprise a portion that becomes wider as it moves away from the first and second concave portions.

The support member comprises: a first fixed portion being extended from the first concave portion to the opposite side of the body portion and being formed to have a wider width than the first concave portion; and a second fixed portion being extended from the second concave portion to the opposite side of the body portion and being formed to have a wider width than the second concave portion, wherein the first concave portion is disposed at a higher position than the second concave portion, wherein the first fixed portion is coupled to the bobbin, and wherein the second fixed portion may be coupled to the moving portion.

An upper surface of the support member may be coupled to the bobbin, and a lower surface of the support member may be coupled to the moving portion.

The support member may comprise an elastomer.

The fixed portion comprises a base and a substrate being disposed in the base, wherein the magnet is disposed on an outer circumferential surface of the bobbin, and wherein the coil may be disposed in the substrate.

The moving portion comprises: a lower plate being disposed between the bobbin and the base in the optical axis direction; and a sidewall being protruded from an upper surface of the lower plate, wherein the sidewall of the moving portion comprises a hole or groove, and wherein the magnet may be disposed in the hole or a groove of the moving portion.

The moving portion may not be disposed between the magnet and the coil so that the magnet and the coil directly face each other.

The shape memory alloy member comprises a shape memory alloy wire, wherein the shape memory alloy wire has one end and the other end fixed to the fixed portion, and wherein a portion between the one end and the other end may be caught in the moving portion.

The moving portion comprises: a lower plate being disposed between the bobbin and the fixed portion in the optical axis direction; and a sidewall being protruded from an upper surface of the lower plate, wherein the moving portion may comprise a protrusion formed to protrude from the outer circumferential surface of the sidewall of the moving portion, and a groove formed to open downwardly to the protrusion to receive the shape memory alloy wire.

The protrusion of the moving portion may be formed at a corner of the moving portion, and the groove of the moving portion may be spaced apart from the outer circumferential surface of the sidewall.

The groove of the moving portion comprises a first surface being in contact with the shape memory alloy wire, wherein the first surface of the groove of the moving portion may comprise a plane being disposed in a direction perpendicular to the optical axis direction.

The first surface of the groove of the moving portion may comprise: a first chamfered surface being extended inclinedly from a first portion of the plane toward the one end of the shape memory alloy wire; and a second chamfered surface being extended inclinedly from a second portion of the plane toward the other end of the shape memory alloy wire.

The coil comprises: a first coil being disposed in a first direction perpendicular to the optical axis direction; and a second coil being disposed in a second direction perpendicular to the optical axis direction and the first direction, wherein the magnet comprises a first magnet facing the first coil, and a second magnet facing the second coil, and wherein each of the first magnet and the second magnet may comprise two magnets being spaced apart from each other.

The lens driving device comprises: a first Hall sensor detecting the first magnet; a second Hall sensor detecting the second magnet; and a driver IC for controlling a current being applied to the shape memory alloy member, wherein the fixed portion comprises a substrate electrically connected to the coil and comprising a plurality of terminals, wherein the plurality of terminals of the board may comprise: four terminals being electrically connected to the driver IC; two terminals being connected to the first coil; two terminals being connected to the second coil; four terminals being connected to the first Hall sensor; and four terminals being connected to the second Hall sensor.

A camera module according to a first embodiment of the present invention may comprise: a printed circuit board; an image sensor being disposed in the printed circuit board; the lens driving device being disposed in the printed circuit board; and a lens being coupled to the bobbin of the lens driving device.

An optical device according to a first embodiment of the present invention comprises: a main body; the camera module disposed on the main body; and a display disposed on the main body and outputting an image photographed by the camera module.

A lens driving device according to a first embodiment of the present invention comprises: a fixed portion; a moving portion moving in an optical axis direction with respect to the fixed portion; a bobbin being disposed inside the moving portion; a driving unit for moving the bobbin in a direction perpendicular to the optical axis direction; a support member being coupled to the bobbin and the moving portion; and a shape memory alloy member being coupled to the fixed portion and the moving portion, wherein the support member may comprise regions having different widths.

The width of the peripheral region of the support member may be thicker than the central region.

The support member may have a head portion and a body portion, and the width of the head portion may be greater than the width of the body portion.

The shape memory alloy member comprises a first unit shape memory alloy member being coupled to a first corner region of the moving portion, and the driving unit may comprise a first unit driving unit adjacent to a second corner region adjacent to the first corner region than to the first corner region.

The first unit driving unit may comprise a first magnet being disposed in the bobbin and a first coil being disposed in the fixed portion and facing the first magnet.

A lens driving device according to a first embodiment of the present invention comprises: a fixed portion; a moving portion moving in an optical axis direction with respect to the fixed portion; a bobbin disposed inside the moving portion; a driving unit for moving the bobbin in a direction perpendicular to the optical axis direction; a support member for supporting the bobbin; and a shape memory alloy member for coupling with the fixed portion and the moving portion, wherein the shape memory alloy member comprises a first unit shape memory alloy member coupled to a first corner region of the moving portion, and wherein the driving unit may comprise a first unit driving unit adjacent to a second corner region adjacent to the first corner region rather than to the first corner region.

The shape memory alloy member may comprise a second unit shape memory alloy member being coupled to the first corner region of the moving portion and a third corner region of the moving portion in a diagonal direction.

The driving unit may comprise a second unit driving unit adjacent to a fourth corner region adjacent to the third corner region rather than the third corner region.

The support member may comprise a non-metallic material.

The first unit driving unit may comprise a first magnet being disposed in the bobbin and a first coil being disposed in the fixed portion and facing the first magnet.

A lens driving device according to a second embodiment of the present invention comprises: a housing; a bobbin being disposed inside the housing; a coil and a magnet for moving the bobbin in an optical axis direction; and a support member connecting the housing and the bobbin, wherein the bobbin comprises a groove being formed on an outer surface of the bobbin, and wherein the support member may comprise a first fixed portion being fixed inside the groove of the bobbin.

The housing may comprise a groove being formed on an inner surface of the housing, and the support member may comprise a second fixed portion being fixed inside the groove of the housing.

The support member comprises a connection portion connecting the first fixed portion and the second fixed portion, and the connection portion may be formed to have a width smaller than the width of the first fixed portion and the second fixed portion at a portion being connected to the first fixed portion and the second fixed portion.

The width of the connection portion may be the length in a direction perpendicular to the lengthwise of the connection portion.

The connection portion may comprise a portion whose width increases as it moves away from the first fixed portion and the second fixed portion increases.

An outer surface of the connection portion may comprise a curved surface.

The groove of the bobbin is extended from an upper surface of the bobbin, and the groove of the housing may be extended from an upper surface of the housing.

The groove of the bobbin may comprise a locking protrusion spaced apart by a width smaller than the width of the first fixed portion so that the first fixed portion is caught.

The groove of the housing may comprise a locking protrusion being spaced apart by a width smaller than the width of the second fixed portion so that the second fixed portion is caught.

The magnet is disposed in the bobbin and the coil may be disposed on the housing.

The lens driving device may comprise: a base being disposed below the housing; a first substrate being disposed in the base; and a shape memory alloy member connecting the housing and the first substrate.

The shape memory alloy member comprises: a first coupling part being coupled to the housing; a second coupling part being coupled to the first substrate; a shape memory alloy wire for connecting the first coupling part and the second coupling part, wherein the shape memory alloy wire may change in length when a current is applied.

The shape memory alloy member comprises a conductive wire connecting the first coupling portion and the first substrate, wherein the shape memory alloy wire may comprise a first shape memory alloy wire being disposed in a first direction perpendicular to the optical axis direction, and a second shape memory alloy wire being disposed in a second direction perpendicular to the optical axis direction and the first direction.

The shape memory alloy wire comprises first to fourth shape memory alloy wires, wherein the first substrate may comprise first to fourth terminals being connected to each of the first to fourth shape memory alloy wires and a fifth terminal being commonly connected to the first to fourth shape memory alloy wires.

It may comprise a bearing being disposed between the housing and the base or the housing and the first substrate to be in contact with the housing when the housing moves in a direction perpendicular to the optical axis direction.

It comprises an elastic member being coupled to an upper surface of the base and an upper surface of the housing, wherein the elastic member may press the housing in a direction toward the bearing.

It comprises a second substrate being disposed in a side surface of the base and electrically connected to the first substrate, wherein the elastic member comprises first and second elastic members being spaced apart from each other, and wherein the coil may be electrically connected to the second substrate through the first and second elastic members.

The support member may be formed of an elastomer.

The camera module according to the second embodiment of the present invention may comprise: a printed circuit board; an image sensor being disposed in the printed circuit board; the lens driving device being disposed in the printed circuit board; and a lens being coupled to the bobbin of the lens driving device.

An optical device according to a second embodiment of the present invention may comprise: a main body; the camera module being disposed in the main body; and a display being disposed in the main body and outputting an image being photographed by the camera module.

A lens driving device according to a second embodiment of the present invention comprises: a housing; a bobbin being disposed inside the housing; a coil and a magnet for moving the bobbin in an optical axis direction; and a support member connecting the housing and the bobbin, wherein a groove being formed in an outer surface of at least one of the bobbin and the housing is comprised, and wherein the support member may comprise a fixed portion being fixed inside the groove.

Advantageous Effects

Through the first embodiment of the present invention, deformation of the OIS support member for supporting the OIS driving of the large-aperture lens can be prevented. Through this, OIS driving of the large-aperture lens may be smoothly performed.

In addition, the AF driving using the SMA can be performed through the first embodiment of the present invention.

Through the second embodiment of the present invention, the deformation of the AF support member for supporting AF driving of the large aperture lens can be prevented. Through this, AF driving of the large aperture lens can be performed smoothly.

In addition, OIS driving using SMA may be performed.

BEST MODE

Figure 1:
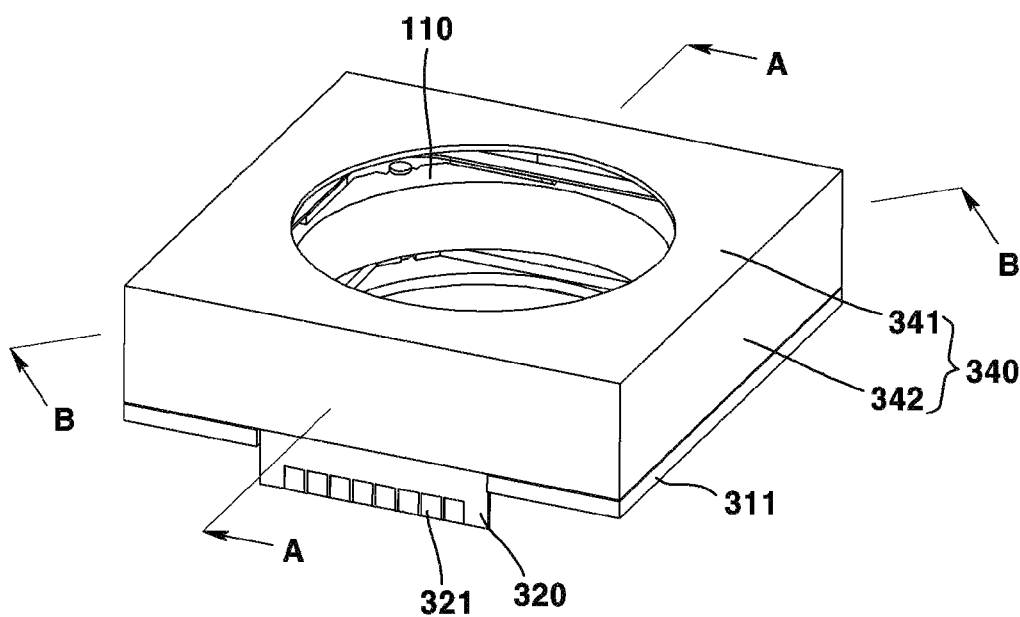
FIG. 1 is a perspective view of a lens driving device according to a first embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

An 'optical axis direction' used hereinafter is defined as an optical axis direction of a lens and/or an image sensor being coupled to a lens driving device.

The 'vertical direction' used hereinafter may be a direction parallel to the optical axis direction. The vertical direction may correspond to the 'z-axis direction'. The 'horizontal direction' used hereinafter may be a direction perpendicular to the vertical direction. That is, the horizontal direction may be a direction perpendicular to the optical axis. Accordingly, the horizontal direction may comprise an 'x-axis direction' and a 'y-axis direction'.

The 'auto focus (AF) function' used hereinafter is defined as a function to automatically focus on a subject by adjusting the distance from the image sensor by moving the lens in an optical axis direction according to the distance of the subject so that the image sensor can obtain a clear image of the subject.

The 'optical image stabilization (OIS) function' used hereinafter is defined as the function of moving or tilting the lens in a direction perpendicular to the optical axis to cancel the vibration (movement) generated in the image sensor by external force.

Hereinafter, a configuration of a lens driving device according to a first embodiment of the present invention will be described with reference to the drawings.

Figure 2:
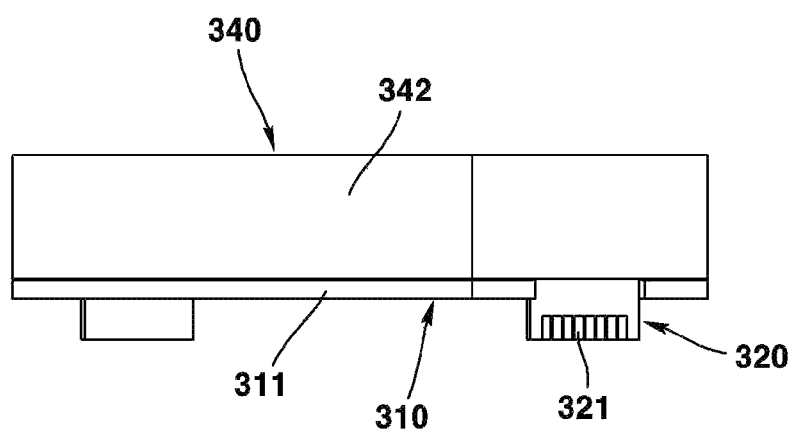
FIG. 2 is a view of a lens driving device according to a first embodiment of the present invention as viewed from a different direction from that of FIG. 1.
Figure 3:
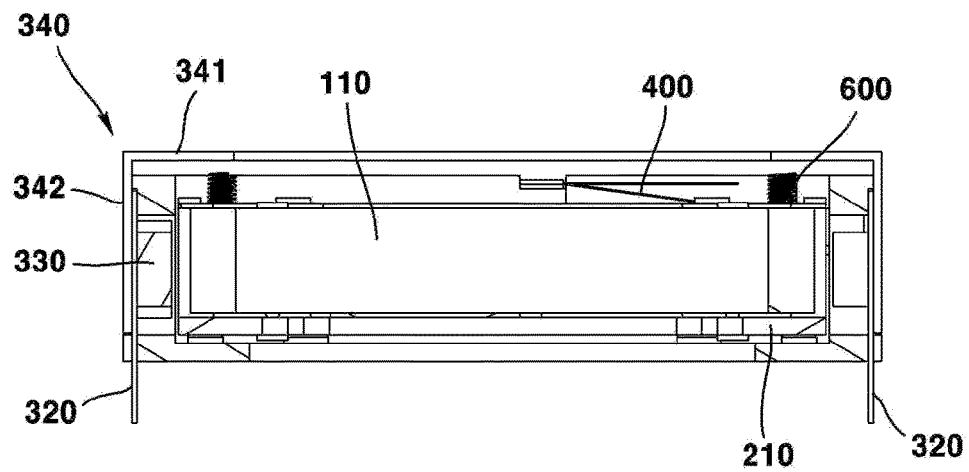
FIG. 3 is a cross-sectional view taken along line A-A of FIG. 1.
Figure 4:
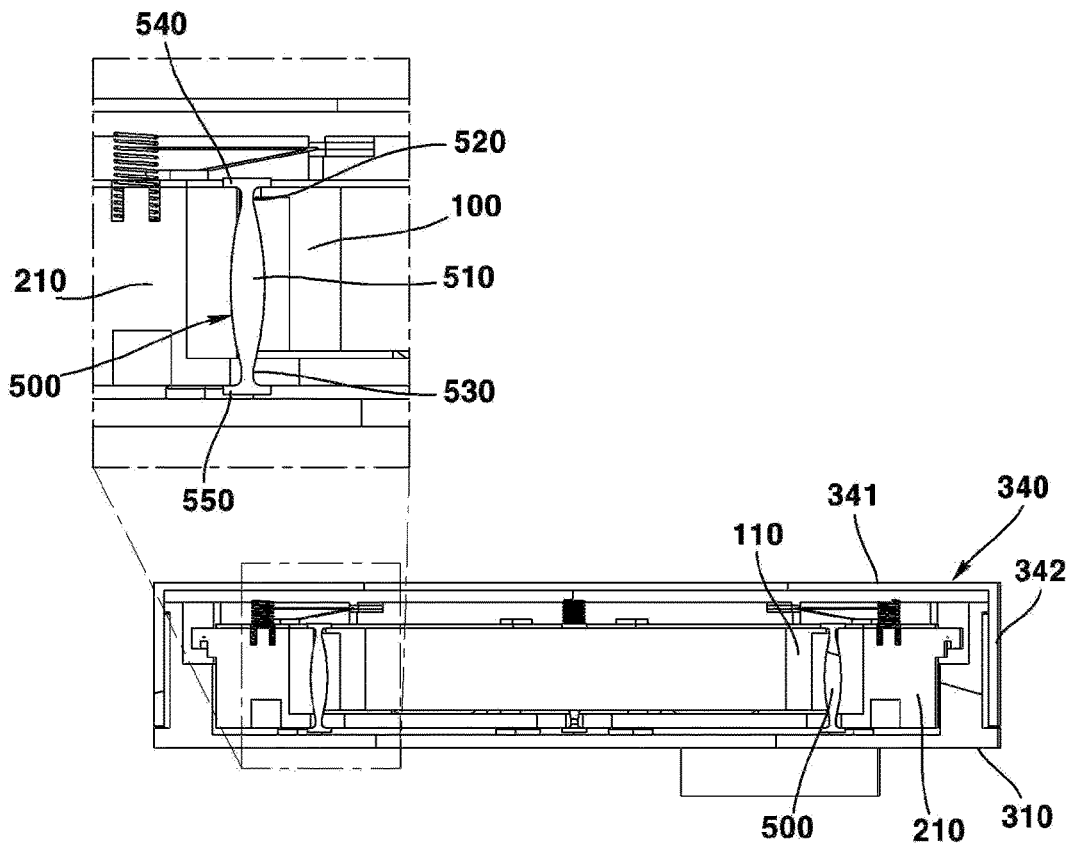
FIG. 4 is a cross-sectional view taken along line B-B of FIG. 1.
Figure 5:
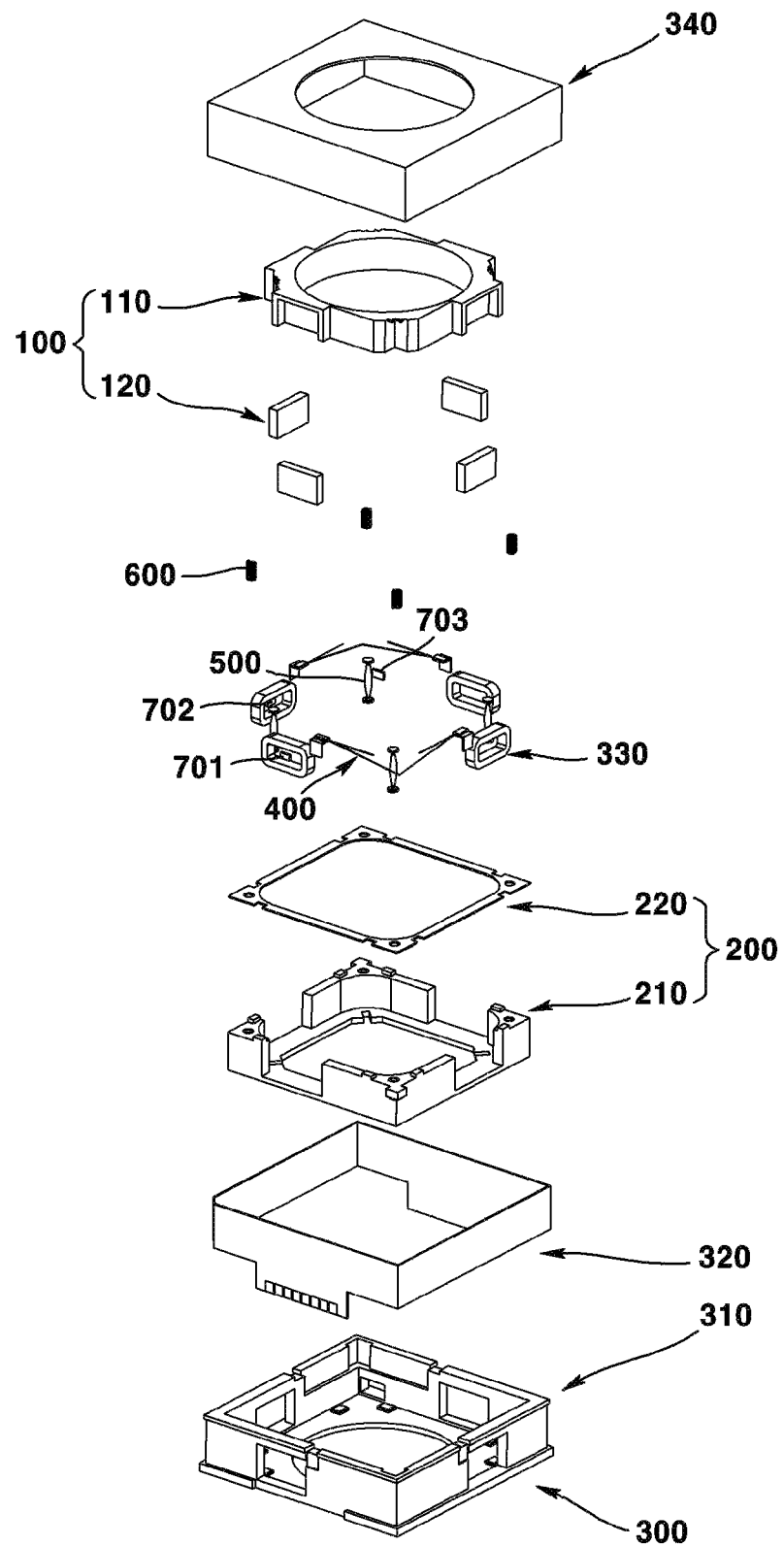
FIG. 5 is an exploded perspective view of a lens driving device according to a first embodiment of the present invention.
Figure 6:
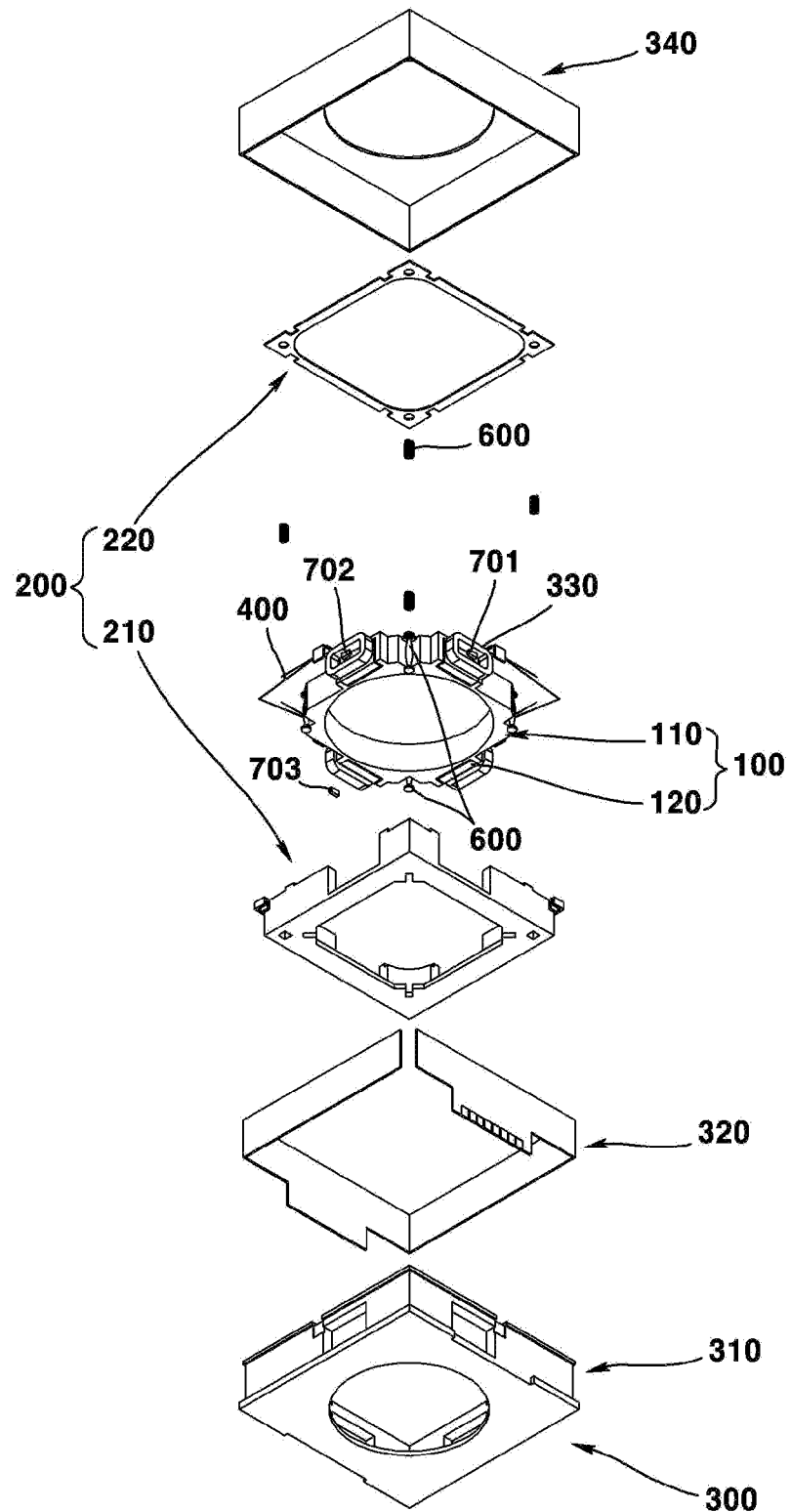
FIG. 6 is an exploded perspective view of the lens driving device according to the first embodiment of the present invention, as viewed from a different direction from that of FIG. 5.
Figure 7:
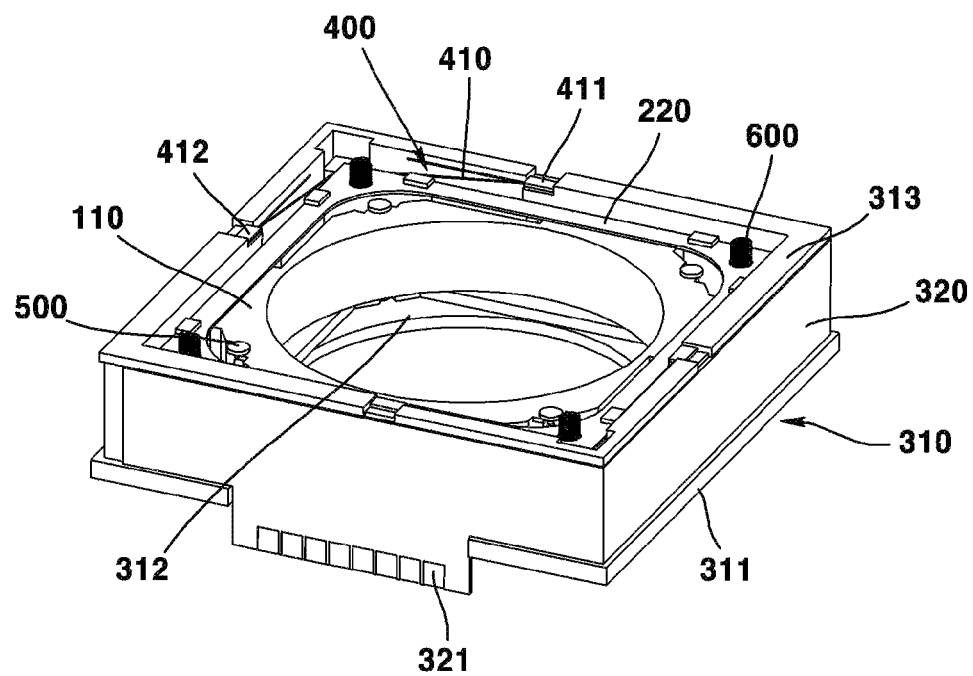
FIG. 7 is a perspective view illustrating a state in which a cover member is removed from the lens driving device of FIG. 1.
Figure 8:
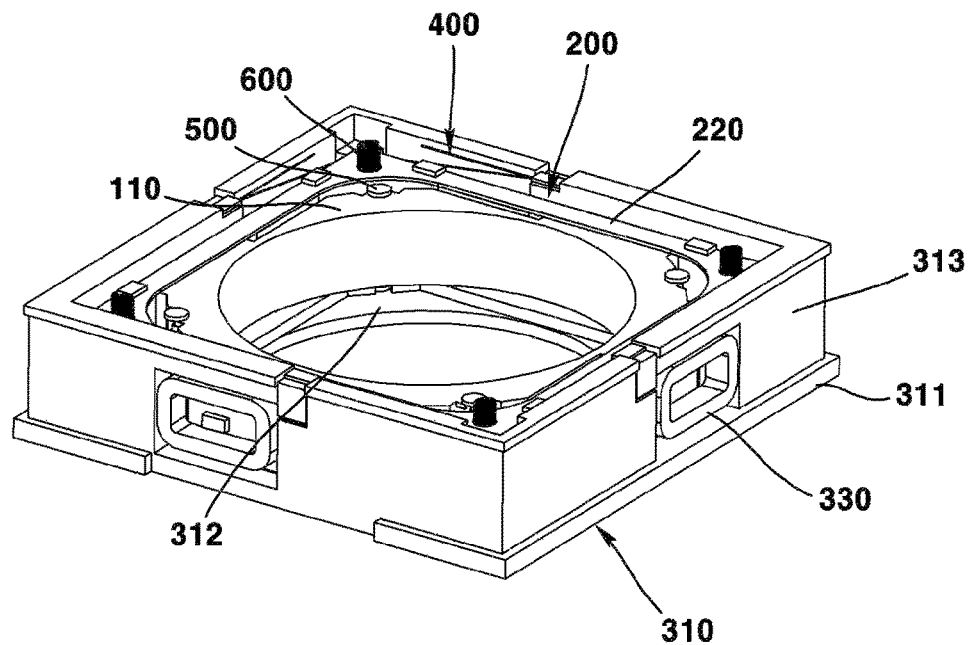
FIG. 8 is a plan view of a state in which a substrate is removed from the lens driving device of FIG. 7.
Figure 9A:
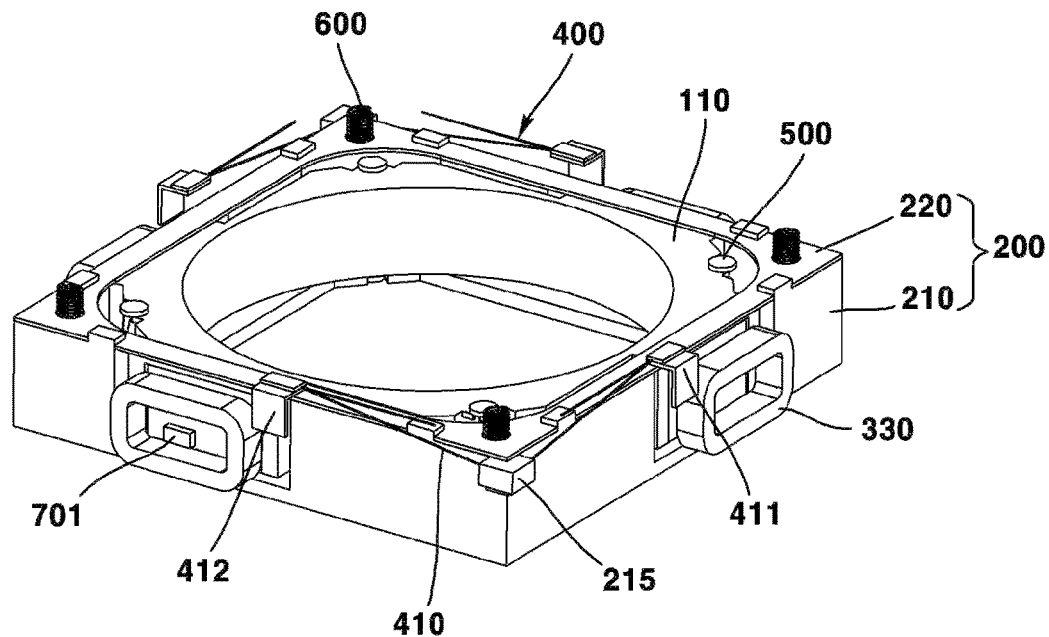
FIG. 9a is a plan view illustrating a state in which a base is removed from the lens driving device of FIG. 8.
Figure 9B:
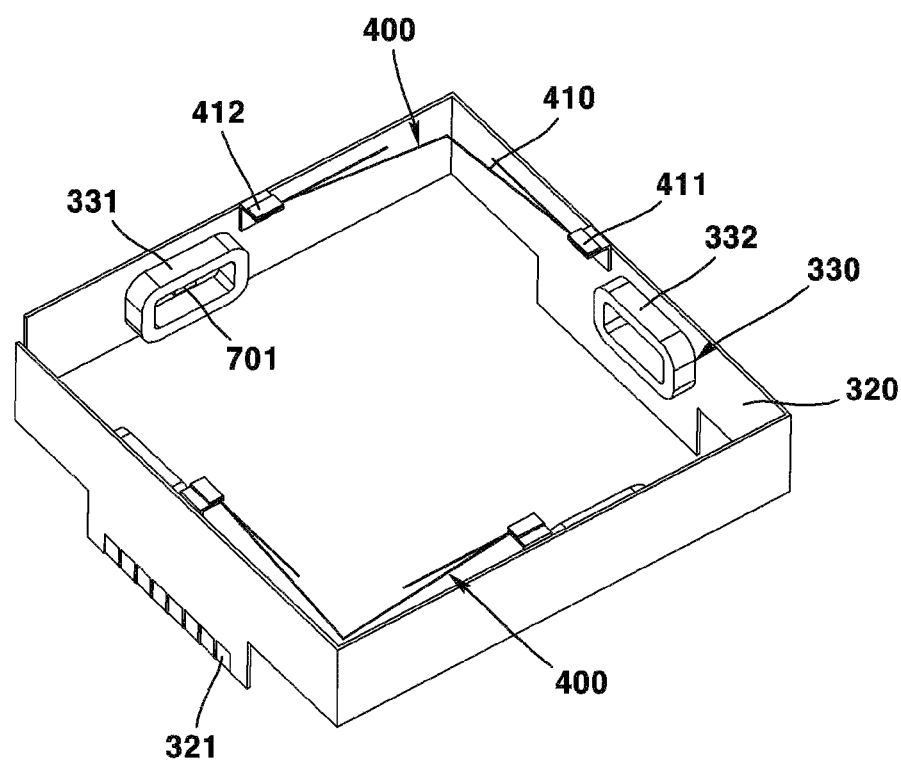
FIG. 9b is a diagram illustrating a coupling structure among a coil, a shape memory alloy member, and a substrate in a lens driving device according to a first embodiment of the present invention.
Figure 10:
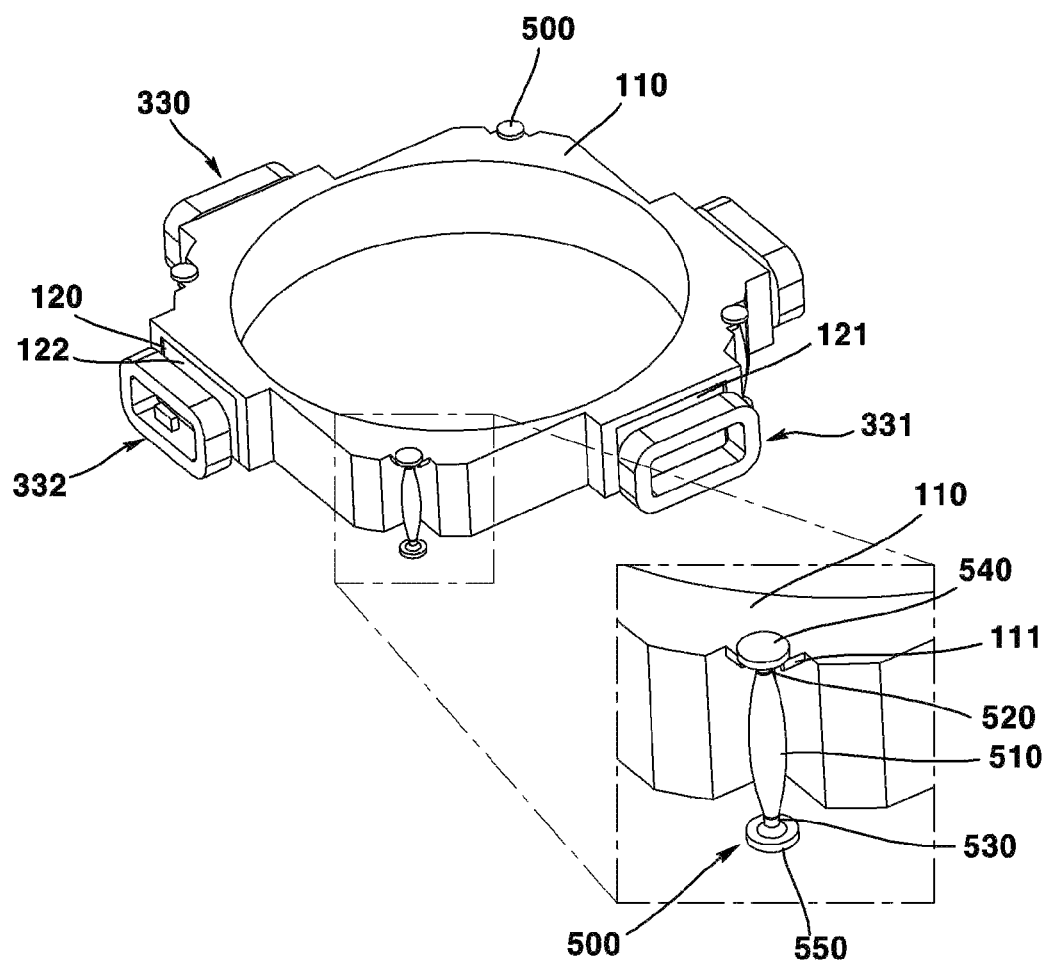
FIG. 10 is a perspective view and an enlarged view illustrating a bobbin and related configuration of a lens driving device according to a first embodiment of the present invention.
Figure 11:
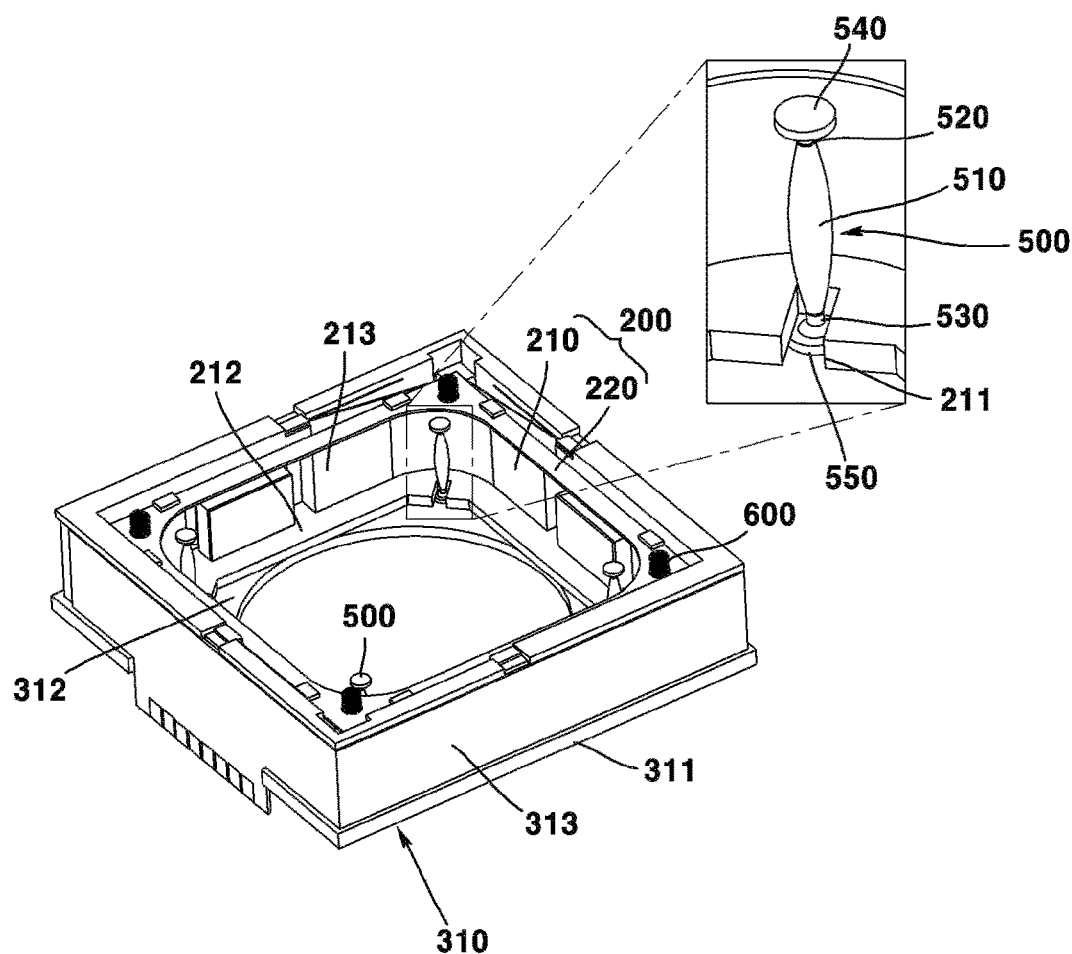
FIG. 11 is a perspective view and an enlarged view illustrating a housing and related configuration of a lens driving device according to a first embodiment of the present invention.
Figure 12:
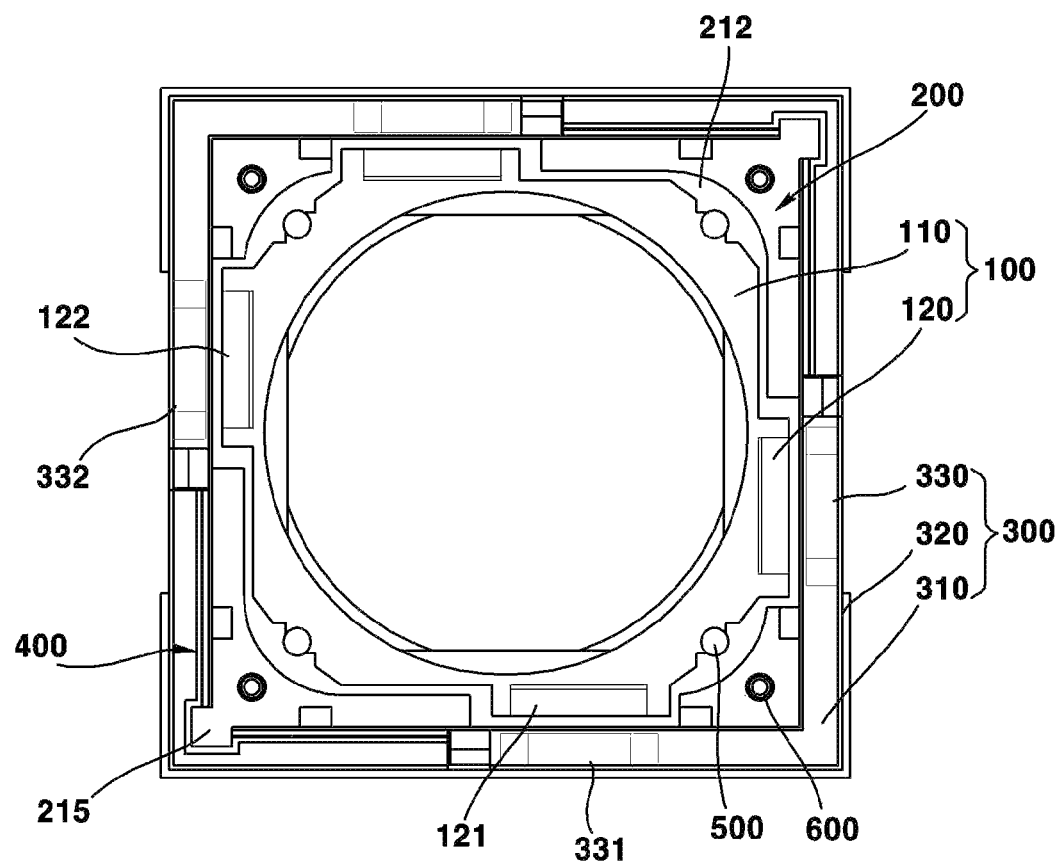
FIG. 12 is a partial see-through plan view of a part of the lens driving device according to a first embodiment of the present invention.
Figure 13:
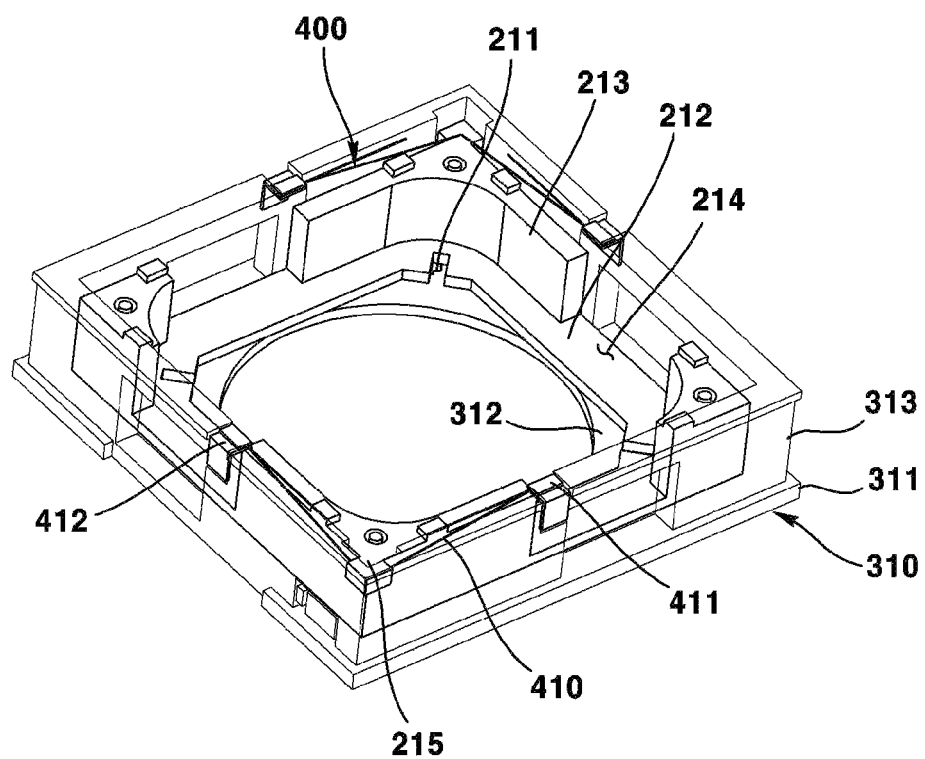
FIG. 13 is a partial see-through perspective view of a part of the lens driving device according to a first embodiment of the present invention.
Figure 14:
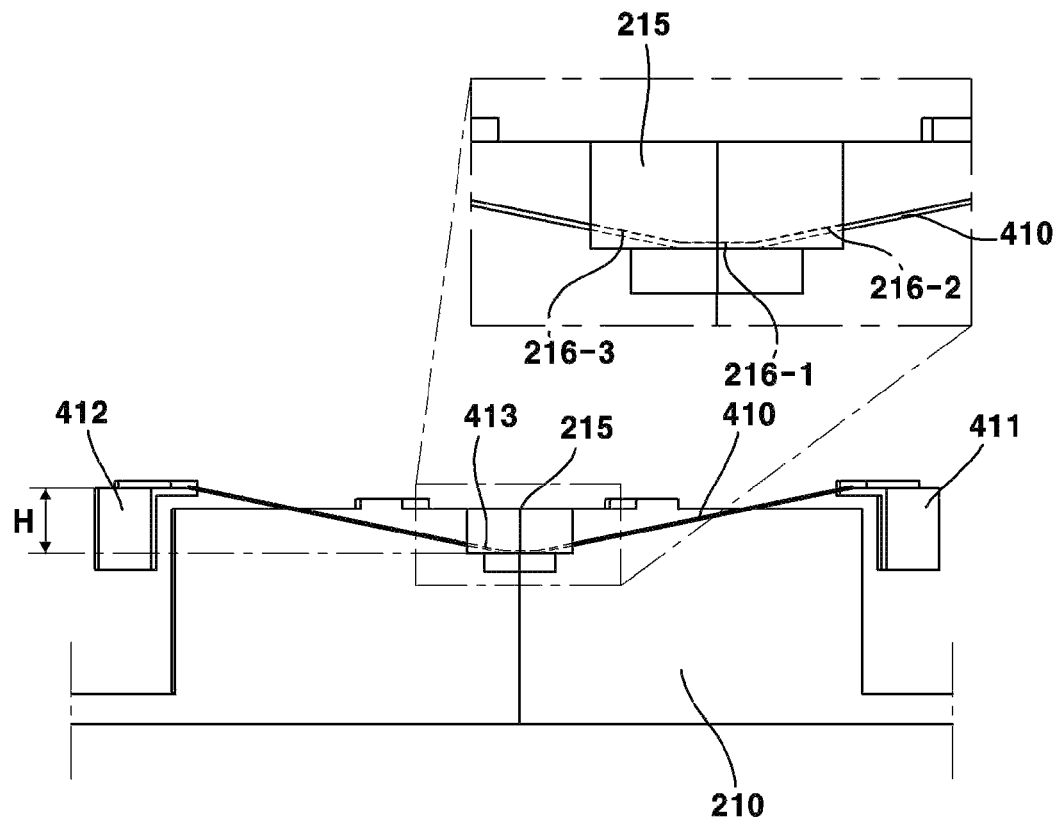
FIG. 14 is a view illustrating a coupling structure of a shape memory alloy member and a housing of a lens driving device according to a first embodiment of the present invention.
Figure 15:
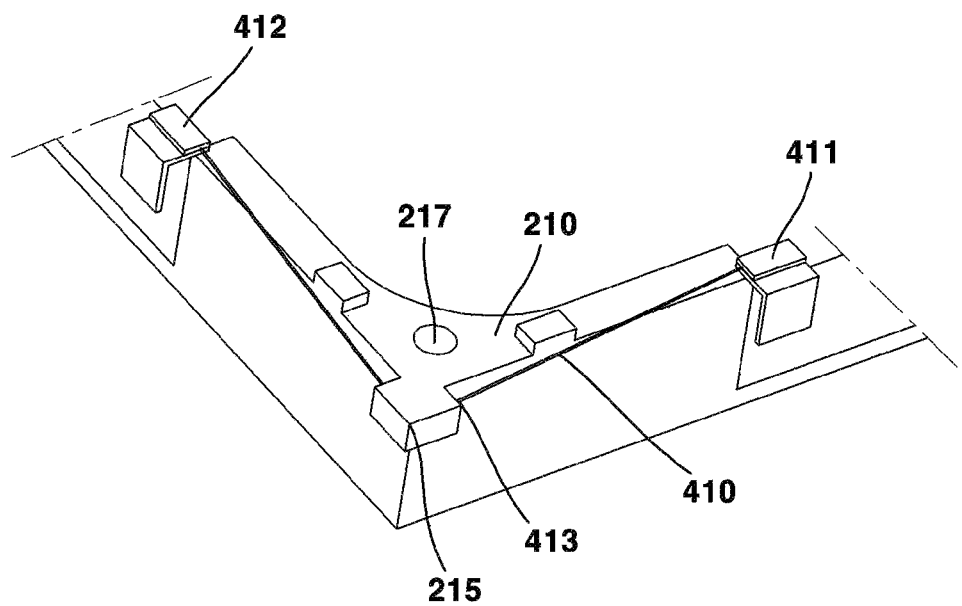
FIG. 15 is a perspective view illustrating a coupling structure of a shape memory alloy member and a housing of a lens driving device according to a first embodiment of the present invention.
Figure 16:
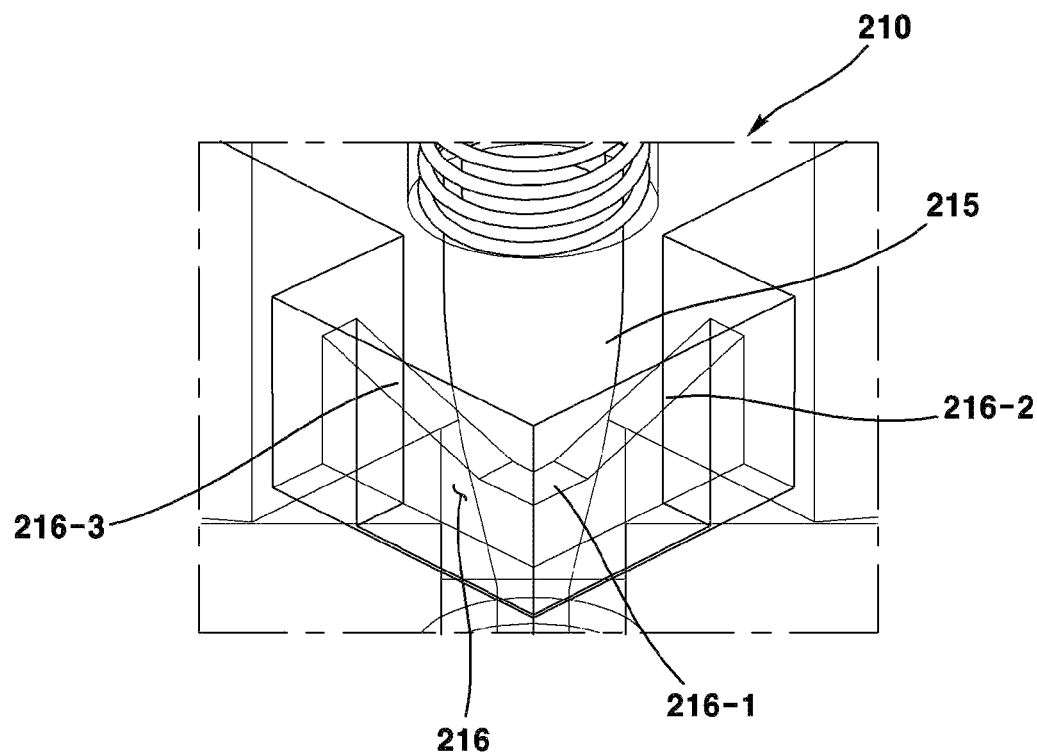
FIG. 16 is an enlarged perspective view of a portion being coupled to a shape memory alloy member in a housing of a lens driving device according to a first embodiment of the present invention.
Figure 17:
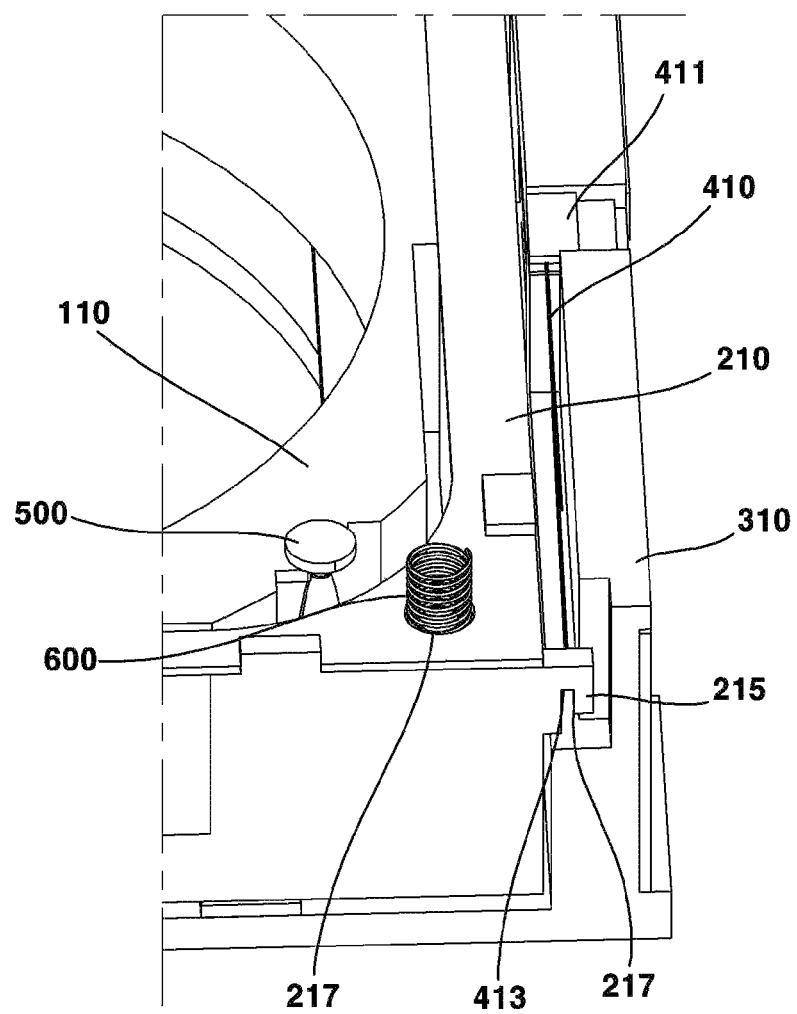
FIG. 17 is a cross-sectional view of a part of the lens driving device according to a first embodiment of the present invention.

FIG. 1 is a perspective view of a lens driving device according to a first embodiment of the present invention; FIG. 2 is a view of a lens driving device according to a first embodiment of the present invention as viewed from a different direction from that of FIG. 1; FIG. 3 is a cross-sectional view taken along line A-A of FIG. 1; FIG. 4 is a cross-sectional view taken along line B-B of FIG. 1; FIG. 5 is an exploded perspective view of a lens driving device according to a first embodiment of the present invention; FIG. 6 is an exploded perspective view of the lens driving device according to the first embodiment of the present invention, as viewed from a different direction from that of FIG. 5; FIG. 7 is a perspective view illustrating a state in which a cover member is removed from the lens driving device of FIG. 1; FIG. 8 is a plan view of a state in which a substrate is removed from the lens driving device of FIG. 7; FIG. 9a is a plan view illustrating a state in which a base is removed from the lens driving device of FIG. 8; FIG. 9b is a diagram illustrating a coupling structure among a coil, a shape memory alloy member, and a substrate in a lens driving device according to a first embodiment of the present invention; FIG. 10 is a perspective view and an enlarged view illustrating a bobbin and related configuration of a lens driving device according to a first embodiment of the present invention; FIG. 11 is a perspective view and an enlarged view illustrating a housing and related configuration of a lens driving device according to a first embodiment of the present invention; FIG. 12 is a partial see-through plan view of a part of the lens driving device according to a first embodiment of the present invention; FIG. 13 is a partial see-through perspective view of a part of the lens driving device according to a first embodiment of the present invention; FIG. 14 is a view illustrating a coupling structure of a shape memory alloy member and a housing of a lens driving device according to a first embodiment of the present invention; FIG. 15 is a perspective view illustrating a coupling structure of a shape memory alloy member and a housing of a lens driving device according to a first embodiment of the present invention; FIG. 16 is an enlarged perspective view of a portion being coupled to a shape memory alloy member in a housing of a lens driving device according to a first embodiment of the present invention; and FIG. 17 is a cross-sectional view of a part of the lens driving device according to a first embodiment of the present invention.

The lens driving device 10 may be a voice coil motor (VCM). The lens driving device 10 may be a lens driving motor. The lens driving device 10 may be a lens driving actuator. The lens driving device 10 may comprise an AF module. The lens driving device 10 may comprise an OIS module.

The lens driving device 10 may comprise a first mover 100. The first mover 100 may be coupled with a lens. The first mover 100 may be connected to the second mover 200 through the support member 500. The first mover 100 may move through interaction with the stator 300. At this time, the first mover 100 may move integrally with the lens. Meanwhile, the first mover 100 can move during OIS driving. At this time, the first mover 100 may be referred to as an 'OIS mover'. However, the first mover 100 may move together with the second mover 200 even during AF driving.

The lens driving device 10 may comprise a bobbin 110. The first mover 100 may comprise a bobbin 110. The bobbin 110 may be disposed inside the housing 210. The bobbin 110 may be disposed in a hole of the housing 210. The bobbin 110 may be movably coupled to the housing 210. The bobbin 110 may move in a direction perpendicular to the optical axis inside the housing 210. The bobbin 110 may move in a direction perpendicular to the optical axis by the coil 330 and the magnet 120. A lens may be coupled to the bobbin 110. The bobbin 110 and the lens may be coupled by screw-coupling and/or an adhesive. A magnet 120 may be disposed in the bobbin 110. Or, in a modified embodiment, the coil 330 may be disposed in the bobbin 110.

In a first embodiment of the present invention, the bobbin 110 may move together with the housing 210 when the housing 210 moves in the optical axis direction. However, when the bobbin 110 moves in a direction perpendicular to the optical axis direction, the housing 210 is fixed and only the bobbin 110 can be moved.

The bobbin 110 may comprise a groove 111. The groove 111 may be formed at an outer surface of the bobbin 110. The groove 111 of the bobbin 110 may be formed in a protrusion being protruded from an upper portion of the bobbin 110. The groove 111 of the bobbin 110 may be opened to the outside of the bobbin 110. A support member 500 may be coupled to the groove 111 of the bobbin 110. The first concave portion 520 of the support member 500 may be hooked and fixed to the groove 111 of the bobbin 110. A support member 500 may be inserted into the groove 111 of the bobbin 110 from the outside. A groove 111 of the bobbin 110 may be formed as a hole. In this case, at least a portion of the support member 500 may be disposed to penetrate through the hole of the bobbin 110. The hole or groove 111 of the bobbin 110 may be coupled to the first concave portion 520 of the support member 500.

The lens driving device 10 may comprise a magnet 120. The first mover 100 may comprise a magnet 120. The magnet 120 may be disposed in the bobbin 110. Or, in a modified embodiment, the magnet 120 may be disposed in the base 310. In this case, the coil 330 may be disposed in the bobbin 111. The magnet 120 may be disposed at an outer side surface or an outer circumferential surface of the bobbin 110. The magnet 120 may be fixed to the bobbin 110 by an adhesive. The magnet 120 may be overlapped with the bobbin 110 in an optical axis direction. The magnet 120 may be overlapped with the housing 210 in an optical axis direction. The magnet 120 may face the coil 330. The magnet 120 may electromagnetically interact with the coil 330. The magnet 120 may move the bobbin 110 in a direction perpendicular to the optical axis through interaction with the coil 330. The magnet 120 may be used during OIS driving. The magnet 120 may be disposed at a side surface of the bobbin 110. The magnet 120 may be a flat magnet having a flat plate shape.

The magnet 120 may be disposed in any one of the bobbin 110 and the fixed portion. The coil 330 may be disposed in the other one of the bobbin 110 and the fixed portion. The coil 330 and the magnet 120 may move the bobbin 110 in a direction perpendicular to the optical axis direction with respect to the moving portion.

The magnet 120 may comprise a plurality of magnets. The magnet 120 may comprise four magnets. The magnet 120 may comprise a first magnet 121 and a second magnet 122. The magnet 120 may comprise two first magnets 121 and two second magnets 122. The magnet 120 may comprise a first magnet 121 facing the first coil 331 and a second magnet 122 facing the second coil 332. Each of the first magnet 121 and the second magnet 122 may comprise two magnets being spaced apart from each other and symmetrical to the optical axis.

The lens driving device 10 may comprise a second mover 200. The second mover 200 may be disposed inside the stator 300. The second mover 200 may be disposed in a suspended state by being caught by the shape memory alloy member 400 inside the stator 300. The second mover 200 may be pressed downward by the elastic member 600. The second mover 200 may support the first mover 100 through the support member 500. The second mover 200 may support the movement of the first mover 100 or may move together with the first mover 100. In more detail, the second mover 200 moves together with the first mover 100 when moving in an optical axis direction, and it may support the movement of the first mover 100 in a relatively fixed state when the first mover 100 moves in a direction perpendicular to the optical axis. The second mover 200 may move through the shape memory alloy member 400. The second mover 200 may move during AF driving. At this time, the second mover 200 may be referred to as an 'AF mover'. The second mover 200 may move integrally with the first mover 100 during AF driving.

The lens driving device 10 may comprise a housing 210. The housing 210 may be a 'moving portion'. The second mover 200 may comprise a housing 210. The housing 210 may be disposed on the base 310. The housing 210 may be disposed inside the base 310. The housing 210 may be spaced apart from the base 310. The housing 210 may be disposed outside the bobbin 110. The housing 210 may accommodate at least a portion of the bobbin 110. The housing 210 may be disposed inside the cover member 340. The housing 210 may be disposed between the cover member 340 and the bobbin 110. The housing 210 may be formed of a material different from that of the cover member 340. The housing 210 may be formed of an insulating material. The housing 210 may be formed of an injection mold material.

The housing 210 may comprise four side portions and four corner portions disposed between the four side portions. The side portion of the housing 210 may comprise: a first side portion; a second side portion being disposed opposite to the first side portion; a third side portion being disposed opposite to each other between the first side portion and the second side portion; and a fourth side portion. The corner portion of the housing 210 may comprise: a first corner portion being disposed between the first side portion and the third side portion; a second corner portion being disposed between the first side portion and the fourth side portion; a third corner portion being disposed between the second side portion and the third side portion; and a fourth corner portion being disposed between the second side portion and the fourth side portion. The side portion of the housing 210 may comprise a 'sidewall 213'. The housing 210 may comprise a sidewall 213. The sidewall 213 may comprise a sidewall 213 being protruded from an upper surface of the lower plate 212.

The housing 210 may comprise a groove 211. The groove 211 may be formed in an inner surface of the housing 210. The groove 211 may be formed in the protrusion being protruded from a lower portion of the housing 210. The groove 211 may be opened toward the inner side of the housing 210. A support member 500 may be coupled to the groove 211. A second concave portion 530 of the support member 500 may be caught by and fixed to the groove 211. A support member 500 may be inserted into the groove 211 from the inside. The groove 211 may be formed as a hole. In this case, at least a portion of the support member 500 may be disposed to pass through the hole of the housing 210. The hole or groove 211 of the housing 210 may be coupled to the second concave portion 530 of the support member 500.

In a first embodiment of the present invention, the protrusion of the bobbin 110 is disposed at an upper portion and the protrusion of the housing 210 is disposed at a lower portion so that the support member 500 may connect the protrusion of the bobbin 110 and the protrusion of the housing 210. At this time, the protrusion of the bobbin 110 may be overlapped with the protrusion of the housing 210 in an optical axis direction. In addition, the protrusion of the bobbin 110 may be disposed above the protrusion of the housing 210 in an optical axis direction. The protrusion of the bobbin 110 may be coupled to the first concave portion 520 of the support member 500. The protrusion of the housing 120 may be coupled to the second concave portion 530 of the support member 500. Or, conversely, the protrusion of the bobbin 110 may be disposed at a lower portion and the protrusion of the housing 210 may be disposed at an upper portion. At this time, the protrusion of the housing 210 is coupled with the first concave portion 520 of the support member 500, and the protrusion of the bobbin 110 may be coupled to the second concave portion 530 of the support member 500.

The housing 210 may comprise a lower plate 212. The lower plate 212 may be disposed between the bobbin 110 and the base 310 in an optical axis direction. The lower plate 212 may be disposed in a direction perpendicular to the optical axis direction. The lower plate 212 may be disposed below the bobbin 110. The support member 500 may be coupled to the lower plate 212 of the housing 210. The support member 500 may be fixed to the lower plate 212 of the housing 210.

The housing 210 may comprise a groove 214. The sidewall 213 of the housing 210 may comprise a hole or groove 214. The groove 214 may be formed alone. The magnet 120 may be disposed in a hole or groove 214 of the housing 210. Through this, in the first embodiment of the present invention, the housing 210 may not be disposed between the magnet 120 and the coil 330 so that the magnet 120 and the coil 330 directly face each other. That is, the housing 210 may comprise an avoiding structure for minimizing a gap between the magnet 120 and the coil 330.

The housing 210 may comprise a protrusion 215. The protrusion 215 may be formed to be protruded from an outer circumferential surface of the sidewall 213 of the housing 210. The protrusion 215 may be formed at a corner of the housing 210. The protrusion 215 may be coupled with a shape memory alloy member 400. The protrusion 215 may be formed at an upper portion of the housing 210. The base 310 may comprise a groove formed at an inner circumferential surface of the base 310 to prevent interference with the protrusion 215 of the housing 210.

The housing 210 may comprise a groove 216. The groove 216 may be formed to be open downwardly in the protrusion 215. A shape memory alloy wire 410 may be caught in the groove 216. The groove 216 of the housing 210 may be spaced apart from the outer circumferential surface of the sidewall 213. In the first embodiment of the present invention, an injection molded product on which the shape memory alloy wire 410 is caught may be formed in a two-stage structure. When the groove 216 is attached to the housing 210, the housing 210 and the shape memory alloy wire 410 may interfere with each other during AF driving, so a distance from the sidewall 213 of the housing 210 may be provided. By the way, the reason why the height of the outer end is low may be to facilitate assembly of the shape memory alloy wire 410.

The groove 216 of the housing 210 may comprise a first surface in contact with the shape memory alloy wire 410. The first surface of the groove 216 of the housing 210 may comprise a planar surface 216-1 being disposed perpendicular to the optical axis direction. The first surface of the groove 216 of the housing 210 may comprise: a first chamfered surface 216-2 being inclinedly extended from the first portion of the planar surface 216-1 toward one end of the shape memory alloy wire 410; and a second chamfered surface 216-3 being inclinedly extended from the second portion of the planar surface 216-1 toward the other end of the shape memory alloy wire 410. The first surface of the groove 216 of the housing 210 may comprise any one or more among a planar surface 216-1, a first chamfered surface 216-2, and a second chamfered surface 216-3. That is, at least one among the planar surface 216-1, the first chamfered surface 216-2, and the second chamfered surface 216-3 may be omitted. In a first embodiment of the present invention, a chamfer may be formed in a portion where the shape memory alloy wire 410 is caught in the groove 216 of the housing 210. Since a stroke that can be implemented becomes shorter as the straight part lengthens in the groove 216 of the housing 210, chamfering may be applied according to the angle of the shape memory alloy wire 410. In this way, the straight line portion can be minimized.

The housing 210 may comprise a groove 217. The groove 217 may be formed at an upper surface of the housing 210. An elastic member 600 may be disposed in the groove 217. The groove 217 may comprise a shape corresponding to the shape of at least a portion of the elastic member 600. A portion of the elastic member 600 may be inserted into the groove 217. Through this, it is possible to prevent the elastic member 600 from being separated from the groove 217 of the housing 210.

The lens driving device 10 may comprise a yoke 220. The second mover 200 may comprise a yoke 220. The yoke 220 may be disposed at an upper surface of the housing 210. An attractive force may act between the yoke 220 and the magnet 120. In a state where no current is applied to the coil 330, the magnet 120 may be fixed at a position as close to the yoke 220 as possible. That is, the yoke 220 may provide an attractive force so that the magnet 120 can return to its original position in a state where no current is applied to the coil 330.

The lens driving device 10 may comprise a stator 300. The stator 300 may accommodate the first and second movers 100 and 200 therein. The stator 300 may comprise a relatively fixed configuration even when any one or more of the first and second movers 100 and 200 moves. The stator 300 may movably support the second mover 200. The stator 300 may move the first and second movers 100 and 200. The stator 300 may comprise a 'fixed portion'. The fixed portion may comprise a base 310 and a substrate 320.

The lens driving device 10 may comprise a base 310. The stator 300 may comprise a base 310. The base 310 may be disposed below the housing 210. The base 310 may accommodate at least a portion of the housing 210 therein. A substrate 320 may be disposed at an outer circumferential surface of the base 310. The base 310 may be coupled to the cover member 340. The base 310 may be disposed on the printed circuit board 50.

The base 310 may comprise a step 311. The step 311 may be formed at a side surface of the base 310. The step 311 may be formed at a lower end of the base 310. The step 311 may be formed to be protruded from an outer circumference of the base 310. The side plate 342 of the cover member 340 may be seated on the step 311.

The base 310 may comprise a lower plate 312. The lower plate 312 may be disposed below the housing 210. The lower plate 312 may be disposed parallel to the lower plate 212 of the housing 210. The lower plate 312 may be disposed in a direction perpendicular to the optical axis direction.

The base 310 may comprise a sidewall 313. The sidewall 313 may be protruded upward from the lower plate 312. The sidewall 313 may comprise a plurality of sidewalls. The sidewall 313 may comprise four sidewalls. A hole or groove in which the coil 330 is disposed may be formed in the sidewall 313 of the base 310. The coil 330 may be disposed at the sidewall 313 of the base 310.

The lens driving device 10 may comprise a substrate 320. The stator 300 may comprise a substrate 320. The substrate 320 may be disposed in the base 310. The substrate 320 may be electrically connected to the coil 330. The substrate 320 may be disposed around the outer circumferential surface of the base 310. The substrate 320 may be electrically connected to the printed circuit board 50 being disposed below the base 310. The substrate 320 may comprise a flexible printed circuit board (FPCB). The substrate 320 may be bent in some parts.

The substrate 320 may comprise a terminal 321. The terminal 321 may be formed at a side surface of the substrate 320. The terminal 321 may be formed at a lower end of the substrate 320. The terminal 321 of the substrate 320 may be electrically connected to the printed circuit board 50 by a solder or a conductive epoxy.

The substrate 320 may comprise a plurality of terminals 321. The plurality of terminals 321 may comprise 16 terminals. The plurality of terminals 321 of the substrate 320 may comprise: four terminals being electrically connected to the driver IC 703; two terminals being connected to the first coil 331; two terminals being connected to the second coil 332; four terminals being connected to the first Hall sensor 701; and four terminals being connected to the second Hall sensor 702. At this time, one terminal being connected to the first Hall sensor 701 may be used in common with the second Hall sensor 702. In this case, the terminals for the first Hall sensor 701 and the second Hall sensor 702 may be formed of seven terminals.

In more detail, the four terminals being electrically connected to the driver IC 703 may comprise SDA, SCL, VDD, and GND terminals. The two terminals being connected to the first coil 331 for driving the OIS-X direction may comprise a (+) terminal and a (−) terminal. The terminal connected to the first Hall sensor 701 may comprise a Hall in (+) terminal/(−) terminal and a Hall out (+) terminal/(−) terminal. The two terminals being connected to the second coil 332 for driving in an OIS-Y direction may comprise a (+) terminal and a (−) terminal. The terminal being connected to the second Hall sensor 702 may comprise a Hall in (+) terminal/(−) terminal and a Hall out (+) terminal/(−) terminal.

The lens driving device 10 may comprise a coil 330. The stator 300 may comprise a coil 330. The coil 330 may be an 'OIS driving coil' used for OIS driving. The coil 330 may be disposed in the base 310. Or, in a modified embodiment, the coil 330 may be disposed in the bobbin 110. In this case, the magnet 120 may be disposed in the base 310. The coil 330 may be disposed between the bobbin 110 and the base 310. The coil 330 may be disposed in a groove or hole being formed at the sidewall 313 of the base 310. The coil 330 may face the magnet 120. The coil 330 may be disposed to face the magnet 120. The coil 330 may electromagnetically interact with the magnet 120. In this case, when a current is supplied to the coil 330 to form an electromagnetic field around the coil 330, the magnet 120 may move with respect to the coil 330 by the electromagnetic interaction between the coil 330 and the magnet 120.

The coil 330 may comprise a plurality of coils. The coil 330 may comprise two coils. The coil 330 may comprise four coils. The coil 330 may comprise a first coil 331 facing the first magnet 121 and a second coil 332 facing the second magnet 122. The coil 330 may comprise two first coils 331 and two second coils 332. The two first coils 331 may be electrically connected to each other through the substrate 320. Or, the two first coils 331 may be electrically isolated from each other. The two second coils 332 may be electrically connected to each other through the substrate 320. Or, the two second coils 332 may be electrically isolated from each other.

The coil 330 may comprise a first coil 331 being disposed in a first direction perpendicular to the optical axis direction, and a second coil 332 being disposed in a second direction perpendicular to the optical axis direction and the first direction. The first coil 331 may move the bobbin 110 in a second direction. The second coil 332 may move the bobbin 110 in a first direction. Or, the first coil 331 may move the bobbin 110 in a first direction. The second coil 332 may move the bobbin 110 in a second direction.

In a first embodiment of the present invention, the magnet 120 and the coil 330 for OIS may be provided in two sets for each direction (OIS-x direction, OIS-y direction). In a first embodiment of the present invention, since there is no AF magnet, the aforementioned OIS magnet may be disposed. In a first embodiment of the present invention, linearity within the OIS driving region can be improved through the aforementioned two-set magnet and coil structure.

In a first embodiment of the present invention, the coil 330 and the magnet 120 may move the bobbin 110 in a direction perpendicular to the optical axis direction through electromagnetic interaction.

The lens driving device 10 may comprise a cover member 340. The stator 300 may comprise a cover member 340. The cover member 340 may comprise a 'cover can'. The cover member 340 may be disposed outside the housing 210. The cover member 340 may be disposed outside the base 310. The cover member 340 may be coupled to the base 310. The cover member 340 may accommodate the housing 210 therein. The cover member 340 may form the outer appearance of the lens driving device 10. The cover member 340 may have a hexahedral shape with an open lower surface. The cover member 340 may be a non-magnetic material. The cover member 340 may be formed of a metal material. The cover member 340 may be formed of a metal plate. The cover member 340 may be connected to the ground portion of the printed circuit board 50. Through this, the cover member 340 may be grounded. The cover member 340 may block electromagnetic interference (EMI). At this time, the cover member 340 may be referred to as an 'EMI shield can'.

The cover member 340 may comprise an upper plate 341 and a side plate 342. The cover member 340 may comprise an upper plate 341 comprising a hole, and a side plate 342 being extended downward from an outer periphery or edge of the upper plate 341. The lower end of the side plate 342 of the cover member 340 may be disposed at a step portion of the base 310. The inner surface of the side plate 342 of the cover member 340 may be fixed to the base 310 by an adhesive.

The lens driving device 10 may comprise a shape memory alloy member 400. The shape memory alloy member 400 may connect the stator 300 and the second mover 200. The shape memory alloy member 400 may connect the base 310 and the housing 210. The shape memory alloy member 400 may connect the substrate 320 and the housing 210. The shape memory alloy member 400 may be coupled to a fixed portion and a moving portion. The shape memory alloy member 400 may move the moving portion in an optical axis direction. The shape memory alloy member 400 has both ends connected to the fixed portion and the central region may be connected to the moving portion.

The shape memory alloy member 400 may be used for AF driving. The shape memory alloy member 400 may move the housing 210 in an optical axis direction. The shape memory alloy member 400 may move the housing 210 with respect to the base 310 in an optical axis direction. At this time, the bobbin 110 may move integrally with the housing 210. The lens module 20 being coupled to the bobbin 110 may also move integrally with the housing 210. Through this, the lens module 20 may be moved in an optical axis direction with respect to the image sensor 60.

The shape memory alloy member 400 may comprise a shape memory alloy (SMA). The shape memory alloy may change shape when an electric current is applied. The shape memory alloy may be changed in length when a current is applied. The shape memory alloy may be reduced in length when a current is applied. The shape memory alloy can be extended in length when a current is applied.

The shape memory alloy member 400 may comprise a first unit shape memory alloy member and a second unit shape memory alloy member. The magnet 120 may comprise a first unit magnet and a second unit magnet. The moving portion may comprise a first corner region being connected to the first unit shape memory alloy member, and a second corner region adjacent to the first corner region. The first unit magnet may be disposed adjacent to the second corner region rather than the first corner region. The driving unit may comprise a first unit driving unit adjacent to the second corner region rather than the first corner region. The moving portion may comprise a first corner region and a third corner region in a diagonal direction. The second unit shape memory alloy member may be connected to the third corner region of the moving portion. The second unit magnet may be disposed adjacent to the second corner region rather than the third corner region.

In a first embodiment of the present invention, the driving unit may comprise first to fourth unit driving units. At this time, the first unit driving unit and the second unit driving unit may be disposed adjacent to the second corner region, and the third unit driving unit and the fourth unit driving unit may be disposed adjacent to the fourth corner region. The first unit driving unit may be disposed closer to the second corner region than to the first corner region. The second unit driving unit may be disposed closer to the second corner region than to the third corner region. The third unit driving unit may be disposed closer to the fourth corner region than to the third corner region. The fourth unit driving unit may be disposed closer to the fourth corner region than to the first corner region.

In a first embodiment of the present invention, the coil 330 and the magnet 120 may be disposed to be biased toward one corner region among both corner regions. That is, the coil 330 and the magnet 120 may be eccentrically disposed. Through this, a space for a predetermined length of the shape memory alloy wire 410 may be secured. In addition, a space for the press-fit structure of the coupling terminal of the shape memory alloy wire 410 may be secured.

In a first embodiment of the present invention, the shape memory alloy wire 410 may have the same length in both sides of the portion being caught by the bobbin 110. In addition, the portion of the bobbin 110 to which the shape memory alloy wire 410 is being caught may be disposed higher than the center of the height of the bobbin 110. At this time, the center of the height of the bobbin 110 may be a point that bisects the upper end of the bobbin 110 and the lower end of the bobbin 110.

The lens driving device 10 may comprise a shape memory alloy wire 410. The shape memory alloy member 400 may comprise a shape memory alloy wire 410. One end and the other end of the shape memory alloy wire 410 may be fixed to the base 310. A portion of the shape memory alloy wire 410 between one end and the other end may be caught by the housing 210. A portion of the shape memory alloy wire 410 may be coupled to the housing 210. The shape memory alloy wire 410 may support the housing 210. The shape memory alloy wire 410 may be disposed so as not to interfere with the coil 3300. One end and the other end of the shape memory alloy wire 410 may be fixed to the substrate 320. The shape memory alloy wire 410 may pull the housing 210 upward. The shape memory alloy wire 410 may move the housing 210 upward in an optical axis direction. The shape memory alloy wire 410 may be reduced in length when a current is applied. The shape memory alloy wire 410 may be disposed in a state in which the center is sagging by a first length (refer to H in FIG. 14) in an initial state in which no current is applied as illustrated in FIG. 14. Thereafter, when a current is applied to the shape memory alloy wire 410, the central portion may move upward so that the amount of sagging is reduced by a second length which is smaller than the first length.

The shape memory alloy wire 410 may comprise a plurality of shape memory alloy wires. The shape memory alloy wire 410 may comprise two shape memory alloy wires. The two shape memory alloy wires may be disposed symmetrically with respect to the optical axis.

The shape memory alloy member 400 may comprise a first fixed portion 411. The shape memory alloy wire 410 may comprise a first fixed portion 411. The first fixed portion 411 may be fixed to the substrate 320. The first fixed portion 411 may be electrically connected to the substrate 320. The first fixed portion 411 may be a conductive member. The first fixed portion 411 may be electrically connected to the shape memory alloy wire 410. The first fixed portion 411 may be fixed to the base 310.

The shape memory alloy member 400 may comprise a second fixed portion 412. The shape memory alloy wire 410 may comprise a second fixed portion 412. The second fixed portion 412 may be fixed to the substrate 320. The second fixed portion 412 may be electrically connected to the substrate 320. The second fixed portion 412 may be a conductive member. The second fixed portion 412 may be electrically connected to the shape memory alloy wire 410. The second fixed portion 412 may be fixed to the base 310.

The shape memory alloy member 400 may comprise a locking portion 413. The shape memory alloy wire 410 may comprise a locking portion 413. The locking portion 413 is a portion of the shape memory alloy wire 410 and may be a portion being caught by the housing 210. The locking portion 413 may be formed in a central portion of the shape memory alloy wire 410. The locking portion 413 may be in direct contact with the housing 210. The locking portion 413 may be fixed to the housing 210. The locking portion 413 may be disposed at a corner region of the housing 210.

The lens driving device 10 may comprise a support member 500. The support member 500 may connect the bobbin 110 and the housing 210. The support member 500 may elastically support the bobbin 110 with respect to the housing 210 when the bobbin 110 moves in a direction perpendicular to the optical axis direction. The support member 500 may have elasticity. The support member 500 may comprise a portion having elasticity. The support member 500 may be elastically restored. The support member 500 may comprise a non-metallic material. The support member 500 may be a non-metal. The support member 500 may be formed of an injection molding product. The support member 500 may comprise an elastomer. The support member 500 may be disposed long in length in an optical axis direction. One end of the support member 500 is fixed to the bobbin 110 and the other end of the support member 500 may be fixed to the housing 210. One end of the support member 500 may be coupled to the bobbin 110, and the other end may be coupled to the moving portion.

The support member 500 may have regions having different widths. The width of the first portion of the support member 500 may be different from the width of the other portion. The support member 500 may have regions having different thicknesses. At this time, the width or thickness may be a length in a direction perpendicular to the optical axis direction. The width of the peripheral region of the support member 500 may be thicker than the central region. The support member 500 has a head portion and a body portion, and the width of the head portion may be greater than the width of the body portion.

The support member 500 may have greater strength than a metal wire. The support member 500 may have a greater tensile strength than the metal wire.

In a modified embodiment, the width of the support member 500 may be kept constant in a lengthwise direction. The support member 500 may have a constant thickness in a lengthwise direction.

In a modified embodiment, the upper surface of the support member 500 is coupled with the bobbin 110 and the lower surface thereof may be coupled with the housing 210. At this time, the concave portion of the support member 500 may be spaced apart from the bobbin 110 and the housing 210. The bobbin 110 comprises a wing portion being protruded from an outer circumferential surface of the bobbin 110, and the upper surface of the support member 500 may be coupled to the wing portion of the bobbin 110. The housing 210 may comprise a wing portion being protruded from an inner circumferential surface of the housing 210, and a lower surface of the support member 500 may be coupled to the wing portion of the housing 210.

The support member 500 may comprise a body portion 510. The body portion 510 may be disposed between the first and second concave portions 520 and 530. The body portion 510 may comprise a portion that becomes wider as it goes away from the first and second concave portions 520 and 530. The body portion 510 may comprise a first portion, a second portion, and a third portion connecting the first portion and the second portion and being formed to have a width wider than the width of the first portion and the second portion. The body portion 510 may be formed to have the largest width at the central portion. The outer surface of the body portion 510 may comprise a curved surface. The outer surface of the body portion 510 may be formed only with a curved surface. The body portion 510 may be formed to have a curvature.

The support member 500 may comprise a first concave portion 520. The first concave portion 520 may be formed to have a narrower width than the body portion 510. The width of the first concave portion 520 may be a width of the support member 500 in a direction perpendicular to the lengthwise. The first concave portion 520 of the support member 500 may be coupled to the bobbin 110. The first concave portion 520 may be disposed at a higher position than the second concave portion 530. The first concave portion 520 may be coupled to the groove 111 of the bobbin 110. The first concave portion 520 may be inserted into the groove 111 of the bobbin 110. The first concave portion 520 may be fixed to the groove 111 of the bobbin 110.

The support member 500 may comprise a second concave portion 530. The second concave portion 530 may be formed to have a narrower width than the body portion 510. The width of the second concave portion 530 may be a width of the support member 500 in a direction perpendicular to the lengthwise direction. The second concave portion 530 of the support member 500 may be coupled to the housing 210. The second concave portion 530 may be coupled to the groove 211 of the housing 210. The second concave portion 530 may be inserted into the groove 211 of the housing 210. The second concave portion 530 may be fixed to the groove 211 of the housing 210.

The width of the concave portions 520 and 530 of the support member 500 may be 10% to 70% of the width of the fixed portions 540 and 550. The width of the concave portions 520 and 530 of the support member 500 may be 20% to 40% of the width of the fixed portions 540 and 550. The concave portions 520 and 530 of the support member 500 may be extended from the fixed portions 540 and 550. In a modified embodiment, the concave portions 520 and 530 of the support member 500 may be spaced apart from the bobbin 110 and the housing 210.

The support member 500 may comprise a first fixed portion 540. The first fixed portion 540 may be extended from the first concave portion 520 to the opposite side of the body portion 510. The first fixed portion 540 may be formed to have a wider width than the first concave portion 520. The first fixed portion 540 may be caught at the upper surface of the bobbin 110. The first fixed portion 540 may be fixed to the bobbin 110.

The support member 500 may comprise a second fixed portion 550. The second fixed portion 550 may be extended from the second concave portion 530 to the opposite side of the body portion 510. The second fixed portion 550 may be formed to have a wider width than the second concave portion 530. The second fixed portion 550 may be caught at the lower surface of the housing 210. The second fixed portion 550 may be fixed to the housing 210.

In a modified embodiment, the lens driving device 10 may comprise a support member 1500 according to a second embodiment of the present invention. The support member 1500 may connect the housing 210 and the bobbin 110. The support member 1500 may support the bobbin 110 with respect to the housing 210 when the bobbin 110 moves in an optical axis direction. The support member 1500 may have elasticity. The support member 1500 may comprise a portion having elasticity. The support member 1500 may be elastically restored. The support member 1500 may be formed of an elastomer. One end of the support member 1500 may be fixed to the bobbin 110 and the other end of the support member 1500 may be fixed to the housing 210. A portion of the support member 1500 may be attached to the bobbin 110. The adhesive may be disposed in the groove of the bobbin 110. The other part of the support member 1500 may be attached to the housing 210. The adhesive may be disposed in the groove of the housing 210.

Furthermore, in a modified embodiment, the lens driving device 10 may comprise some configurations of a second embodiment of the present invention replacing some configurations of the first embodiment of the present invention.

The lens driving device 10 may comprise an elastic member 600. The elastic member 600 may have elasticity. The elastic member 600 may comprise a portion having elasticity. The elastic member 600 may be elastically restored. The elastic member 600 may be disposed in the housing 210. The elastic member 600 may be disposed between the housing 210 and the upper plate 341 of the cover member 340. The elastic member 600 may press the housing 210 downward in an optical axis direction through elasticity. Through this, the housing 210 may be maintained while being firmly attached to the shape memory alloy wire 410. The elastic member 600 may be a coil spring. At least a portion of the elastic member 600 may be inserted into the groove 217 formed at an upper surface of the housing 210.

The lens driving device 10 may comprise a first Hall sensor 701. The first Hall sensor 701 may detect the first magnet 121. The first Hall sensor 701 may detect a magnetic force of the first magnet 121. The first Hall sensor 701 may comprise a Hall element. The first Hall sensor 701 may be disposed in the substrate 320. The first Hall sensor 701 may be electrically connected to the substrate 320. The first Hall sensor 701 may be disposed inside the first coil 331. The first Hall sensor 701 may detect the movement of the first magnet 121. The first Hall sensor 701 may detect movement of the bobbin 110 in a first direction perpendicular to the optical axis direction. Or, the first Hall sensor 701 may detect a movement of the bobbin 110 in a second direction perpendicular to the optical axis direction. The position and/or movement of the bobbin 110 detected through the first Hall sensor 701 may be used for feedback control in OIS driving of the bobbin 110.

The lens driving device 10 may comprise a second Hall sensor 702. The second Hall sensor 702 may detect the second magnet 122. The second Hall sensor 702 may comprise a Hall element. The second Hall sensor 702 may be disposed in the substrate 320. The second Hall sensor 702 may be electrically connected to the substrate 320. The second Hall sensor 702 may be disposed inside the second coil 332. The second Hall sensor 702 may detect the movement of the second magnet 122. The second Hall sensor 702 may detect movement of the bobbin 110 in a second direction perpendicular to the optical axis direction. Or, the second Hall sensor 702 may detect a movement of the bobbin 110 in a first direction perpendicular to the optical axis direction. The second Hall sensor 702 may detect the movement component in a direction different from that of the first Hall sensor 701 during movement of the bobbin 110. The position and/or movement of the bobbin 110 detected through the second Hall sensor 702 may be used for feedback control in OIS driving of the bobbin 110.

The lens driving device 10 may comprise a driver IC 703. The driver IC 703 may control a current being applied to the shape memory alloy member 400. The driver IC 703 may be electrically connected to the shape memory alloy member 400. The driver IC 703 may be disposed in the substrate 320. The driver IC 703 may be electrically connected to the substrate 320. The base 310 may comprise a groove or hole having a shape corresponding to that of the driver IC 703. The driver IC 703 may be disposed in a groove or hole of the base 310. In a modified embodiment, the driver IC 703 may be disposed in the printed circuit board 50. The driver IC 703 may be electrically connected to the coil 120 to control a current applied to the coil 120.

A first embodiment of the present invention uses SMA during AF driving, and a support member formed of a hinge can be used during OIS driving. Through this, a reliability advantage can be obtained, and it can be applied to actuators that drive large aperture, heavy-duty lenses.

In a first embodiment of the present invention, it may be driven by connecting the housing 210 and the base 310 with a shape memory alloy wire 410. At this time, in order to secure the length of the shape memory alloy wire 410, that is, to secure a larger stroke, the shape memory alloy wire 410 may be connected to the housing 210 in a 90 degree direction. In a first embodiment of the present invention, the magnet 120 may be disposed so that the AF and OIS space can be secured.

Hereinafter, a camera module according to a first embodiment of the present invention will be described with reference to the drawings.

Figure 18:
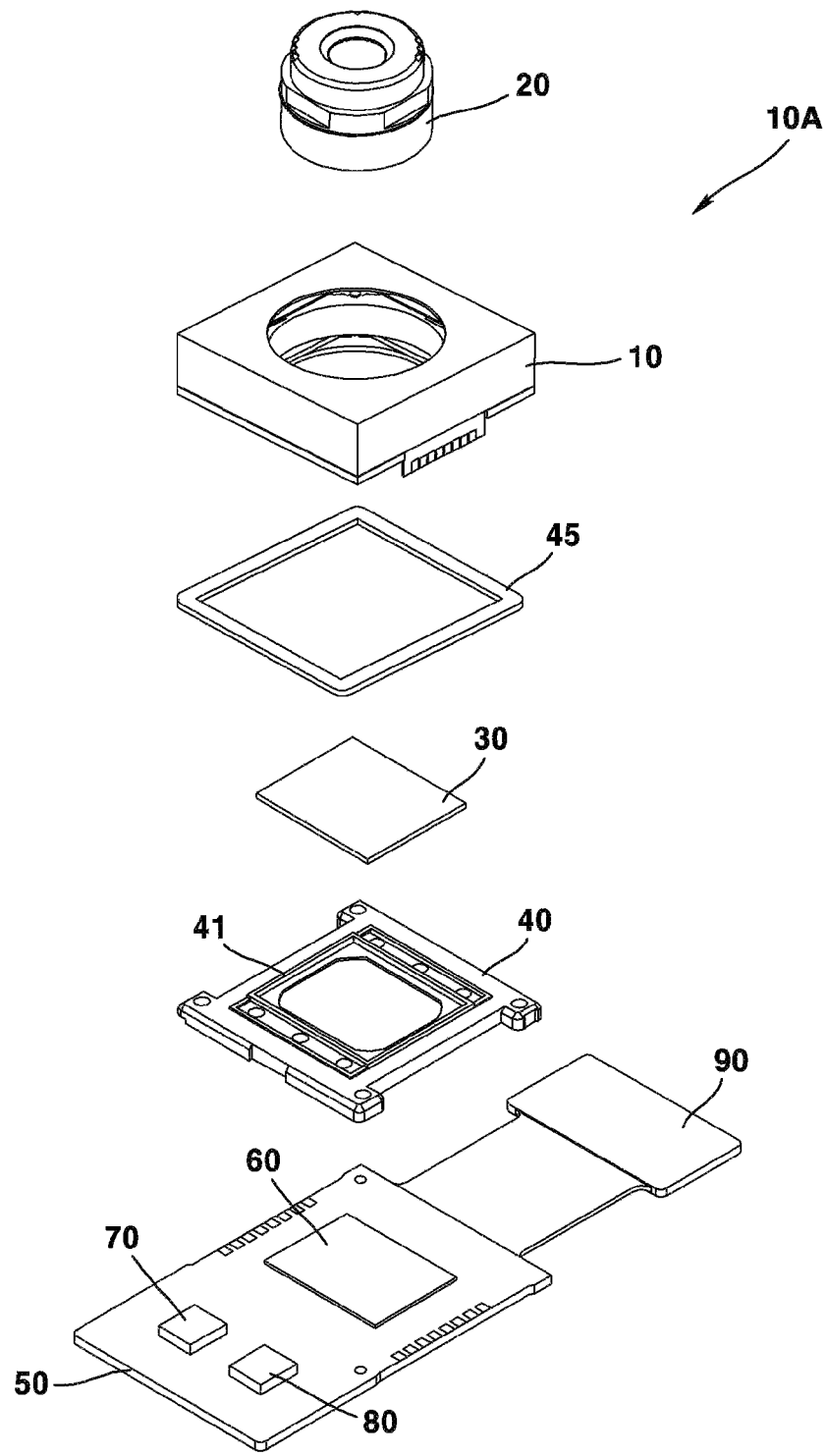
FIG. 18 is an exploded perspective view of the camera device according to a first embodiment of the present invention.

FIG. 18 is an exploded perspective view of the camera device according to a first embodiment of the present invention.

The camera module 10A may comprise a camera device.

The camera module 10A may comprise a lens module 20. The lens module 20 may comprise at least one lens. The lens may be disposed at a position corresponding to the image sensor 60. The lens module 20 may comprise a lens and a barrel. The lens module 20 may be coupled to the bobbin 110 of the lens driving device 10. The lens module 20 may be coupled to the bobbin 110 by screw-coupling and/or adhesive. The lens module 20 may move integrally with the bobbin 110.

The camera module 10A may comprise a filter 30. The filter 30 may serve to block light of a specific frequency band among the light passing through the lens module from being incident on the image sensor 60. The filter 30 may be disposed parallel to the x-y plane. The filter 30 may be disposed between the lens module 20 and the image sensor 60. A filter 30 may be disposed on the sensor base 40. In a modified embodiment, the filter 30 may be placed in the base 310. The filter 30 may comprise an infrared filter. The infrared filter may block light in the infrared region from being incident on the image sensor 60.

The camera module 10A may comprise a sensor base 40. The sensor base 40 may be disposed between the lens driving device 10 and the printed circuit board 50. The sensor base 40 may comprise a protrusion 41 in which the filter 30 is disposed. An opening may be formed in a portion of the sensor base 40 where the filter 30 is disposed so that light passing through the filter 30 may be incident on the image sensor 60. The adhesive member 45 may couple or attach the base 310 of the lens driving device 10 to the sensor base 40. The adhesive member 45 may additionally serve to prevent foreign substances from entering the inside of the lens driving device 10. The adhesive member 45 may comprise any one or more among an epoxy, a thermosetting adhesive, and an ultraviolet curable adhesive.

The camera module 10A may comprise a printed circuit board (PCB) 50. The printed circuit board 50 may be a substrate or a circuit board. A lens driving device 10 may be disposed in the printed circuit board 50. A sensor base 40 may be disposed between the printed circuit board 50 and the lens driving device 10. The printed circuit board 50 may be electrically connected to the lens driving device 10. The image sensor 60 may be disposed in the printed circuit board 50. The printed circuit board 50 may comprise various circuits, elements, control units, and the like to convert an image being formed in the image sensor 60 into an electric signal and transmit it to an external device.

The camera module 10A may comprise an image sensor 60. The image sensor 60 may have a configuration in which light passing through the lens and filter 30 is incident to form an image. The image sensor 60 may be mounted on the printed circuit board 50. The image sensor 60 may be electrically connected to the printed circuit board 50. For example, the image sensor 60 may be coupled to the printed circuit board 50 by a surface mounting technology (SMT). As another example, the image sensor 60 may be coupled to the printed circuit board 50 by a flip chip technology. The image sensor 60 may be disposed so that the lens and the optical axis coincide. That is, the optical axis of the image sensor 60 and the optical axis of the lens may be aligned. The image sensor 60 may convert light irradiated to the effective image region of the image sensor 60 into an electrical signal. The image sensor 60 may be any one among a charge coupled device (CCD), a metal oxide semi-conductor (MOS), a CPD, and a CID.

The camera module 10A may comprise a motion sensor 70. The motion sensor 70 may be mounted in the printed circuit board 50. The motion sensor 70 may be electrically connected to the control unit 80 through a circuit pattern provided to the printed circuit board 50. The motion sensor 70 may output rotational angular velocity information due to the movement of the camera module 10A. The motion sensor 70 may comprise a 2-axis or 3-axis gyro sensor, or an angular velocity sensor.

The camera module 10A may comprise a control unit 80. The control unit 80 may be disposed in the printed circuit board 50. The control unit 80 may be electrically connected to the coil 330 of the lens driving device 10. The control unit 80 may individually control the direction, intensity, and amplitude of the current supplied to the coil 330. The control unit 80 may control the lens driving device 10 to perform an autofocus function and/or an image stabilization function. Furthermore, the control unit 80 may perform autofocus feedback control and/or handshake correction feedback control for the lens driving device 10.

The camera module 10A may comprise a connector 90. The connector 90 may be electrically connected to the printed circuit board 50. The connector 90 may comprise a port for electrically connecting to an external device.

Hereinafter, an optical device according to a first embodiment of the present invention will be described with reference to the drawings.

Figure 19:
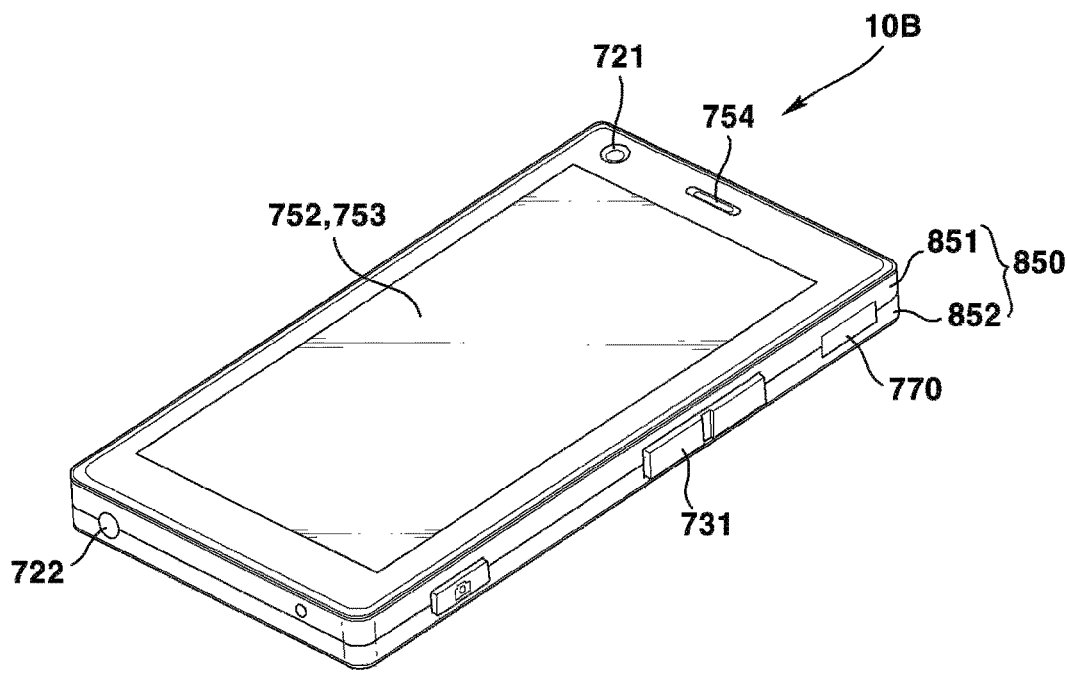
FIG. 19 is a perspective view illustrating an optical device according to a first embodiment of the present invention.
Figure 20:
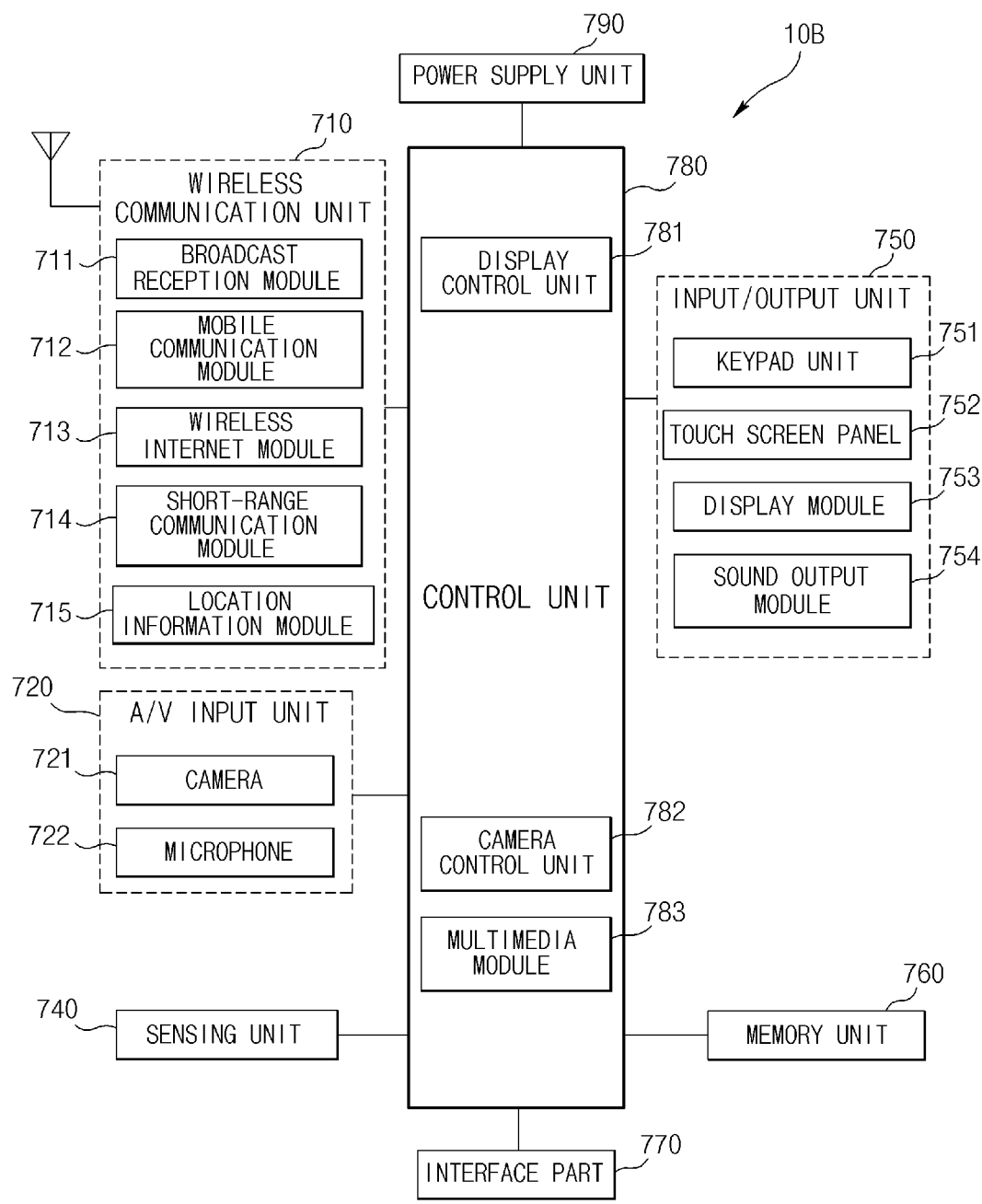
FIG. 20 is a block diagram of an optical device according to a first embodiment of the present invention.

FIG. 19 is a perspective view illustrating an optical device according to a first embodiment of the present invention; and FIG. 20 is a block diagram of an optical device according to a first embodiment of the present invention.

The optical device 10B may comprise a portable terminal. The optical device 10B may be any one among a hand phone, a portable phone, a smart phone, a portable smart device, a digital camera, a laptop computer, a digital broadcasting terminal, a personal digital assistant (PDA), a portable multimedia player (PMP), and navigation. However, the type of the optical device 10B is not limited thereto, and any device for photographing a video or a picture may be comprised in the optical device 10B.

The optical device 10B may comprise a main body 850. The main body 850 may have a bar shape. Or, the main body 850 may have various structures, such as a slide type, a folder type, a swing type, a swivel type, and the like in which two or more sub-bodies are coupled to be relatively movable. The main body 850 may comprise a case (casing, housing, and cover) forming an outer appearance. For example, the main body 850 may comprise a front case 851 and a rear case 852. Various electronic components of the optical device 10B may be embedded in a space formed between the front case 851 and the rear case 852. A display module 753 may be disposed on one surface of the main body 850. A camera 721 may be disposed on one or more surfaces of one surface and the other surface being disposed at an opposite side of the one surface of the main body 850.

The optical device 10B may comprise a wireless communication unit 710. The wireless communication unit 710 may comprise one or more modules enabling wireless communication between the optical device 10B and the wireless communication system, or between the optical device 10B and the network in which the optical device 10B is located. For example, the wireless communication unit 710 may comprise any one or more among a broadcast reception module 711, a mobile communication module 712, a wireless Internet module 713, a short-range communication module 714, and a location information module 715.

The optical device 10B may comprise an A/V input unit 720. The A/V input unit 720 is for inputting an audio signal or a video signal and may comprise any one or more of a camera 721 and a microphone 722. At this time, the camera 721 may comprise a camera module 10A according to the present embodiment.

The optical device 10B may comprise a sensing unit 740. The sensing unit 740 may generate a sensing signal for controlling the operation of the optical device 10B by detecting the current state of the optical device 10B such as the opening/closing state of the optical device 10B, the position of the optical device 10B, the presence or absence of user contact, the orientation of the optical device 10B, acceleration/deceleration of the optical device 10B, and the like. For example, when the optical device 10B is in the form of a slide phone, it is possible to sense whether the slide phone is opened or closed. In addition, it is responsible for sensing functions related to whether the power supply unit 790 is supplied with power, whether the interface unit 770 is coupled to an external device, and the like.

The optical device 10B may comprise an input/output unit 750. The input/output unit 750 may be configured to generate an input or output related to visual, auditory, or tactile sense. The input/output unit 750 may generate input data for controlling the operation of the optical device 10B, and may output information processed by the optical device 10B.

The input/output unit 750 may comprise any one or more among a keypad unit 751, a touch screen panel 752, a display module 753, and a sound output module 754. The keypad unit 751 may generate input data in response to a keypad input. The touch screen panel 752 may convert a change in capacitance generated due to a user's touch on a specific region of the touch screen into an electrical input signal. The display module 753 may output an image photographed by the camera 721. The display module 753 may comprise a plurality of pixels whose color changes according to an electrical signal. For example, the display module 753 may comprise at least one among a liquid crystal display, a thin film transistor liquid crystal display, an organic light emitting diode, a flexible display, and a 3D display. The sound output module 754 may output audio data received from the wireless communication unit 710 in a call signal reception, a call mode, a recording mode, a voice recognition mode, or a broadcast reception mode, or stored in the memory unit 760.

The optical device 10B may comprise a memory unit 760. A program for processing and controlling the control unit 780 may be stored in the memory unit 760. In addition, the memory unit 760 may store input/output data, for example, any one or more of a phone book, a message, an audio, a still image, a photo, and a moving picture. The memory unit 760 may store an image photographed by the camera 721, for example, a photo or a video.

The optical device 10B may comprise an interface unit 770. The interface unit 770 serves as a path for connecting to an external device being connected to the optical device 10B. The interface unit 770 may receive data from an external device, receive power and transmit it to each component inside the optical device 10B, or transmit data inside the optical device 10B to the external device. The interface unit 770 may comprise any one or more among a wired/wireless headset port, an external charger port, a wired/wireless data port, a memory card port, a port for connecting a device equipped with an identification module, and an audio I/O port, a video I/O port, and an earphone port.

The optical device 10B may comprise a control unit 780. The control unit 780 may control the overall operation of the optical device 10B. The control unit 780 may perform related control and processing for voice call, data communication, video call, and the like. The control unit 780 may comprise a display control unit 781 that controls a display module 753 that is a display of the optical device 10B. The control unit 780 may comprise a camera control unit 782 that controls the camera module. The control unit 780 may comprise a multimedia module 783 for playing multimedia. The multimedia module 783 may be provided inside the control unit 180 or may be provided separately from the control unit 780. The control unit 780 may perform a pattern recognition process capable of recognizing a handwriting input or a drawing input performed on the touch screen as characters and images, respectively.

The optical device 10B may comprise a power supply unit 790. The power supply unit 790 may receive external power or internal power by the control of the control unit 780 to supply power required for operation of each component.

Hereinafter, a configuration of a lens driving device according to a second embodiment of the present invention will be described with reference to the drawings.

Figure 21:
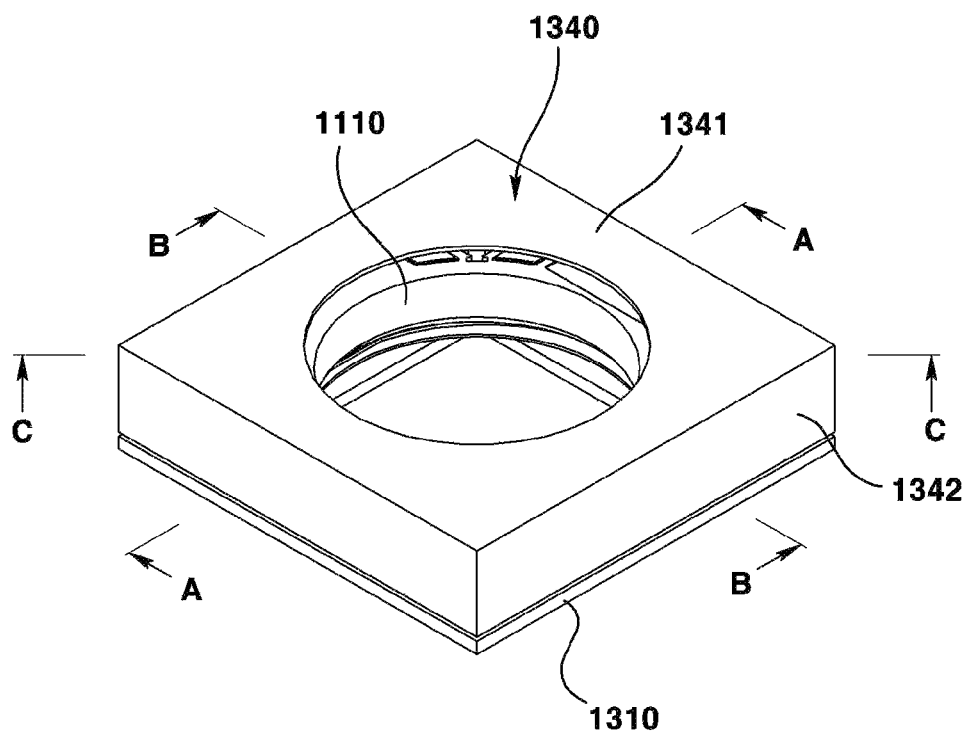
FIG. 21 is a perspective view of a lens driving device according to a second embodiment of the present invention.
Figure 22:
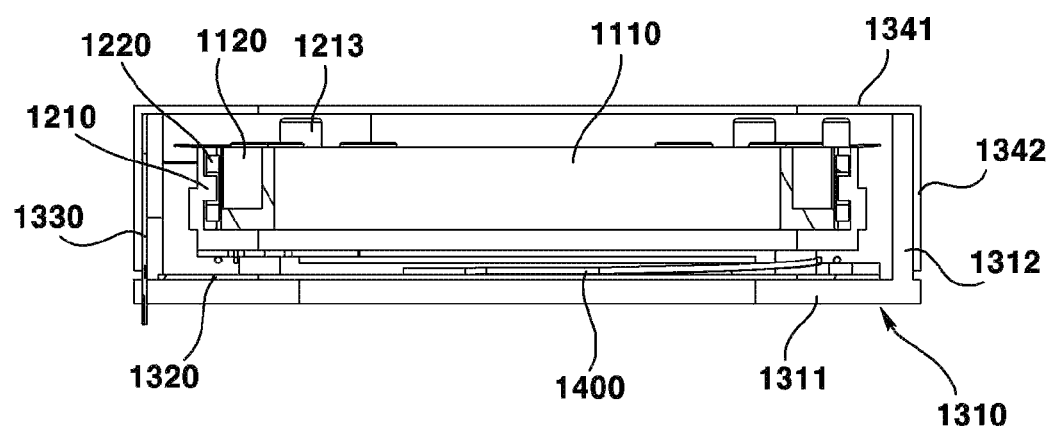
FIG. 22 is a cross-sectional view taken along line A-A of FIG. 21.
Figure 23:
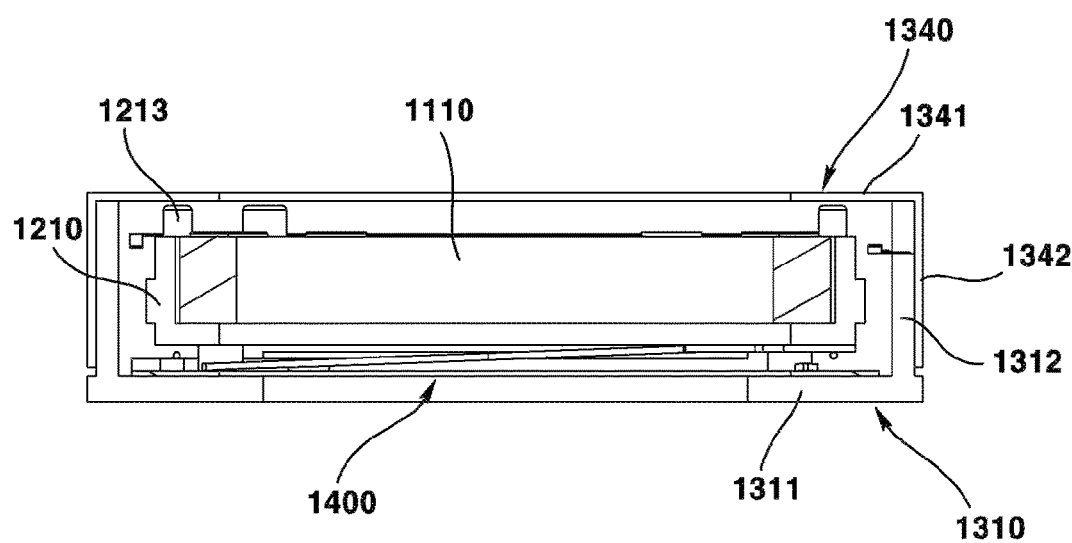
FIG. 23 is a cross-sectional view taken along line B-B of FIG. 21.
Figure 24A:
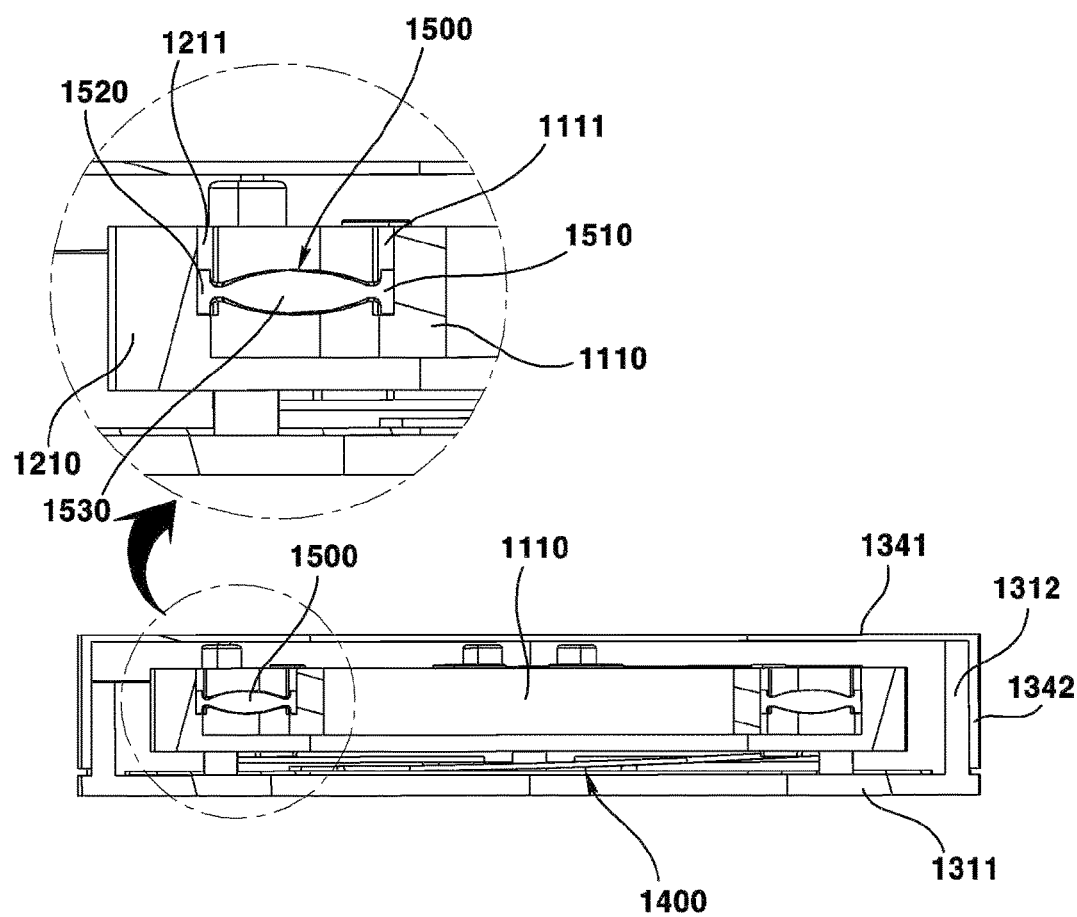
FIG. 24a is a cross-sectional view taken along line C-C of FIG. 21 and a partially enlarged view.
Figure 24B:
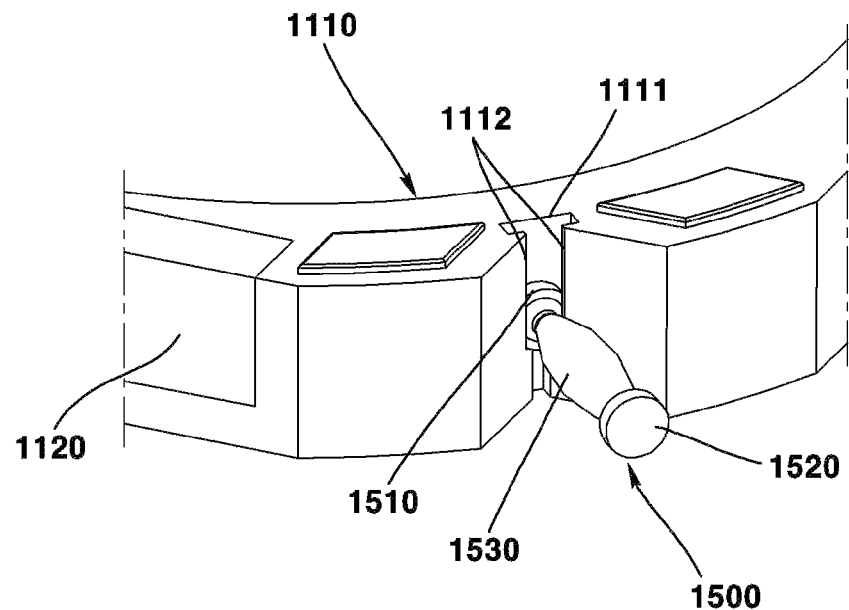
FIG. 24b is an enlarged view illustrating the coupling structure of a support member and a bobbin according to a second embodiment of the present invention.
Figure 24C:
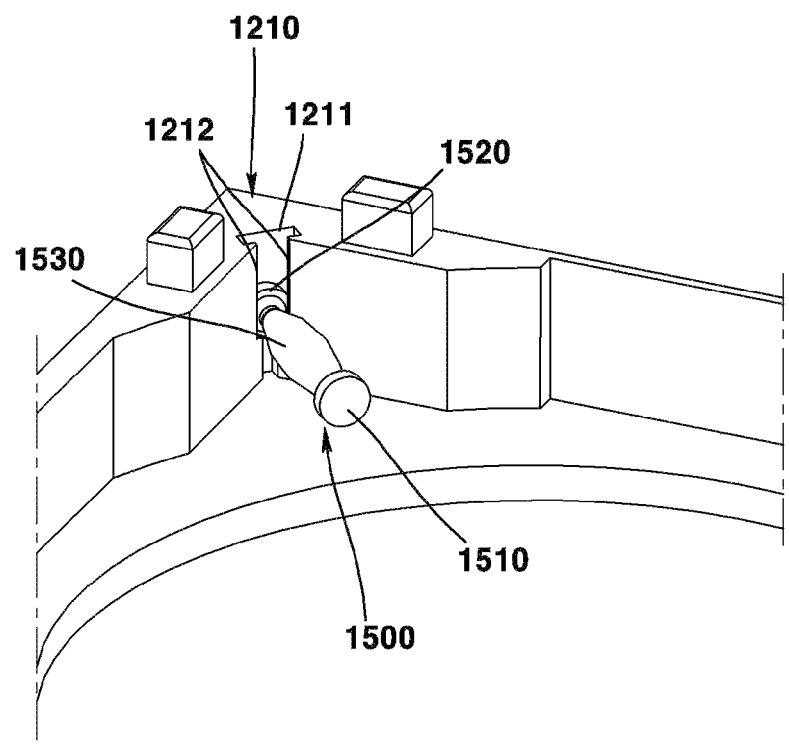
FIG. 24c is an enlarged view illustrating the coupling structure of a support member and a housing according to a second embodiment of the present invention.
Figure 24D:
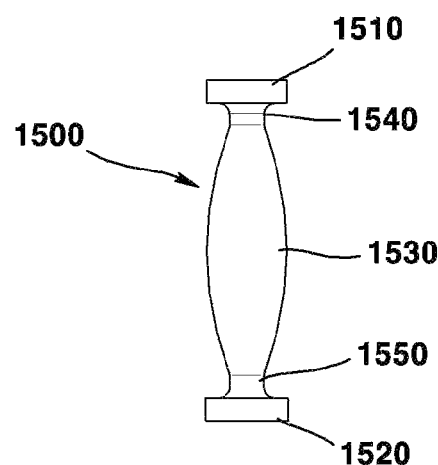
FIG. 24d is a plan view of a support member according to a second embodiment of the present invention.
Figure 24E:
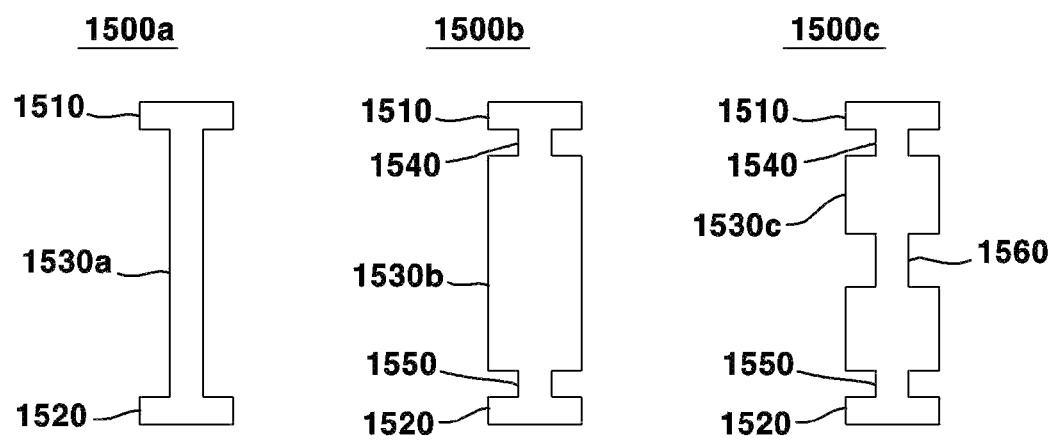
FIG. 24e is a plan view of a support member according to a modified embodiment.
Figure 25:
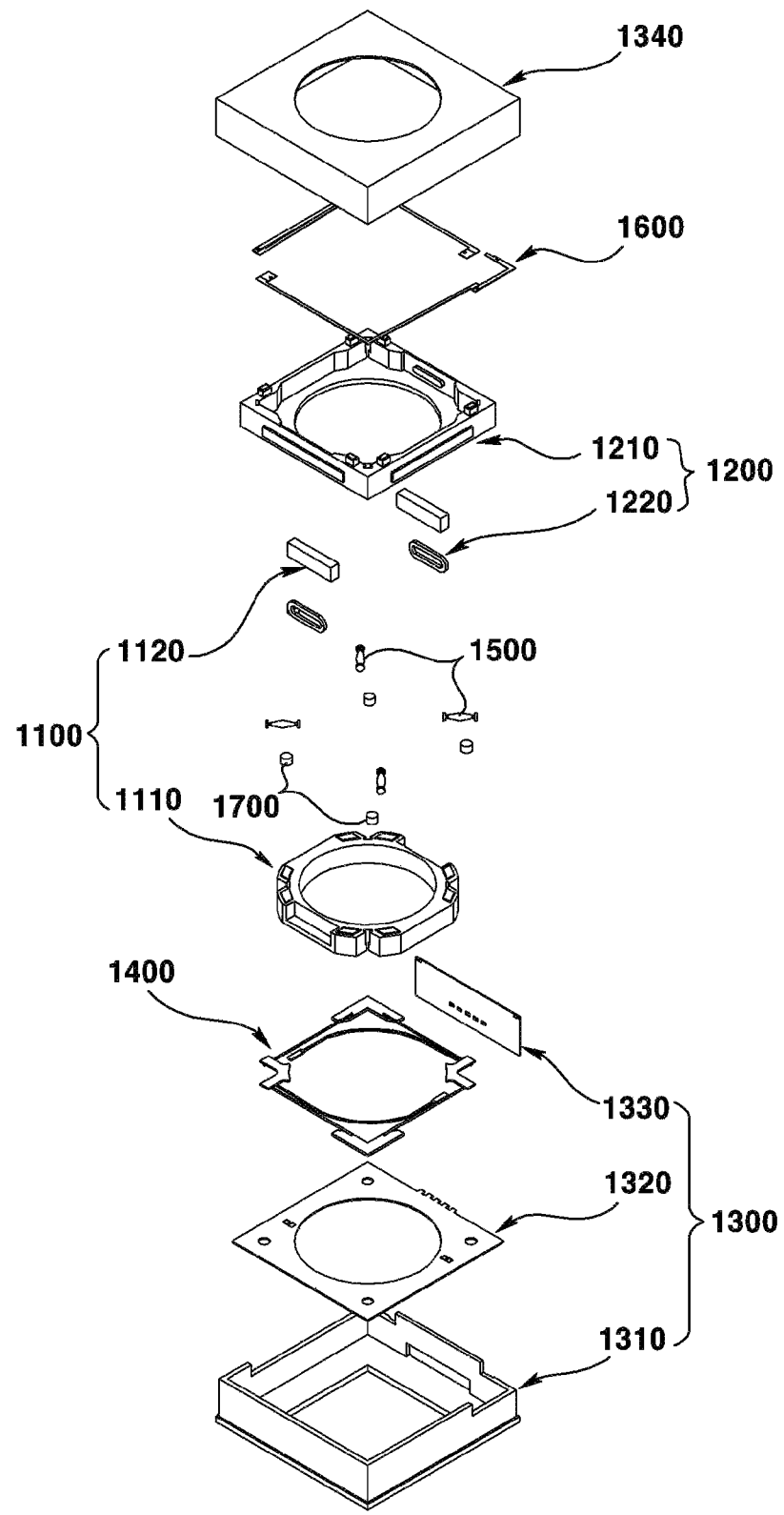
FIG. 25 is an exploded perspective view of a lens driving device according to a second embodiment of the present invention.
Figure 26:
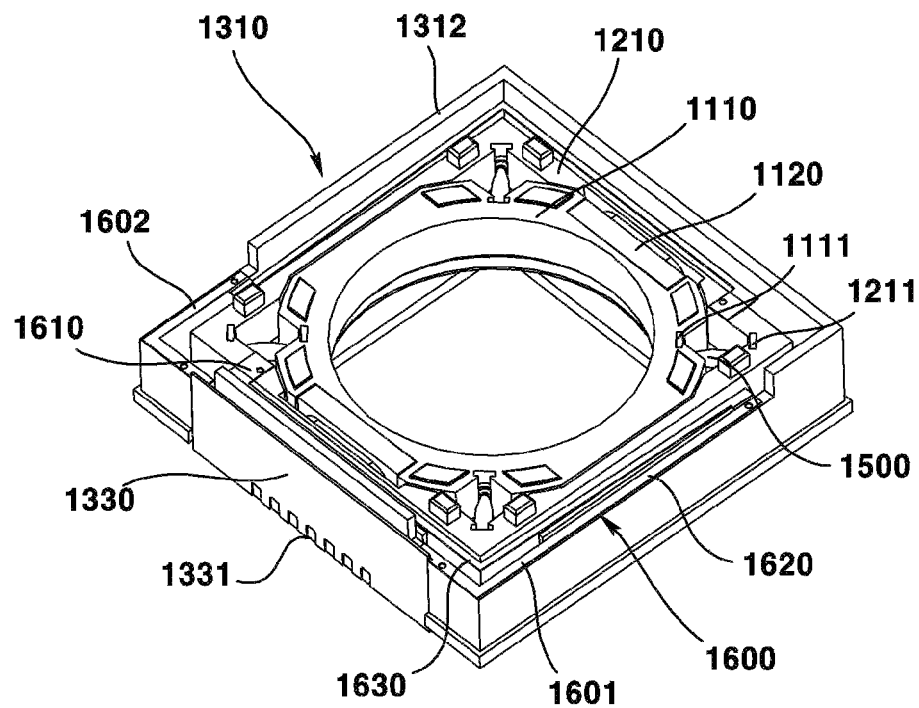
FIG. 26 is a perspective view illustrating a state in which a cover member of a lens driving device according to a second embodiment of the present invention is removed.
Figure 27:
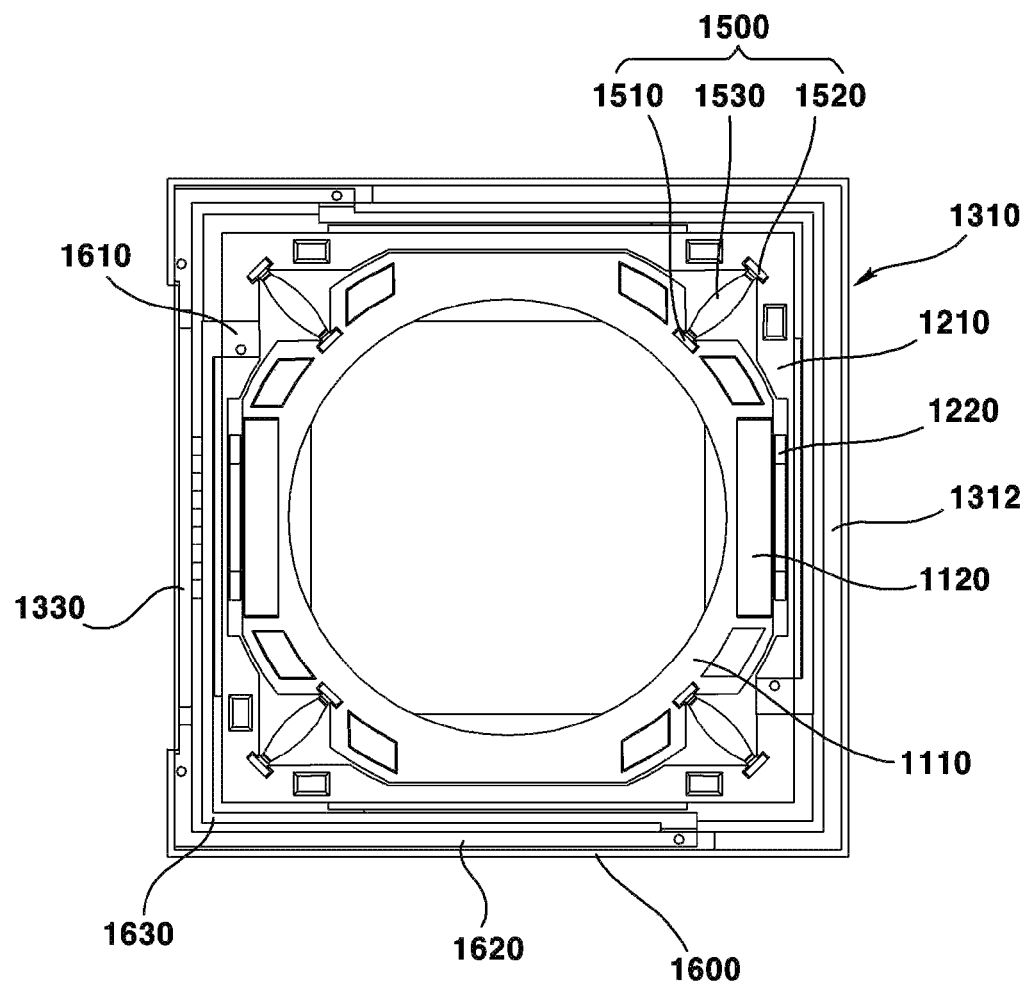
FIG. 27 is a plan view illustrating a state in which a cover member of a lens driving device according to a second embodiment of the present invention is removed.
Figure 28:
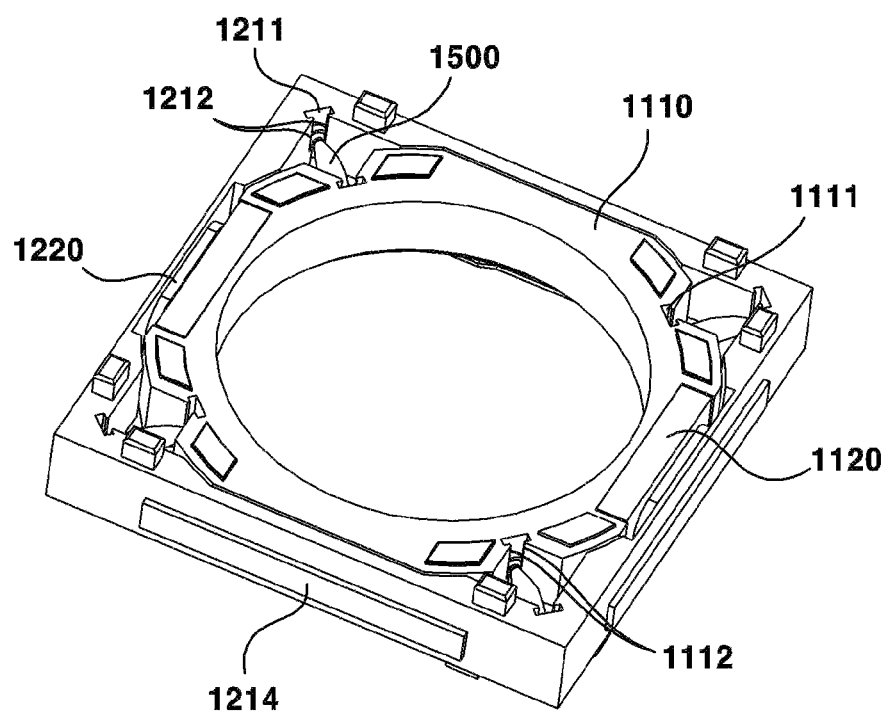
FIG. 28 is a perspective view illustrating a first mover and a second mover of a lens driving device according to a second embodiment of the present invention.
Figure 29:
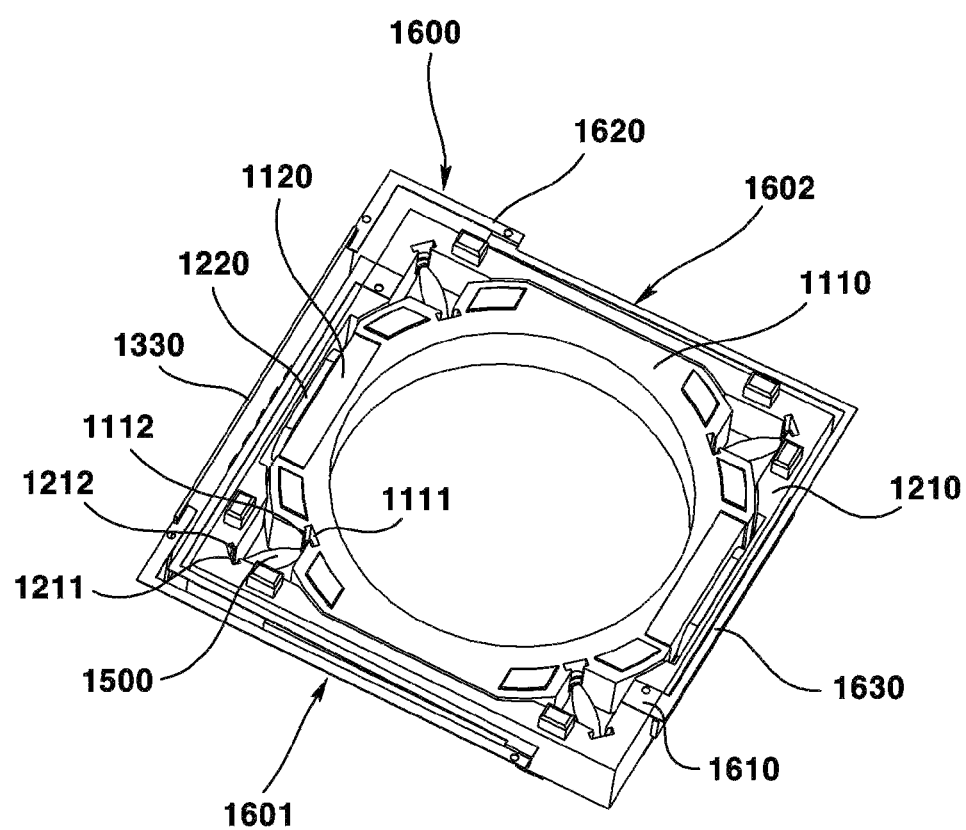
FIG. 29 is a perspective view illustrating a coupling state of a first mover, a second mover, an elastic member, and a second substrate of a lens driving device according to a second embodiment of the present invention.
Figure 30:
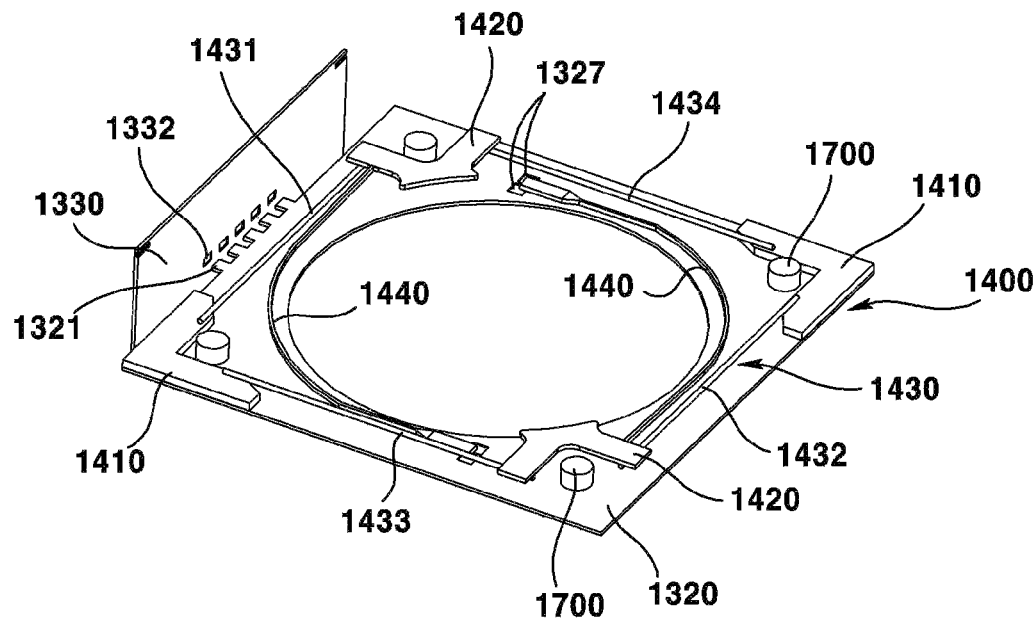
FIG. 30 is a perspective view illustrating a first substrate, a second substrate, and a shape memory alloy member of the lens driving device according to a second embodiment of the present invention.
Figure 31A:
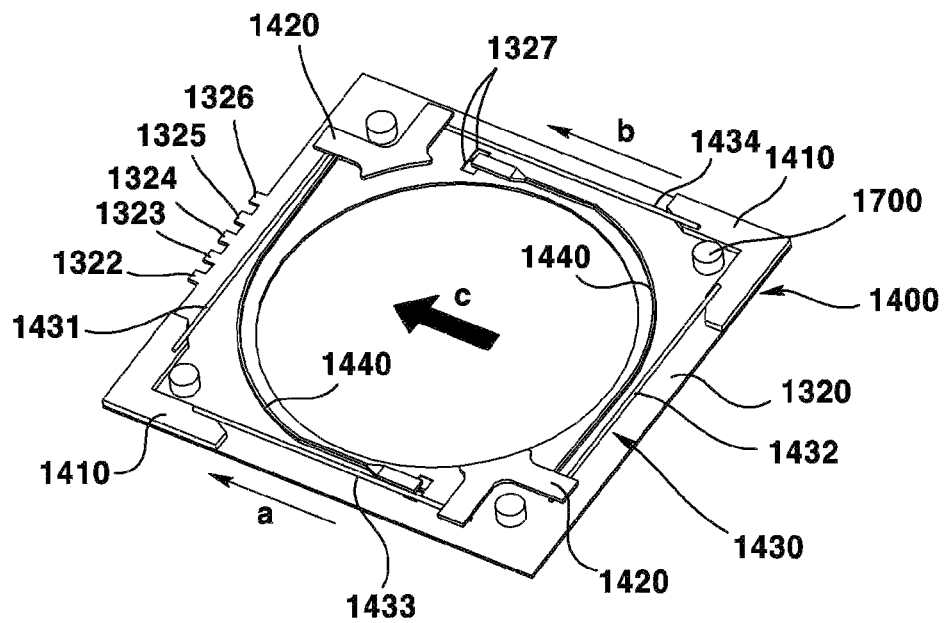
FIG. 31a is a view for explaining the driving of a shape memory alloy member of a lens driving device according to a second embodiment of the present invention.
Figure 31B:
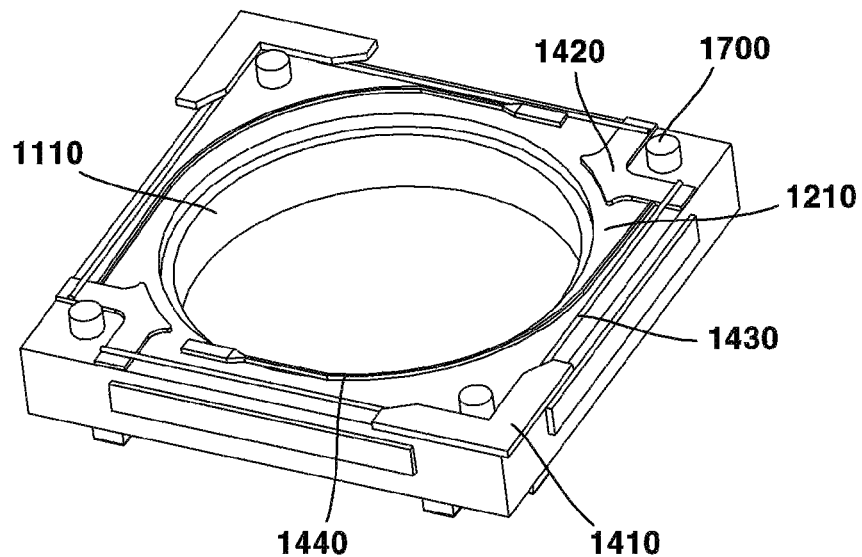
FIG. 31b is a view illustrating a coupling structure of a shape memory alloy member and a housing according to a second embodiment of the present invention.
Figure 32:
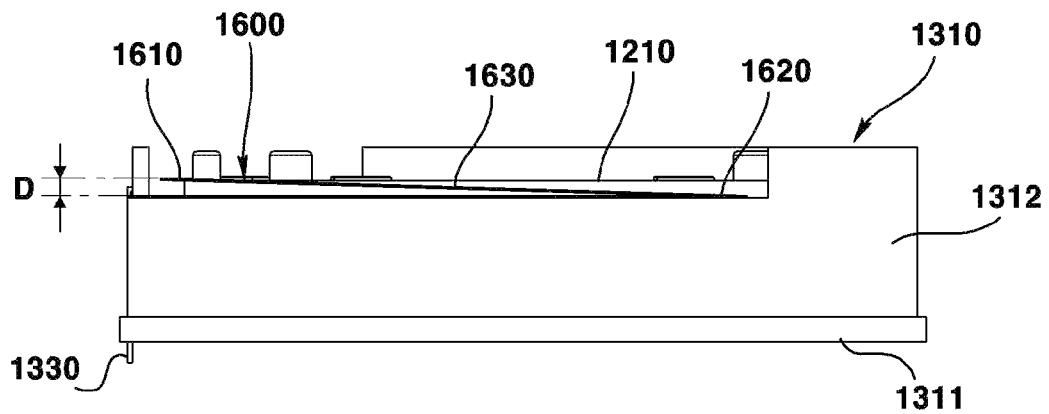
FIG. 32 is a side view illustrating a state in which a cover member of a lens driving device according to the second embodiment of the present invention is removed.
Figure 33:
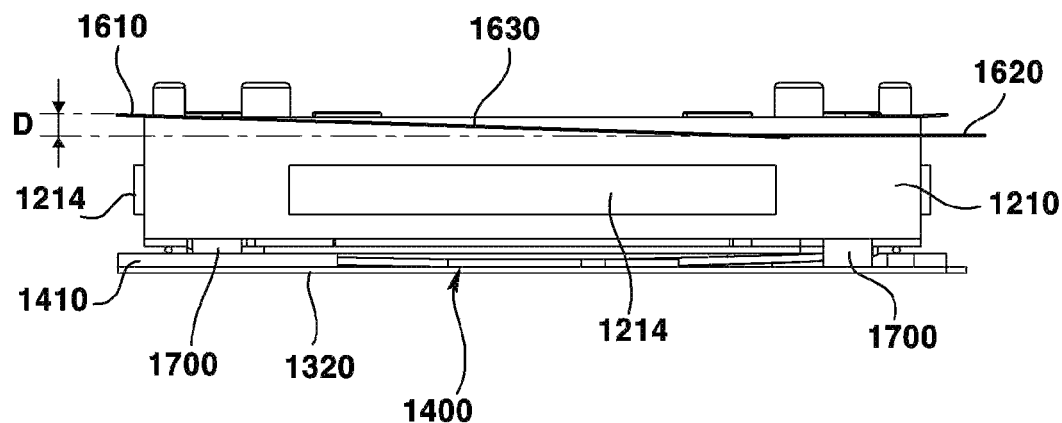
FIG. 33 is a view for explaining a housing, a bearing, and related structures of a lens driving device according to a second embodiment of the present invention.
Figure 34:
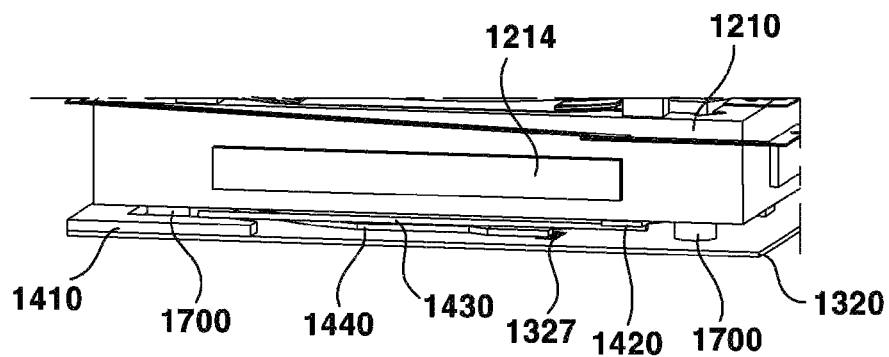
FIG. 34 is a view for explaining the coupling structure of a shape memory alloy member of a lens driving device according to a second embodiment of the present invention.

FIG. 21 is a perspective view of a lens driving device according to a second embodiment of the present invention; FIG. 22 is a cross-sectional view taken along line A-A of FIG. 21; FIG. 23 is a cross-sectional view taken along line B-B of FIG. 21; FIG. 24a is a cross-sectional view taken along line C-C of FIG. 21 and a partially enlarged view; FIG. 24b is an enlarged view illustrating the coupling structure of a support member and a bobbin according to a second embodiment of the present invention; FIG. 24c is an enlarged view illustrating the coupling structure of a support member and a housing according to a second embodiment of the present invention; FIG. 24d is a plan view of a support member according to a second embodiment of the present invention; FIG. 24e is a plan view of a support member according to a modified embodiment; FIG. 25 is an exploded perspective view of a lens driving device according to a second embodiment of the present invention; FIG. 26 is a perspective view illustrating a state in which a cover member of a lens driving device according to a second embodiment of the present invention is removed; FIG. 27 is a plan view illustrating a state in which a cover member of a lens driving device according to a second embodiment of the present invention is removed; FIG. 28 is a perspective view illustrating a first mover and a second mover of a lens driving device according to a second embodiment of the present invention; FIG. 29 is a perspective view illustrating a coupling state of a first mover, a second mover, an elastic member, and a second substrate of a lens driving device according to a second embodiment of the present invention; FIG. 30 is a perspective view illustrating a first substrate, a second substrate, and a shape memory alloy member of the lens driving device according to a second embodiment of the present invention; FIG. 31a is a view for explaining the driving of a shape memory alloy member of a lens driving device according to a second embodiment of the present invention; FIG. 31b is a view illustrating a coupling structure of a shape memory alloy member and a housing according to a second embodiment of the present invention; FIG. 32 is a side view illustrating a state in which a cover member of a lens driving device according to the second embodiment of the present invention is removed; FIG. 33 is a view for explaining a housing, a bearing, and related structures of a lens driving device according to a second embodiment of the present invention; and FIG. 34 is a view for explaining the coupling structure of a shape memory alloy member of a lens driving device according to a second embodiment of the present invention.

The lens driving device 1010 may be a voice coil motor (VCM). The lens driving device 1010 may be a lens driving motor. The lens driving device 1010 may be a lens driving actuator. The lens driving device 1010 may comprise an AF module. The lens driving device 1010 may comprise an OIS module.

The lens driving device 1010 may comprise a first mover 1100. The first mover 1100 may be coupled with a lens. The first mover 1100 may be connected to the second mover 1200 through the support member 1500. The first mover 1100 may move through interaction with the second mover 1200. At this time, the first mover 1100 may move integrally with the lens. Meanwhile, the first mover 1100 may move during AF driving. At this time, the first mover 1100 may be referred to as an 'AF mover'. However, the first mover 1100 may move together with the second mover 1200 even during OIS driving.

The lens driving device 1010 may comprise a bobbin 1110. The first mover 1100 may comprise a bobbin 1110. The bobbin 1110 may be disposed inside the housing 1210. The bobbin 1110 may be disposed in a hole of the housing 1210. The bobbin 1110 may be movably coupled to the housing 1210. The bobbin 1110 may move in an optical axis direction inside the housing 1210. The bobbin 1110 may move in the optical axis direction by the coil 1220 and the magnet 1120. A lens may be coupled to the bobbin 1110. The bobbin 1110 and the lens may be coupled by screw-coupling and/or adhesive. A magnet 1120 may be disposed in the bobbin 1110. Or, in a modified embodiment, the coil 1220 may be disposed in the bobbin 1110.

The bobbin 1110 may comprise a groove 1111. The groove 1111 may be formed at an outer surface of the bobbin 1110. The groove 1111 of the bobbin 1110 may be extended from an upper surface of the bobbin 1110. The upper surface of the groove 1111 of the bobbin 1110 may be open. The groove 1111 of the bobbin 1110 may be opened toward the upper surface of the bobbin 1110. The outer side of the groove 1111 of the bobbin 1110 may be open. The groove 1111 of the bobbin 1110 may be opened toward the outer side of the bobbin 1110. The groove 1111 of the bobbin 1110 may comprise a bottom surface facing upward. The first fixed portion 1510 of the support member 1500 may be disposed at a bottom surface of the groove 1111 of the bobbin 1110.

The bobbin 1110 may comprise a locking jaw 1112. The locking jaw 1112 may be formed so that the first fixed portion 1510 of the support member 1500 is being caught. The locking jaw 1112 may provide a space being formed to have a width smaller than the width of the first fixed portion 1510 of the support member 1500. The connection portion 1530 of the support member 1500 may pass through the space between the locking jaws 1112. The locking jaw 1112 may comprise two jaws spaced apart from each other. A separation space may be provided between the two jaws. The width of the separation space may be smaller than the width of the first fixed portion 1510 of the support member 1500 in the corresponding direction. The separation space may be formed as a groove or a hole. The groove 1111 of the bobbin 1110 may comprise locking jaws 1112 being spaced apart from each other by a width smaller than the width of the first fixed portion 1510 so that the first fixed portion 1510 is being caught.

The lens driving device 1010 may comprise a magnet 1120. The first mover 1100 may comprise a magnet 1120. The magnet 1120 may be disposed in the bobbin 1110. Or, in a modified embodiment, the magnet 1120 may be disposed in the housing 1210. In this case, the coil 1220 may be disposed in the bobbin 1110. The magnet 1120 may be disposed at an outer side surface or an outer circumferential surface of the bobbin 1110. The magnet 1120 may be fixed to the bobbin 1110 by an adhesive. The magnet 1120 may be disposed between the bobbin 1110 and the housing 1210. The magnet 1120 may face the coil 1220. The magnet 1120 may electromagnetically interact with the coil 1220. The magnet 1120 may move the bobbin 1110 in an optical axis direction through interaction with the coil 1220. The magnet 1120 may be used for AF driving. The magnet 1120 may be disposed at a side surface of the bobbin 1110. The magnet 1120 may be a flat magnet having a flat plate shape.

The magnet 1120 may comprise a plurality of magnets. The magnet 1120 may comprise: a first magnet being disposed at a first side surface of the bobbin 1110; and a second magnet being disposed on a second side surface opposite to the first side surface of the bobbin 1110. The first magnet and the second magnet may be spaced apart from each other.

The lens driving device 1010 may comprise a second mover 1200. The second mover 1200 may be movably coupled to the stator 1300 through the elastic member 1600 and a bearing 1700. The second mover 1200 may support the first mover 1100 through the support member 1500. The second mover 1200 may move the first mover 1100 or may move together with the first mover 1100. The second mover 1200 may move through interaction with the stator 1300. The second mover 1200 may move during OIS driving. At this time, the second mover 1200 may be referred to as an 'OIS mover'. The second mover 1200 may move integrally with the first mover 1100 during OIS driving.

The lens driving device 1010 may comprise a housing 1210. The second mover 1200 may comprise a housing 1210. The housing 1210 may be spaced apart from the base 1310. The housing 1210 may be disposed outside the bobbin 1110. The housing 1210 may accommodate at least a portion of the bobbin 1110. The housing 1210 may be disposed inside the cover member 1340. The housing 1210 may be disposed between the cover member 1340 and the bobbin 1110. The housing 1210 may be formed of a material different from that of the cover member 1340. The housing 1210 may be formed of an insulating material. The housing 1210 may be formed of an injection molding material. The outer side of the housing 1210 may be spaced apart from the inner surface of the side plate 1342 of the cover member 1340. Through the space between the housing 1210 and the cover member 1340, the housing 1210 may move for OIS operation. A coil 1220 may be disposed in the housing 1210. The housing 1210 and the coil 1220 may be coupled by an adhesive.

The housing 1210 may comprise four side portions and four corner portions being disposed between the four side portions. The side portions of the housing 1210 may comprise: a first side portion; a second side portion being disposed at an opposite side of the first side portion; and third and fourth side portions being disposed at an opposite side from each other between the first side portion and the second side portion. A corner portion of the housing 1210 may comprise: a first corner portion being disposed between the first side portion and the third side portion; a second corner portion being disposed between the first side portion and the fourth side portion; a third corner portion being disposed between the second side portion and the third side portion; and a fourth corner portion being disposed between the second side portion and the fourth side portion. The side portion of the housing 1210 may comprise a 'sidewall'.

The housing 1210 may comprise a groove 1211. The groove 1211 may be formed at an inner surface of the housing 1210. The groove 1211 of the housing 1210 may be extended from an upper surface of the housing 1210. The upper surface of the groove 1211 of the housing 1210 may be open. The groove 1211 of the housing 1210 may be opened toward the upper surface of the housing 1210. The outer side of the groove 1211 of the housing 1210 may be open. The groove 1211 of the housing 1210 may be opened toward the outer side. The groove 1211 of the housing 1210 may comprise a bottom surface facing upward. A second fixed portion 1520 of the support member 1500 may be disposed at a bottom surface of the groove 1211 of the housing 1210.

The housing 1210 may comprise a locking jaw 1212. The locking jaw 1212 may be formed to catch the second fixed portion 1520 of the support member 1500. The locking jaw 1212 may provide a space being formed with a width smaller than the width of the second fixed portion 1520 of the support member 1500. The connection portion 1530 of the support member 1500 may pass through a separation space between the locking jaws 1212. The locking jaw 1212 may comprise two jaws being spaced apart from each other. A separation space may be provided between the two jaws. The width of the separation space may be smaller than the width of the second fixed portion 1520 of the support member 1500 in the corresponding direction. The separation space may be formed as a groove or a hole. The groove 1211 of the housing 1210 may comprise locking jaws 1212 being spaced apart from each other by a width smaller than the width of the second fixed portion 1520 so that the second fixed portion 1520 is being caught.

The housing 1210 may comprise an upper stopper 1213. The upper stopper 1213 may be protruded from an upper surface of the housing 1210. The upper stopper 1213 may be formed at an upper surface of the housing 1210. The upper stopper 1213 may be overlapped with the upper plate 1341 of the cover member 1340 in an optical axis direction. The upper stopper 1213 may form an uppermost end of the housing 1210. Through this, when the housing 1210 moves upward, the upper stopper 1213 may be in contact with the upper plate 1341 of the cover member 1340. That is, the upper stopper 1213 may limit the movement of the housing 1210 upward.

The housing 1210 may comprise a side stopper 1214. The side stopper 1214 may be protruded from an outer surface of the housing 1210. The side stopper 1214 may face the inner surface of the side plate 1342 of the cover member 1340. The side stopper 1214 may be in contact with the side plate 1342 of the cover member 1340 when the housing 1210 moves laterally. That is, the side stopper 1214 may physically limit the stroke of the housing 1210 toward the side direction.

The lens driving device 1010 may comprise a coil 1220. The second mover 1200 may comprise a coil 1220. The coil 1220 may be an 'AF driving coil' used for AF driving. The coil 1220 may be disposed in the housing 1210. Or, in a modified embodiment, the coil 1220 may be disposed in the bobbin 1110. In this case, the magnet 1120 may be disposed in the housing 1210. The coil 1220 may be disposed between the bobbin 1110 and the housing 1210. The coil 1220 may be disposed at an inner side surface or an inner circumferential surface of the housing 1210. The coil 1220 may be directly wound on the housing 1210. Or, the coil 1220 may be coupled to the housing 1210 in a directly wound state. The coil 1220 may face the magnet 1120. The coil 1220 may be disposed to face the magnet 1120. The coil 1220 may electromagnetically interact with the magnet 1120. In this case, when a current is supplied to the coil 1220 to form an electromagnetic field around the coil 1220, the magnet 1120 may move with respect to the coil 1220 by the electromagnetic interaction between the coil 1220 and the magnet 1120. The coil 1220 may be formed as a single coil.

The coil 1220 may comprise a plurality of coils. The coil 1220 may comprise a first coil facing the first magnet and a second coil facing the second magnet. The coil 1220 may comprise a connection coil connecting the first coil and the second coil. The coil 1220 may be electrically connected to the second substrate 1330 through the first and second elastic members 1601 and 1602. The coil 1220 may receive power from the second substrate 1330 through the elastic member 1600.

The lens driving device 1010 may comprise a stator 1300. The stator 1300 may be disposed below the first and second movers 1200 and 1300. The stator 1300 may movably support the second mover 1200. The stator 1300 may move the second mover 1200. At this time, the first mover 1100 may also move together with the second mover 1200.

The lens driving device 1010 may comprise a base 1310. The stator 1300 may comprise a base 1310. The base 1310 may be disposed below the housing 1210. The base 1310 may be disposed below the first substrate 1320. A first substrate 1320 may be disposed at an upper surface of the base 1310. The base 1310 may be coupled to the cover member 1340. The base 1310 may be disposed on the printed circuit board 1050.

The base 1310 may comprise a body portion 1311. The body portion 1311 may be disposed between the housing 1210 and the printed circuit board 1050. The body portion 1311 may be disposed in a direction perpendicular to the optical axis direction. The base 1310 may comprise a sidewall portion 1312. The sidewall portion 1312 may be protruded from an upper surface of the body portion 1311. The sidewall portion 1312 may be protruded upward from the body portion 1311. The sidewall portion 1312 may accommodate the housing 1210 therein.

The lens driving device 1010 may comprise a first substrate 1320. The stator 1300 may comprise a first substrate 1320. The first substrate 1320 may be disposed in the base 1310. The first substrate 1320 may be disposed between the base 1310 and the housing 1210. The first substrate 1320 may be disposed at an upper surface of the base 1310. The first substrate 1320 may be coupled to the second substrate 1330 being soldered with printed circuit board 1050 and being disposed below the base 1310. Or, the first substrate 1230 and the second substrate 1330 may be integrally formed. In this case, the first substrate 1320 may comprise a flexible printed circuit board (FPCB). The first substrate 1320 may be partially bent.

The first substrate 1320 may comprise a terminal 1321. The terminal 1321 may be formed at a side surface of the first substrate 1320. The terminal 1321 of the first substrate 1320 may be coupled to the second substrate 1330. The terminal 1321 of the first substrate 1320 may be coupled to the second terminal 1332 of the second substrate 1330. The terminal 1321 of the first substrate 1320 may be electrically connected to the second terminal 1332 of the second substrate 1330 by a solder or a conductive epoxy.

The terminal 1321 of the first substrate 1320 may comprise: first to fourth terminals 1321, 1322, 1323, and 1324 being connected to each of the first to fourth shape memory alloy wires 1431, 1432, 1433, and 1434; and a fifth terminal 1325 being commonly connected to the first to fourth shape memory alloy wires 1431, 1432, 1433, and 1434. At this time, a positive (+) current may be applied to the first to fourth terminals 1321, 1322, 1323, and 1324, and a negative (−) current may be applied to the fifth terminal 1325. Conversely, a negative (−) current may be applied to the first to fourth terminals 1321, 1322, 1323, and 1324, and a positive (+) current may be applied to the fifth terminal 1325.

The first substrate 1320 may comprise a terminal 1327. The terminal 1327 may be disposed at an upper surface of the first substrate 1320. The terminal 1327 may be coupled to the conductive wire 1440. The terminal 1327 may be coupled to the conductive wire 1440 through a solder and/or a conductive epoxy. The terminal 1327 may comprise four terminals.

The lens driving device 1010 may comprise a second substrate 1330. The stator 1300 may comprise a second substrate 1330. The second substrate 1330 may be disposed at a side surface of the base 1310. The second substrate 1330 may be electrically connected to the first substrate 1320. The second substrate 1330 may be electrically connected to the shape memory alloy member 1400. The second substrate 1330 may be electrically connected to the coil 1220. The second substrate 1330 may be electrically connected to the printed circuit board 1050.

The second substrate 1330 may comprise a first terminal 1331. The first terminal 1331 may be disposed at an outer surface of the second substrate 1330. The first terminal 1331 may be formed at a lower end of the second substrate 1330. The first terminal 1331 of the second substrate 1330 may be coupled to the terminal of the printed circuit board 1050. The first terminal 1331 may comprise a plurality of terminals. The first terminal 1331 may comprise seven terminals. Two terminals among the seven terminals may be electrically connected to the coil 1220. Five of the seven terminals may be electrically connected to the shape memory alloy wire 1430.

The second substrate 1330 may comprise a second terminal 1332. The second terminal 1332 may be disposed at an inner surface of the second substrate 1330. The second terminal 1332 may be formed below the second substrate 1330. The second terminal 1332 may be disposed at a height corresponding to the first substrate 1320. The second terminal 1332 of the second substrate 1330 may be coupled to the terminal 1321 of the first substrate 1320. The second terminal 1332 may comprise a plurality of terminals. The second terminal 1332 may comprise five terminals. The five terminals may be respectively connected to the first to fifth terminals 1322, 1323, 1324, 1325, and 1326 of the first substrate 1320.

The lens driving device 1010 may comprise a cover member 1340. The stator 1300 may comprise a cover member 1340. The cover member 1340 may comprise a 'cover can'. The cover member 1340 may be disposed outside the housing 1210. The cover member 1340 may be coupled the base 1310. The cover member 1340 may be coupled to the base 1310. The cover member 340 may accommodate the housing 1210 therein. The cover member 1340 may form the outer appearance of the lens driving device 1010. The cover member 1340 may have a hexahedral shape with an open lower surface. The cover member 1340 may be a non-magnetic material. The cover member 1340 may be formed of a metal material. The cover member 1340 may be formed of a metal plate. The cover member

1340 may be connected to the ground portion of the printed circuit board 1050. Through this, the cover member 1340 may be grounded. The cover member 1340 may block electromagnetic interference (EMI). At this time, the cover member 1340 may be referred to as an 'EMI shield can'.

The cover member 1340 may comprise an upper plate 1341 and a side plate 1342. The cover member 1340 may comprise an upper plate 1341 comprising a hole, and a side plate 1342 being extended downward from an outer circumference or edge of the upper plate 1341. The lower end of the side plate 1342 of the cover member 1340 may be disposed at a step portion of the base 1310. The inner surface of the side plate 1342 of the cover member 1340 may be fixed to the base 1310 by an adhesive.

The upper plate 1341 of the cover member 1340 may comprise a hole. A hole may comprise an 'opening'. The hole may be formed in the upper plate 1341 of the cover member 1340. When viewed from above, the lens can be seen through the hole. The hole may be formed in a size and shape corresponding to the lens. The size of the hole may be larger than the diameter of the lens module 1020 so that the lens module 1020 can be inserted and assembled through the hole. The light introduced through the hole may pass through the lens. At this time, the light passing through the lens may be converted into an electrical signal in the image sensor 1060 and acquired as an image.

The lens driving device 1010 may comprise a shape memory alloy member 1400. The shape memory alloy member 1400 may connect the housing 1210 and the first substrate 1320. The shape memory alloy member 1400 may connect the base 1310 and the housing 1210. The shape memory alloy member 1400 may connect the stator 1300 and the second mover 1200. Or, the shape memory alloy member 1400 may connect the stator 1300 and the first mover 1100. The shape memory alloy member 1400 may connect the base 1310 and the bobbin 1110.

The shape memory alloy member 1400 may be used for OIS driving. The shape memory alloy member 1400 may move the housing 1210 in a direction perpendicular to the optical axis direction with respect to the base 1310. At this time, the bobbin 1110 may move integrally with the housing 1210. The lens module 1020 coupled to the bobbin 1110 may also move integrally with the housing 1210. Through this, the lens module 1020 may be moved in a direction perpendicular to the optical axis direction with respect to the image sensor 1060.

The shape memory alloy member 1400 may comprise a shape memory alloy (SMA). The shape memory alloy may change shape when an electric current is applied. The shape memory alloy may be changed in length when a current is applied. The shape memory alloy may be reduced in length when a current is applied. The shape memory alloy can be extended in length when a current is applied.

The shape memory alloy member 1400 may comprise a first coupling part 1420. The first coupling part 1420 is a part that moves together with the housing 1210 and may be a 'moving portion'. The first coupling part 1420 may be coupled to the housing 1210. The first coupling part 1420 may be fixed to the housing 1210. The first coupling part 1420 may comprise a metal. The first coupling part 1420 may comprise a portion formed of a conductive material. The first coupling part 1420 may comprise a plurality of first coupling parts. The first coupling part 1420 may comprise two first coupling parts. The two first coupling parts may be disposed opposite to each other with respect to an optical axis. Each of the two first coupling parts may comprise two conductive lines. Each of the two first coupling parts may comprise first and second conductive lines. Each of the first and second conductive lines may be electrically connected to a shape memory alloy wire 1430.

The shape memory alloy member 1400 may comprise a second coupling part 1410. The second coupling part 1410 is a part that maintains a fixed state together with the first substrate 1320 and may be a 'fixed portion'. The second coupling part 1410 as a fixed portion may move the first coupling part 1420 and the housing 1210 as a moving portion with respect to the first substrate 1320. The second coupling part 1410 may be coupled to the first substrate 1320. The second coupling part 1410 may be fixed to the first substrate 1320. The second coupling part 1410 may be coupled to the base 1310. The second coupling part 1410 may be fixed to the base 1310. The second coupling part 1410 may comprise a metal. The second coupling part 1410 may comprise a portion formed of a conductive material. The second coupling part 1410 may comprise a plurality of second coupling parts. The second coupling part 1410 may comprise two second coupling parts. The two second coupling parts may be disposed opposite to each other with respect to an optical axis. The first coupling part 1420 may be disposed at two corners among the four corners of the base 1310 and the second coupling part 1410 may be disposed at the remaining two corners. Each of the two second coupling parts may comprise two conductive lines. Each of the two second coupling parts may comprise first and second conductive lines. Each of the first and second conductive lines may electrically connect the shape memory alloy wire 1430 and the first substrate 1320.

The shape memory alloy member 1400 may comprise a shape memory alloy wire 1430. The shape memory alloy wire 1430 may connect the first coupling part 1420 and the second coupling part 1410. The shape memory alloy wire 1430 may change in length when a current is applied. The shape memory alloy wire 1430 may comprise a shape memory alloy (SMA). The shape memory alloy wire 1430 may be formed of a shape memory alloy (SMA). The shape memory alloy wire 1430 may change in shape when a current is applied. The shape memory alloy wire 1430 may change in length when a current is applied. The shape memory alloy wire 1430 may be reduced in length when a current is applied. The shape memory alloy wire 1430 may be extended in length when a current is applied.

The shape memory alloy wire 1430 may comprise a plurality of shape memory alloy wires. The shape memory alloy wire 1430 may comprise four shape memory alloy wires. The shape memory alloy wire 1430 may comprise first to fourth shape memory alloy wires 1431, 1432, 1433, and 1434. The first and second shape memory alloy wires 1431 and 1432 may be disposed in a first direction perpendicular to the optical axis direction. The third and fourth shape memory alloy wires 1433 and 1434 may be disposed in an optical axis direction and a second direction perpendicular to the first direction. Through this structure, the first and second shape memory alloy wires 1431 and 1432 may be used to move the first and second movers 1100 and 1200 in a first direction perpendicular to the optical axis direction. In addition, the third and fourth shape memory alloy wires 1433 and 1434 may be used to move the first and second movers 1100 and 1200 in an optical axis direction and a second direction perpendicular to the first direction.

As an example, as illustrated in FIG. 31, as a current is applied to the third shape memory alloy wire 1433, the length of the third shape memory alloy wire 1433 is shortened (see a in FIG. 31), and when the length of the fourth shape memory alloy wire 1434 is increased (see b in FIG.

31), the first and second movers 1100 and 1200 may move in one of the second directions, which is the lengthwise direction of the third and fourth shape memory alloy wires 1433 and 1434 (see c in FIG. 31). Conversely, as a current is applied to the fourth shape memory alloy wire 1434, the length of the fourth shape memory alloy wire 1434 is shortened, and when the length of the third shape memory alloy wire 1433 is increased, the first and second movers 1100 and 1200 may move to the other side of the second direction, which is the lengthwise direction of the third and fourth shape memory alloy wires 1433 and 1434.

Similarly, as a current is applied to the first shape memory alloy wire 1431, the length of the first shape memory alloy wire 1431 is shortened, and when the length of the second shape memory alloy wire 1432 is increased, the first and second movers 1100 and 1200 may move in one of the first directions, which is the lengthwise direction of the first and second shape memory alloy wires 1431 and 1432. Conversely, as a current is applied to the second shape memory alloy wire 1432, the length of the second shape memory alloy wire 1432 is shortened, and when the length of the first shape memory alloy wire 1431 is increased, the first and second movers 1100 and 1200 may move to the other side of the first direction, which is the lengthwise direction of the first and second shape memory alloy wires 1431 and 1432.

The shape memory alloy member 1400 may comprise a conductive wire 1440. The conductive wire 1440 may connect the first coupling part 1420 and the first substrate 1320. The conductive wire 1440 may electrically connect the first coupling part 1420 and the first substrate 1320. The conductive wire 1440 may be coupled to the terminal 1327 of the first substrate 1320. The conductive wire 1440 may comprise a plurality of conducting wires. The conductive wire 1440 may comprise two conductive wires. Each of the two conductive wires may comprise two conductive lines. The conductive line may be formed on the surface of the conductive wire. The two conductive lines may be spaced apart from each other. The conductive wire 1440 may have elasticity. The conductive wire 1440 may be formed of an elastic member.

The lens driving device 1010 may comprise a support member 1500. The support member 1500 may connect the housing 1210 and the bobbin 1110. The support member 1500 may support the bobbin 1110 with respect to the housing 1210 when the bobbin 1110 moves in an optical axis direction. The support member 1500 may have elasticity. The support member 1500 may comprise a portion having elasticity. The support member 1500 may be elastically restored. The support member 1500 may be formed of an elastomer. One end of the support member 1500 may be fixed to the bobbin 1110 and the other end of the support member 1500 may be fixed to the housing 1210. A portion of the support member 1500 may be attached to the bobbin 1110. An adhesive may be disposed in the groove 1111 of the bobbin 1110. The other part of the support member 1500 may be attached to the housing 1210. The adhesive may be disposed in the groove 1211 of the housing 1210.

The support member 1500 may comprise a first fixed portion 1510. The first fixed portion 1510 may be fixed inside the groove 1111 of the bobbin 1110. The first fixed portion 1510 may be formed to have a width corresponding to the groove 1111 of the bobbin 1110. The first fixed portion 1510 may be fixed to the bobbin 1110 by an adhesive. The first fixed portion 1510 may be inserted into the groove 1111 of the bobbin 1110 from the upper side. The first fixed portion 1510 may be disposed at a bottom surface of the groove 1111 of the bobbin 1110.

The support member 1500 may comprise a second fixed portion 1520. The second fixed portion 1520 may be fixed inside the groove 1211 of the housing 1210. The second fixed portion 1520 may be formed to have a width corresponding to the groove 1211 of the housing 1210. The second fixed portion 1520 may be fixed to the housing 1210 by an adhesive. The second fixed portion 1520 may be inserted into the groove 1211 of the housing 1210 from an upper side. The second fixed portion 1520 may be disposed at a bottom surface of the groove 1211 of the housing 1210.

The support member 1500 may comprise a connection portion 1530. The connection portion 1530 may connect the first fixed portion 1510 and the second fixed portion 1520. The connection portion 1530 may be formed to have a width smaller than the width of the first fixed portion 1510 and the second fixed portion 1520 at a portion being connected to the first fixed portion 1510 and the second fixed portion 1520. At this time, the width of the connection portion 1530 may be the length in a direction perpendicular to the lengthwise direction of the connection portion 1530. The connection portion 1530 may comprise a first portion 1540 being connected to the first fixed portion 1510 and having a width smaller than the width of the first fixed portion 1510. The connection portion 1530 may comprise a second portion 1550 being connected to the second fixed portion 1520 and having a width smaller than the width of the second fixed portion 1520. The first portion 1540 and the second portion 1550 of the connection portion 1530 may be hinge parts. Bending may occur in the first portion 1540 and the second portion 1550 of the connection portion 1530 when the bobbin 1110 moves. The first portion 1540 of the connection portion 1530 may be a first hinge part, and the second portion 1550 may be a second hinge part.

The connection portion 1530 may comprise a portion whose width increases as it moves away from the first fixed portion 1510 and the second fixed portion 1520. The connection portion 1530 may comprise a third portion that connects the first portion 1540 and the second portion 1550 and is formed to have a width wider than the width of the first portion 1540 and the second portion 1550. The connection portion 1530 may be formed to have the largest width in the central portion. The outer surface of the connection portion 1530 may comprise a curved surface. The outer surface of the connection portion 1530 may be formed only with a curved surface. The connection portion 1530 may be formed to have a curvature.

In a modified embodiment illustrated in (a) of FIG. 24e, the support member 1500a may be extended from the first fixed portion 1510 to the second fixed portion 1520 of the connection portion 1530a with a constant width or diameter.

In a modified embodiment illustrated in (b) of FIG. 24e, the support member 1500b may comprise a cylindrical connection portion 1530b. The cylindrical shape may connect the first portion 1540 and the second portion 1550 having a width smaller than that of the first fixed portion 1510 and the second fixed portion 1520.

In a modified embodiment illustrated in (c) of FIG. 24e, the support member 1500c may comprise a groove 1560 being formed in the connection portion 1530c. The groove 1560 may be formed between the first portion 1540 and the second portion 1550 having a width smaller than that of the first fixed portion 1510 and the second fixed portion 1520.

In a modified embodiment, the lens driving device 1010 may comprise the support member 500 of the first embodiment of the present invention. The support member 500 may connect the bobbin 1110 and the housing 1210. The support member 500 may elastically support the bobbin 1110 with respect to the housing 1210 when the bobbin 1110 moves in a direction perpendicular to the optical axis direction. The support member 500 may have elasticity. The support member 500 may comprise a portion having elasticity. The support member 500 may be elastically restored. The support member 500 may comprise a non-metallic material. The support member 500 may be a non-metal. The support member 500 may be formed of an injection molding product. The support member 500 may comprise an elastomer. The support member 500 may be disposed long in length in an optical axis direction. One end of the support member 500 may be fixed to the bobbin 1110 and the other end of the support member 500 may be fixed to the housing 1210. One end of the support member 500 is coupled to the bobbin 1110 and the other end may be coupled to the moving portion.

Furthermore, in a modified embodiment, the lens driving device 1010 may comprise some configurations of the first embodiment of the present invention replacing some configurations of the second embodiment of the present invention.

The lens driving device 1010 may comprise an elastic member 1600. The elastic member 1600 may connect the base 1310 and the housing 1210. The elastic member 1600 may be coupled to the base 1310 and the housing 1210. The elastic member 1600 may be coupled to an upper surface of the base 1310 and an upper surface of the housing 1210. The elastic member 1600 may have elasticity at least in part. The elastic member 1600 may be formed of metal. The elastic member 1600 may be formed of a conductive material. The elastic member 1600 may elastically support the housing 1210. The elastic member 1600 may movably support the housing 1210.

The elastic member 1600 may comprise a plurality of elastic members. The elastic member 1600 may comprise two elastic members. The elastic member 1600 may comprise first and second elastic members 1601 and 1602 being spaced apart from each other. The elastic member 1600 may electrically connect the second substrate 1330 and the coil 1220.

The elastic member 1600 may comprise: an inner portion 1610 being coupled to the housing 1210; an outer portion 1620 being coupled to the base 1310; and a connection portion 1630 connecting the inner portion 1610 and the outer portion 1620. In a second embodiment of the present invention, the inner portion 1610 may be disposed higher than the outer portion 1620. Through such a structure, the elastic member 1600 may press the housing 1210 downward. Through this, the housing 1210 may maintain a state in which the bearing 1700 is in contact. The elastic member 1600 may press the housing 1210 in a direction toward the bearing 1700. As illustrated in FIG. 33, the height of the inner side portion 1610 of the elastic member 1600 may be disposed higher than the height of the outer side portion 1620 of the elastic member 1600 by a predetermined distance (see D in FIGS. 32 and 33). Through this, downward pressure by the elastic force of the elastic member 1600 may be applied to the housing 1210 coupled to an inner side portion 1610 of the elastic member 1600.

The lens driving device 1010 may comprise a bearing 1700. The bearing 1700 may be disposed between the housing 1210 and the base 1310. The bearing 1700 may be disposed between the housing 1210 and the first substrate 1320. The bearing 1700 may contact the housing 1210 when the housing 1210 moves in a direction perpendicular to the optical axis direction. Through this, frictional force generated when the housing 1210 moves in a direction perpendicular to the optical axis direction may be reduced. The bearing 1700 is formed in a cylindrical shape, and one side may be fixed to the first substrate 1320 or the base 1310. At this time, the other side of the bearing 1700 may be in contact with the housing 1210. As a modified embodiment, the bearing 1700 may be formed in a ball shape. At this time, a groove or hole for fixing the ball-shaped bearing 1700 to the first substrate 1320 or the base 1310 may be provided.

In a second embodiment of the present invention, a groove may be formed at an outer surface of at least one of the bobbin 1110 and the housing 1210. At this time, the support member 1500 may comprise a fixed portion being fixed inside the groove of the bobbin 1110 and/or the housing 1210. The fixed portion of the support member 1500 may be inserted into the groove of the bobbin 1110 and/or the housing 1210.

The lens driving device according to a second embodiment of the present invention may use a hinge when driving AF and an SMA wire when driving OIS. In this case, there is a reliability advantage, and it can be applied to a large aperture, heavy weight actuator.

In a second embodiment of the present invention, AF driving may be controlled by being connected to the injection mold member. The injection molding member can be maintained in balance by fixing in four directions. Electromagnetic force for AF driving can be secured by driving two magnets and coils.

The bobbin 1110 may be a lens carrier. The bobbin 1110 and the housing 1210 may be connected and controlled by the support member 1500 which is a plurality of injection mold members. AF driving may be driven up and down by electromagnetic force generated in the coil 1220 facing the magnet 1120. At this time, the magnet 1120 and the coil 1220 may maintain balance and be used in plurality.

The second coupling part 1410 may be a fixed portion, and the first coupling part 1420 may be a driving unit. The fixed portion may be fixed to the base 1310 and the driving unit may be fixed to the housing 1210. In a second embodiment of the present invention, OIS driving may be performed according to the SMA characteristic of which the length varies according to temperature. For example, when one SMA wire is shortened and the opposite SMA wire is lengthened, the second mover 1200 may move in the same direction.

The coil 1220 may be connected to the second substrate 1330 that is a PCB using the elastic member 1600. The elastic member 1600 may be fixed to the housing 1210 and the base 1310. An end of each of the four shape memory alloy wires 1430 connected to the second coupling part 1410, which is a fixed portion, is connected to the first substrate 1320 and may be configured with one terminal. The ends of each of the four shape memory alloy wires 1430 connected to the first coupling part 1420 which is a driving unit may be connected to the first substrate 1320 through a PCB pattern or a conductive wire 1440 and may be configured with four terminals through each pattern.

In a second embodiment of the present invention, a height difference between the elastic members 1600 being fixed to the base 1310 and the housing 1210 is formed so that the second mover 1200, which is the OIS body, can be maintained in a downward direction toward the bearing 1700 by the restoring force of the elastic member 1600. The elastic member 1600 may be a spring.

In addition, the conductive wire 1440 below the housing 1210 may also maintain the second mover 1200 in a downward direction by restoring force. The conductive wire 1440 may be an elastic body for a wire signal.

Hereinafter, a camera module according to a second embodiment of the present invention will be described with reference to the drawings.

Figure 35:
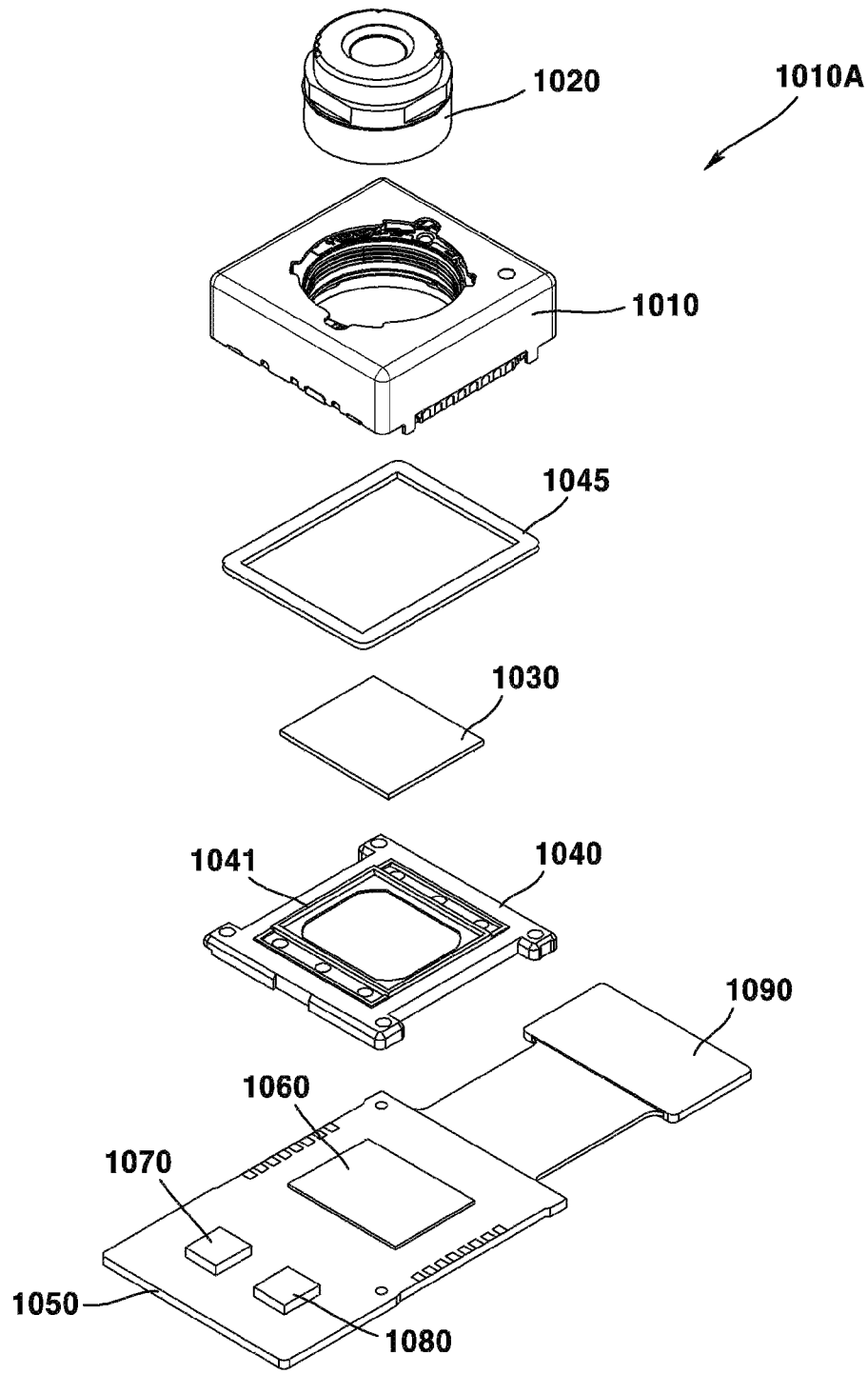
FIG. 35 is an exploded perspective view of a camera device according to a second embodiment of the present invention.

FIG. 35 is an exploded perspective view of a camera device according to a second embodiment of the present invention.

The camera module 1010A may comprise a camera device.

The camera module 1010A may comprise a lens module 1020. The lens module 1020 may comprise at least one lens. The lens may be disposed at a position corresponding to the image sensor 1060. The lens module 1020 may comprise a lens and a barrel. The lens module 1020 may be coupled to the bobbin 1110 of the lens driving device 1010. The lens module 1020 may be coupled to the bobbin 1110 by screw-coupling and/or adhesive. The lens module 1020 may move integrally with the bobbin 1110.

The camera module 1010A may comprise a filter 1030. The filter 1030 may serve to block light of a specific frequency band in light passing through the lens module 1020 from being incident on the image sensor 1060. The filter 1030 may be disposed parallel to the x-y plane. The filter 1030 may be disposed between the lens module 1020 and the image sensor 1060. The filter 1030 may be disposed in the sensor base 1040. In a modified embodiment, the filter 1030 may be disposed in the base 1410. The filter 1030 may comprise an infrared filter. The infrared filter may block light of the infrared region from being incident on the image sensor 1060.

The camera module 1010A may comprise a sensor base 1040. The sensor base 1040 may be disposed between the lens driving device 1010 and the printed circuit board 1050. The sensor base 1040 may comprise a protrusion 1041 in which the filter 1030 is disposed. An opening may be formed in a portion of the sensor base 1040 where the filter 1030 is disposed so that light passing through the filter 1030 may be incident on the image sensor 1060. The adhesive member 1045 may couple or attach the base 1410 of the lens driving device 1010 to the sensor base 1040. The adhesive member 1045 may additionally serve to prevent foreign substances from being introduced into the lens driving device 1010. The adhesive member 1045 may comprise any one or more among an epoxy, a thermosetting adhesive, and an ultraviolet curable adhesive.

The camera module 1010A may comprise a printed circuit board (PCB) 1050. The printed circuit board 1050 may be a substrate or a circuit board. A lens driving device 1010 may be disposed in the printed circuit board 1050. A sensor base 1040 may be disposed between the printed circuit board 1050 and the lens driving device 1010. The printed circuit board 1050 may be electrically connected to the lens driving device 1010. An image sensor 1060 may be disposed in the printed circuit board 1050. The printed circuit board 1050 may comprise various circuits, elements, control units, and the like, in order to convert an image formed in the image sensor 1060 into an electrical signal and transmit it to an external device.

The camera module 1010A may comprise an image sensor 1060. The image sensor 1060 may have a configuration in which light passing through a lens and a filter 1030 is incident to form an image. The image sensor 1060 may be mounted on the printed circuit board 1050. The image sensor 1060 may be electrically connected to the printed circuit board 1050. For example, the image sensor 1060 may be coupled to the printed circuit board 1050 by a surface mounting technology (SMT). As another example, the image sensor 1060 may be coupled to the printed circuit board 1050 by a flip chip technology. The image sensor 1060 may be disposed so that the lens and the optical axis coincide. That is, the optical axis of the image sensor 1060 and the optical axis of the lens may be aligned. The image sensor 1060 may convert light irradiated to the effective image region of the image sensor 1060 into an electrical signal. The image sensor 1060 may be any one among a charge coupled device (CCD), a metal oxide semi-conductor (MOS), a CPD, and a CID.

The camera module 1010A may comprise a motion sensor 1070. The motion sensor 1070 may be mounted on the printed circuit board 1050. The motion sensor 1070 may be electrically connected to the control unit 1080 through a circuit pattern provided to the printed circuit board 1050. The motion sensor 1070 may output rotational angular velocity information due to the movement of the camera module 1010A. The motion sensor 1070 may comprise a 2-axis or 3-axis gyro sensor, or an angular velocity sensor.

The camera module 1010A may comprise a control unit 1080. The control unit 1080 may be disposed on the printed circuit board 1050. The control unit 1080 may be electrically connected to the first and second coils 1220 and 1430 of the lens driving device 1010. The control unit 1080 may individually control the direction, intensity, and amplitude of the current supplied to the first and second coils 1220 and 1430. The control unit 1080 may control the lens driving device 1010 to perform an autofocus function and/or an image stabilization function. Furthermore, the control unit 1080 may perform autofocus feedback control and/or handshake correction feedback control for the lens driving device 1010.

The camera module 1010A may comprise a connector 1090. The connector 1090 may be electrically connected to the printed circuit board 1050. The connector 1090 may comprise a port for electrically connecting to an external device.

Hereinafter, an optical device according to a second embodiment of the present invention will be described with reference to the drawings.

Figure 36:
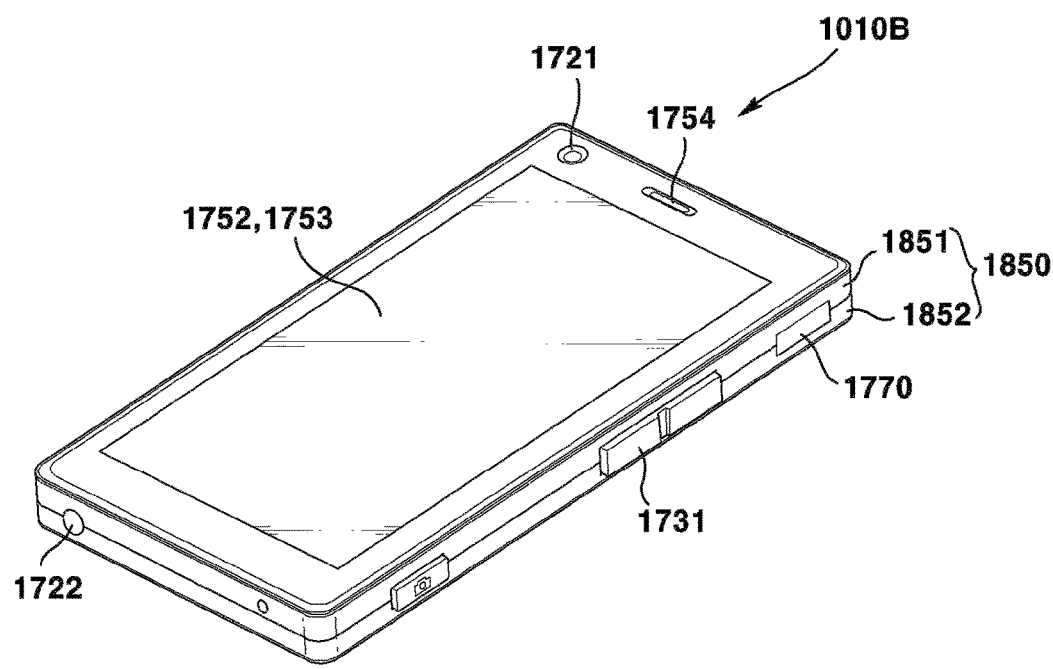
FIG. 36 is a perspective view illustrating an optical device according to a second embodiment of the present invention.
Figure 37:
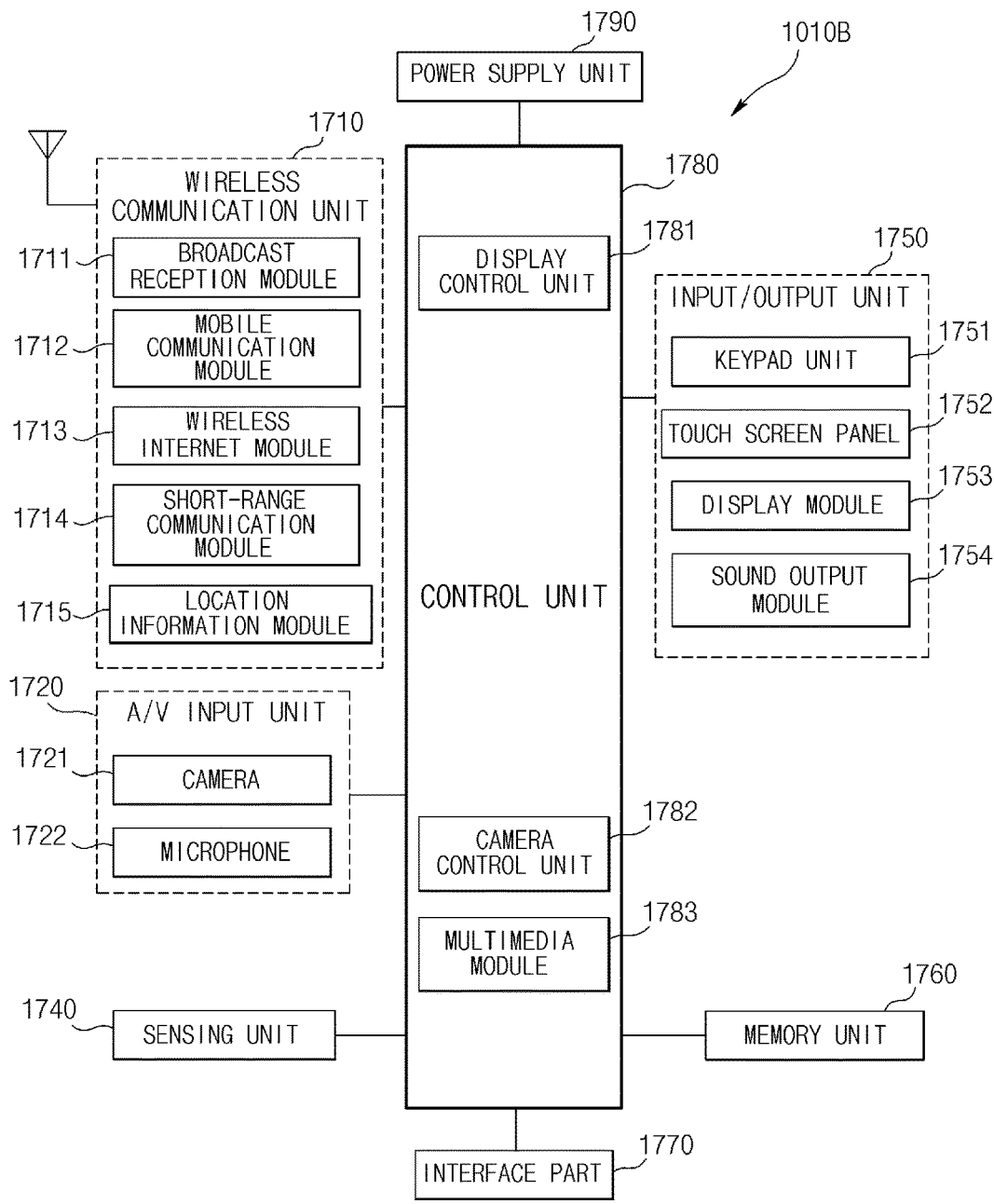
FIG. 37 is a block diagram of an optical device according to a second embodiment of the present invention.

FIG. 36 is a perspective view illustrating an optical device according to a second embodiment of the present invention; and FIG. 37 is a block diagram of an optical device according to a second embodiment of the present invention.

The optical device 1010B may comprise a portable terminal. The optical device 1010B may be any one among a hand phone, a portable phone, a smart phone, a portable smart device, a digital camera, a laptop computer, a digital broadcasting terminal, a personal digital assistant (PDA), a portable multimedia player (PMP), and navigation. However, the type of the optical device 1010B is not limited thereto, and any device for photographing a video or a picture may be comprised in the optical device 1010B.

The optical device 1010B may comprise a main body 1850. The main body 1850 may have a bar shape. Or, the main body 1850 may have various structures, such as a slide type, a folder type, a swing type, a swivel type, and the like in which two or more sub-bodies are coupled to be relatively movable. The main body 1850 may comprise a case (casing, housing, and cover) forming an outer appearance. For example, the main body 1850 may comprise a front case 1851 and a rear case 1852. Various electronic components of the optical device 1010B may be embedded in a space formed between the front case 1851 and the rear case 1852. A display module 1753 may be disposed on one surface of the main body 1850. A camera 1721 may be disposed on one or more surfaces of one surface and the other surface being disposed at an opposite side of the one surface of the main body 1850.

The optical device 1010B may comprise a wireless communication unit 1710. The wireless communication unit 1710 may comprise one or more modules enabling wireless communication between the optical device 1010B and the wireless communication system, or between the optical device 1010B and the network in which the optical device 1010B is located. For example, the wireless communication unit 1710 may comprise any one or more among a broadcast reception module 1711, a mobile communication module 1712, a wireless Internet module 1713, a short-range communication module 1714, and a location information module 1715.

The optical device 1010B may comprise an A/V input unit 1720. The A/V input unit 1720 is for inputting an audio signal or a video signal and may comprise any one or more of a camera 1721 and a microphone 1722. At this time, the camera 1721 may comprise a camera module 1010A according to a second embodiment of the present embodiment.

The optical device 1010B may comprise a sensing unit 1740. The sensing unit 1740 may generate a sensing signal for controlling the operation of the optical device 1010B by detecting the current state of the optical device 1010B such as the opening/closing state of the optical device 1010B, the position of the optical device 1010B, the presence or absence of user contact, the orientation of the optical device 1010B, acceleration/deceleration of the optical device 1010B, and the like. For example, when the optical device 1010B is in the form of a slide phone, it is possible to sense whether the slide phone is opened or closed. In addition, it is responsible for sensing functions related to whether the power supply unit 1790 is supplied with power, whether the interface unit 1770 is coupled to an external device, and the like.

The optical device 1010B may comprise an input/output unit 1750. The input/output unit 1750 may be configured to generate an input or output related to visual, auditory, or tactile sense. The input/output unit 1750 may generate input data for controlling the operation of the optical device 1010B, and may output information processed by the optical device 1010B.

The input/output unit 1750 may comprise any one or more among a keypad unit 1751, a touch screen panel 1752, a display module 1753, and a sound output module 1754. The keypad unit 1751 may generate input data in response to a keypad input. The touch screen panel 1752 may convert a change in capacitance generated due to a user's touch on a specific region of the touch screen into an electrical input signal. The display module 1753 may output an image photographed by the camera 1721. The display module 1753 may comprise a plurality of pixels whose color changes according to an electrical signal. For example, the display module 1753 may comprise at least one among a liquid crystal display, a thin film transistor liquid crystal display, an organic light emitting diode, a flexible display, and a 3D display. The sound output module 1754 may output audio data received from the wireless communication unit 1710 in a call signal reception, a call mode, a recording mode, a voice recognition mode, or a broadcast reception mode, or stored in the memory unit 1760.

The optical device 1010B may comprise a memory unit 1760. A program for processing and controlling the control unit 1780 may be stored in the memory unit 1760. In addition, the memory unit 1760 may store input/output data, for example, any one or more of a phone book, a message, an audio, a still image, a photo, and a moving picture. The memory unit 1760 may store an image photographed by the camera 1721, for example, a photo or a video.

The optical device 1010B may comprise an interface unit 1770. The interface unit 1770 serves as a path for connecting to an external device being connected to the optical device 1010B. The interface unit 1770 may receive data from an external device, receive power and transmit it to each component inside the optical device 1010B, or transmit data inside the optical device 1010B to the external device. The interface unit 1770 may comprise any one or more among a wired/wireless headset port, an external charger port, a wired/wireless data port, a memory card port, a port for connecting a device equipped with an identification module, and an audio I/O port, a video I/O port, and an earphone port.

The optical device 1010B may comprise a control unit 1780. The control unit 1780 may control the overall operation of the optical device 1010B. The control unit 1780 may perform related control and processing for voice call, data communication, video call, and the like. The control unit 1780 may comprise a display control unit 1781 that controls a display module 1753 that is a display of the optical device 1010B. The control unit 1780 may comprise a camera control unit 1782 that controls the camera module. The control unit 1780 may comprise a multimedia module 1783 for playing multimedia. The multimedia module 1783 may be provided inside the control unit 1780 or may be provided separately from the control unit 1780. The control unit 1780 may perform a pattern recognition process capable of recognizing a handwriting input or a drawing input performed on the touch screen as characters and images, respectively.

The optical device 1010B may comprise a power supply unit 1790. The power supply unit 1790 may receive external power or internal power by the control of the control unit 1780 to supply power required for operation of each component.

The lens driving device according to the third embodiment of the present invention may comprise a part of the lens driving device according to the first embodiment of the present invention and a part of the lens driving device according to the second embodiment of the present invention. For example, the lens driving device according to the third embodiment may comprise the support member 500 of the first embodiment and the support member 1500 of the second embodiment together. Furthermore, the lens driving device according to the third embodiment may comprise the configuration of the first embodiment and the configuration of the second embodiment other than the support members 500 and 1500 together.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A lens driving device comprising:
   a fixed portion;
   a moving portion disposed to move with respect to the fixed portion;
   a bobbin disposed in the moving portion;
   a magnet disposed on any one of the bobbin and the fixed portion;
   a coil disposed on the other one of the bobbin and the fixed portion;

a support member comprising one end coupled with the bobbin and the other end coupled with the moving portion; and a shape memory alloy member coupled to the fixed portion and the moving portion, where in the shape memory alloy member is configured to move the moving portion in an optical axis direction, and wherein the coil and the magnet are configured to move the bobbin with respect to the moving portion in a direction perpendicular to the optical axis direction.

2. The lens driving device of claim 1, wherein both ends of the shape memory alloy member are connected with the fixed portion, and a central region of the shape memory alloy member is connected with the moving portion.

3. The lens driving device of claim 1, wherein the support member has regions having different widths.

4. The lens driving device of claim 1, wherein the support member has a constant width in a lengthwise direction.

5. The lens driving device of claim 1, wherein a width of a peripheral region of the support member is thicker than a width of a central region of the support member.

6. The lens driving device of claim 1, wherein the support member has a head portion and a body portion, and
wherein a width of the head portion is greater than a width of the body portion.

7. The lens driving device of claim 1, wherein the shape memory alloy member comprises a first unit shape memory alloy member and a second unit shape memory alloy member.

8. The lens driving device of claim 7, wherein the magnet comprises a first unit magnet and a second unit magnet.

9. The lens driving device of claim 8, wherein the moving portion comprises a first corner region connected with the first unit shape memory alloy member and a second corner region adjacent to the first corner region, and
wherein the first unit magnet is disposed closer to the second corner region than to the first corner region.

10. The lens driving device of claim 9, wherein the moving portion comprises a third corner region in a diagonal direction from the first corner region,
wherein the second unit shape memory alloy member is connected with the third corner region of the moving portion, and
wherein the second unit magnet is disposed closer to the second corner region than to the third corner region.

11. The lens driving device of claim 1, wherein the support member is disposed in the optical axis direction.

12. The lens driving device of claim 1, wherein the bobbin is configured to move together with the moving portion when the moving portion moves in the optical axis direction.

13. The lens driving device of claim 1, wherein the support member comprises a body portion, and a first concave portion and a second concave portion formed to have a narrower width than the body portion, wherein the first concave portion of the support member is coupled with the bobbin, and wherein the second concave portion of the support member is coupled with the moving portion.

14. A camera module comprising:
a printed circuit board;
an image sensor disposed on the printed circuit board;
the lens driving device of claim 1 disposed on the printed circuit board; and
a lens coupled to the bobbin of the lens driving device.

15. An optical device comprising:
a main body;
the camera module of claim 14 disposed on the main body; and
a display disposed on the main body and outputting an image photographed by the camera module.

16. A lens driving device comprising:
a fixed portion;
a moving portion disposed in the fixed portion;
a bobbin disposed in the moving portion;
a shape memory alloy member configured to move the moving portion in an optical axis direction;
a coil and a magnet configured to move the bobbin with respect to the moving portion in a direction perpendicular to the optical axis direction; and
a support member connecting the bobbin and the moving portion.

17. The lens driving device of claim 16, wherein both ends of the shape memory alloy member are connected with the fixed portion, and
wherein a central region of the shape memory alloy member is connected with the moving portion.

18. The lens driving device of claim 16, wherein the support member has regions having different widths.

19. The lens driving device of claim 16, wherein the support member comprises a body portion, and a first concave portion and a second concave portion formed to have a narrower width than the body portion,
wherein the first concave portion of the support member is coupled with the bobbin, and
wherein the second concave portion of the support member is coupled with the moving portion.

20. A lens driving device comprising:
a fixed portion;
a moving portion moving with respect to the fixed portion in an optical axis direction;
a bobbin disposed in the moving portion;
a driving unit configured to move the bobbin in a direction perpendicular to the optical axis direction;
a support member coupled with the bobbin and the moving portion; and
a shape memory alloy member coupled with the fixed portion and the moving portion,
wherein the support member comprises regions having different widths.

* * * * *